US012800469B2

(12) United States Patent
Goldsmith et al.

(10) Patent No.: US 12,800,469 B2
(45) Date of Patent: Nov. 17, 2026

(54) METHODS AND SYSTEMS FOR DETECTING DIFFUSING SINGLE PARTICLES

(71) Applicants: Wisconsin Alumni Research Foundation, Madison, WI (US); Cambridge Enterprise Limited, Cambridge (GB)

(72) Inventors: Randall Howard Goldsmith, Madison, WI (US); Lisa-Maria Needham, Cambridge (GB)

(73) Assignees: Wisconsin Alumni Research Foundation, Madison, WI (US); Cambridge Enterprise Limited, Cambridge (GB)

( * ) Notice: Subject to any disclaimer, the term of this patent is extended or adjusted under 35 U.S.C. 154(b) by 0 days.

(21) Appl. No.: 19/127,207

(22) PCT Filed: Nov. 10, 2023

(86) PCT No.: PCT/US2023/079347
§ 371 (c)(1),
(2) Date: May 5, 2025

(87) PCT Pub. No.: WO2024/102982
PCT Pub. Date: May 16, 2024

(65) Prior Publication Data

US 2026/0009717 A1 Jan. 8, 2026

Related U.S. Application Data

(60) Provisional application No. 63/521,919, filed on Jun. 20, 2023, provisional application No. 63/424,642, filed on Nov. 11, 2022.

(51) Int. Cl.
*G01N 15/1434* (2024.01)
*G01N 15/00* (2024.01)
*G01N 15/14* (2024.01)

(52) U.S. Cl.
CPC ..... *G01N 15/1434* (2013.01); *G01N 15/1425* (2013.01); *G01N 15/1456* (2013.01);
(Continued)

(58) Field of Classification Search
CPC ........... G01N 15/1434; G01N 15/1425; G01N 15/1456; G01N 15/1484; G01N 2015/0053; G01N 2015/1454
See application file for complete search history.

(56) References Cited

U.S. PATENT DOCUMENTS 6,521,324 B1 2/2003 Debe et al.
6,633,696 B1 10/2003 Vahala et al.
(Continued)

FOREIGN PATENT DOCUMENTS

CN 106324727 A * 1/2017 ........... G02B 3/0012
CN 110932084 A * 3/2020 ............. H01S 3/213
(Continued)

OTHER PUBLICATIONS

Saavedra, Carlos, et al. "A fiber Fabry-Perot cavity based spectroscopic gas sensor." arXiv preprint arXiv:2205.06835 (2022) (Year: 2022).*

(Continued)

*Primary Examiner* — Kara E. Geisel
*Assistant Examiner* — Roberto Fabian, Jr.
(74) *Attorney, Agent, or Firm* — Bell & Manning, LLC

(57) ABSTRACT

Methods for detecting diffusing particles are provided which comprise introducing a sample comprising a diffusing particle to an optical microcavity; coupling probe light into the optical microcavity such that the probe light is in resonance with the optical microcavity, wherein the diffusing particle diffuses into an optical mode volume defined by the coupled probe light; and detecting output light from the optical microcavity as a function of time while maintaining reso-
(Continued)

nance, wherein the diffusing particle generates a change the detected output light. Systems for carrying out the methods are also provided.

21 Claims, 26 Drawing Sheets

(52) U.S. Cl.
CPC .................... *G01N 15/1484* (2013.01); *G01N 2015/0053* (2013.01); *G01N 2015/1454* (2013.01)

(56) References Cited

U.S. PATENT DOCUMENTS

| | | | | |
|---|---|---|---|---|
| 6,741,628 | B2 | 5/2004 | Painter et al. | |
| 6,777,244 | B2 | 8/2004 | Pepper et al. | |
| 7,384,797 | B1 | 6/2008 | Blair et al. | |
| 7,781,217 | B2 | 8/2010 | Armani et al. | |
| 8,597,577 | B2 | 12/2013 | Flagan et al. | |
| 8,957,445 | B2 | 2/2015 | Senellart et al. | |
| 9,063,117 | B2 * | 6/2015 | Gourley | G01N 33/4833 |
| 9,223,156 | B2 | 12/2015 | Goldsmith et al. | |
| 9,535,219 | B2 | 1/2017 | Goldsmith et al. | |
| 10,948,397 | B2 * | 3/2021 | Trichet | B01L 3/50273 |
| 2001/0004411 | A1 | 6/2001 | Yariv | |
| 2005/0019842 | A1 | 1/2005 | Prober et al. | |
| 2008/0089367 | A1 | 4/2008 | Srinivasan | |
| 2009/0237666 | A1 | 9/2009 | Vollmer | |
| 2010/0085573 | A1 | 4/2010 | Lu | |
| 2011/0139970 | A1 | 6/2011 | He | |
| 2014/0193155 | A1 | 7/2014 | Popovic | |
| 2014/0290370 | A1 | 10/2014 | Hossein-Zadeh et al. | |
| 2015/0234211 | A1 | 8/2015 | Goldsmith et al. | |
| 2015/0362425 | A1 * | 12/2015 | Goldsmith | G01N 21/171 356/402 |
| 2020/0209141 | A1 | 7/2020 | Trichet et al. | |

FOREIGN PATENT DOCUMENTS

| | | | | |
|---|---|---|---|---|
| EP | 2927636 A1 * | 10/2015 | H01S 3/1304 |
| KR | 1020180135050 B1 | 12/2018 | |

OTHER PUBLICATIONS

4. Carmon, Tal, Lan Yang, and Kerry J. Vahala. "Dynamical thermal behavior and thermal self-stability of microcavities." Optics express 12.20 (2004): 4742-4750 (Year: 2004).*
5. Needham, Lisa-Maria, et al. "Label-free detection and profiling of individual solution-phase molecules." Nature 629.8014 (2024): 1062-1068.*
English translation of Notice of Non-Final Rejection in KR Patent Application No. 10-2025-7019398 dated Jul. 30, 2025, 5 pages.
Gallego, et al., "High-finesse fiber Fabry-Perot cavities: stabilization and mode matching analysis," Applied Physics B Lasers and Optics, 2016, 14 pages, vol. 122, No. 47.
Pfeifer, et al., "Achievements and perspectives of optical fiber Fabry-Perot cavities," Applied Physics B Lasers and Optics, 2022, 15 pages, vol. 128, No. 29.
Saavedra, et al., "A fiber Fabry-Perot cavity based spectroscopic gas sensor," Physics Optics, May 13, 2022, 11 pages.
Extended European Search Report in EP Patent Application No. 23889762.3 dated Sep. 26, 2025, 10 pages.
International Search Report and Written Opinion in International Patent Application No. PCT/US2023/079347 dated Mar. 15, 2024, 8 pages.
Needham, et al., "Label-free observation of individual solution phase molecules," bioRxiv, 2023, 20 pages, https://doi.org/10.1101/2023.03.24.534170.
Feng, Yin, "Laser Frequency Stabilization With Pound-Drever-Hall Technique," A Thesis in the Graduate School of Cornell University for the Degree of Master of Science, May 2015, 38 pages.
Ivanov, et al., "The Measurement of Nanoparticle Concentrations by the Method of Microcavity Mode Broadening Rate," Sensors, 2020, 15 pages, vol. 20, Article 5950, doi: 10.3390/s20205950.
Su, et al., "Label-free detection of single nanoparticles and biological molecules using microtoroid optical resonators," Light: Science & Applications, 2016, 6 pages, vol. 5, e16001, doi: 10.1038/lsa.2016.1.
Kohler, et al., "Tracking Brownian motion in three dimensions and characterization of individual nanoparticles using a fiber-based high-finesse microcavity," Nature Communications, 2021, 7 pages, vol. 12, Article 6385, https://doi.org/10.1038/s41467-021-26719-5.
Mader, et al., "Quantitative Determination of the Complex Polarizability of Individual Nanoparticles by Scanning Cavity Microscopy," ACS Photonics, 2022, pp. 466-473, vol. 9, https://doi.org/10.1021/acsphotonics.1c01131.
Hu, Juejun, "Ultra-sensitive chemical vapor detection using microcavity photothermal spectroscopy," Optics Express, Oct. 5, 2010, pp. 1-13, vol. 18, No. 21.
Arbouet, et al., "Direct Measurement of the Single-Metal-Cluster Optical Absorption," Physical Review Letters, eptember 14, 2004, pp. 127401-1-27401-4, vol. 93, No. 12.
Rokhsari, et al., "Ultralow Loss, High Q, Four Port Resonant Couplers for Quantum Optics and Photonics," Physical Review Letters, Jun. 25, 2004, pp. 253905-1-253905-4, vol. 92, No. 25.
Tapalian, et al., "Thermooptical Switches Using Coated Microsphere Resonators," IEEE Photonics Technology Letters, Aug. 2002, pp. 1118-1120, vol. 14, No. 8.
Pan, et al., "Aligning microcavity resonances in silicon photonic-crystal slabs using laser-pumped thermal tuning," Applied Physics Letters, Mar. 12, 2008, pp. 1-3, vol. 92, No. 103114.
Topolancik, et al., "Photoinduced Transformations in Bacteriorhodopsin Membrane Monitored with Optical Microcavities," Biophysical Journal, Mar. 2007, pp. 2223-2229, vol. 92.
Armani, et al., "Label-Free, Single-Molecule Detection with Optical Microcavities," Science, Aug. 10, 2007, pp. 783-787, vol. 317.
Benson, et al., "Micro-Optical Resonators for Microlasers and Integrated Optoelectronics: Recent advances and future challenges," Frontiers of Planar Lightwave Circuit Technology: Design, Simulation and Fabrication, 2005, pp. 39-70.
Yoshie, et al., "Optical Microcavity: Sensing down to Single Molecules and Atoms," Sensors, Feb. 7, 2011, pp. 1972-1991, vol. 11.
Righini, et al., "Whispering gallery mode microresonators: Fundamentals and applications," Rivista Del Nuovo Cimento, 2011, pp. 435-488, vol. 34, No. 7.
Heylman, et al., "Photothermal mapping and free-space laser tuning of toroidal optical microcavities," Applied Physics Letters, Nov. 21, 2013, pp. 1-4, vol. 103, No. 211116.
Heylman, et al., Single-Molecule Absorption Spectroscopy Using Toroidal Optical Microcavities, presentation, UW Madison, May 2013.
Heylman, et al., "Photothermal Microscopy of Nonluminescent Single Particles Enabled by Optical Microresonators," Journal of Physical Chemistry Letters, May 16, 2014, pp. 1917-1923, vol. 5, No. 11.
English machine translation of KR Patent Publication No. 1020180135050 dated Dec. 19, 2018.
Communication pursuant to Article 94(3) EPC in EP Patent Application No. 23889762.3 dated Apr. 20, 2026, 10 pages.
Notice of Allowance of Patent in KR Patent Application No. 10-2025-7019398 dated May 28, 2026, 5 pages, with English translation.

* cited by examiner

METHODS AND SYSTEMS FOR DETECTING DIFFUSING SINGLE PARTICLES

CROSS-REFERENCE TO RELATED APPLICATIONS

The present application is a U.S. National Stage Application under 35 U.S.C. 371 of International Patent Application No. PCT/US23/79347, filed Nov. 10, 2023, which claims priority to U.S. provisional patent application No. 63/521,919 that was filed Jun. 20, 2023, and to U.S. provisional patent application No. 63/424,642 that was filed Nov. 11, 2022, the entire contents of each of which are incorporated herein by reference.

REFERENCE TO GOVERNMENT RIGHTS

This invention was made with government support under GM 136981 awarded by the National Institutes of Health and under DE-AC02-06CH11357 awarded by the US Department of Energy. The government has certain rights in the invention.

The project leading to this application has received funding from the European Union's Horizon 2020 research and innovation programme under the Marie Sklodowska-Curie grant agreement No 886216.

BACKGROUND

Neurodegenerative diseases are incurable protein misfolding disorders that are characterized by the progressive loss of function of neurons. For example, the misfolding and aggregation of intrinsically disordered proteins is undeniably associated with neuronal mortality in Parkinson's Disease. The formation of proteinaceous inclusions occurs by misfolding of soluble monomeric proteins into intermediate oligomers, ultimately forming insoluble amyloid deposits in the brain, which are comprised mainly of the protein α-synuclein (αSyn). The neuronal amyloid deposits (Lewy bodies) are pathological hallmarks of Parkinson's Disease and are widely believed to be a protective mechanism against the oligomers themselves, which are thought to be the main pathogens. The term "oligomer" is generally applied to describe the various pre-fibrillar aggregates which are highly variable in size, shape, and structure, with differing extents of β-sheet architecture. Some biophysical techniques have been employed to study these characteristics of amyloid proteins in particular, and biological molecules in general. However, the low abundance (<1%), instability, and heterogeneity of the such species, particularly in biological fluids, makes them virtually unobservable with existing techniques.

SUMMARY

Provided are methods for detecting diffusing particles, including diffusing single protein molecules. Systems for carrying out the methods are also provided.

As illustrated in the Examples below and by contrast to existing techniques, the present methods and systems may be used to detect exceedingly small, single particles, including single proteins as small as about 1 kDa, with signal-to-noise ratios of about 100, even as the particles freely diffuse in solution. The present methods and systems may be used to determine the sizes of such particles as well as to distinguish between mixtures of different types of particles, including molecular isomers having the same molecular weight but different shapes. Unlike other existing biophysical techniques, the present methods and systems do not require labeling the particles, e.g., with fluorescent probes or other types of probes, and do not require that the particles interact with any surfaces, thereby providing a non-invasive, label-free approach for analyzing biological molecules, including those linked to pathological diseases. Such information is invaluable in elucidating the role of such species in these pathological diseases and thus, in developing diagnostic tools and therapeutic interventions. However, the present methods and systems are not limited to such applications, which more broadly include sample characterization as well as revealing mechanisms underlying protein oligomerization, biomolecular interactions, and macromolecular assemblies.

In an embodiment 1, a method for detecting diffusing particles comprises: (a) introducing a sample comprising a diffusing particle to an optical microcavity; (b) coupling probe light into the optical microcavity such that the probe light is in resonance with the optical microcavity, wherein the diffusing particle diffuses into an optical mode volume defined by the coupled probe light; and (c) detecting output light from the optical microcavity as a function of time while maintaining resonance, wherein the diffusing particle generates a change the detected output light.

An embodiment 2 is the method of embodiment 1, wherein the optical microcavity is an open-access optical microcavity configured such that a region of maximum intensity of the optical mode volume is accessible by the diffusing particle.

An embodiment 3 is the method of any of embodiments 1-2, wherein the optical microcavity is a Fabry-Perot microcavity having a cavity, wherein the optical mode volume is defined within the cavity.

An embodiment 4 is the method of any of embodiments 1-3, wherein resonance in step (b) is associated with maximum transmission of the probe light through the optical microcavity or minimum intensity of back-reflected probe light from the optical microcavity. An embodiment 5 is the method of embodiment 4, wherein maximum transmission of the probe light or minimum intensity of the back-reflected probe light is obtained by coupling the probe light such that it undergoes constructive interference to form a standing wave within the optical microcavity and by adjusting one or more of: a power of the probe light, a gain of a Pound-Drever-Hall (PDH) servo loop coupled to a source of the probe light and the optical microcavity, and an offset of the PDH servo loop. An embodiment 6 is the method of embodiment 5, wherein the standing wave is achieved by satisfying $m\lambda=2\ nL$, wherein m is an integer, λ is the probe light wavelength, n is the sample's refractive index, and L is the optical microcavity cavity length. An embodiment 7 is the method of embodiment 6, further comprising adjusting λ, adjusting L, adjusting the power of the probe light, adjusting the gain of the PDH servo loop, adjusting the offset of the PDH servo loop, or a combination thereof during step (c) to maintain resonance.

An embodiment 8 is the method of any of embodiments 1-7, wherein the sample comprises water. An embodiment 9 is the method of embodiment 8, wherein the optical microcavity is a Fabry-Perot microcavity having a cavity, wherein the optical mode volume is defined within the cavity.

An embodiment 10 is the method of any of embodiments 1-9, wherein the sample has a concentration of diffusing particles such that a probability of the diffusing particle occupying the optical mode volume is less than one.

An embodiment 11 is the method of any of embodiments 1-10, wherein the detected output light is transmitted probe light comprising dips or the detected output light is back-reflected probe light comprising spikes and the method further comprises measuring a temporal width of each of the dips or the spikes. An embodiment 12 is the method of embodiment 11, further comprising generating a plot of intensity versus temporal width of each of the dips or the spikes.

An embodiment 13 is the method of any of embodiments 1-11, wherein the detected output light is transmitted probe light comprising dips or the detected output light is back-reflected probe light comprising spikes and the method further comprises measuring an autocorrelation function (ACF) from the dips or the spikes and calculating a hydrodynamic radius from the measured ACF.

In an embodiment 14, a system for detecting diffusing particles comprises: (a) optoelectrical components configured to couple probe light into an optical microcavity such that the probe light is in resonance with the optical microcavity. (b) the optical microcavity to which a sample comprising a diffusing particle is introduced to diffuse into an optical mode volume defined by the coupled probe light; (c) a detector configured to detect output light from the optical microcavity as a function of time; and (d) optoelectrical components configured to maintain resonance while using the detector to detect output light from the optical microcavity as a function of time, wherein the optoelectrical components (d) provide a Pound-Drever-Hall (PDH) servo loop coupled to a source of the probe light and the optical microcavity.

An embodiment 15 is the system of embodiments 14, wherein the optical microcavity is an open-access optical microcavity configured such that a region of maximum intensity of the optical mode volume is accessible by the diffusing particle.

An embodiment 16 is the system of any of embodiments 14-15, wherein the optical microcavity is a Fabry-Perot microcavity having a cavity, wherein the optical mode volume is defined within the cavity.

An embodiment 17 is the system of any of embodiments 14-16, further comprising an actuator operably coupled to the optical microcavity and the PDH servo loop, the actuator configured to adjust a cavity length L of the optical microcavity.

An embodiment 18 is the system of any of embodiments 14-17, further comprising a controller comprising a processor and a non-transitory computer-readable medium operably coupled to the processor, the non-transitory computer-readable medium comprising instructions, that, when executed by the processor, cause the controller to perform operations comprising: receiving a signal from the detector, based on the received signal, satisfying $m\lambda=2\ nL$, wherein m is an integer, $\lambda$ is the probe light wavelength, n is the sample's refractive index, and L is the cavity length of the optical microcavity; and based on the received signal, adjusting one or more of a power of the probe light, a gain of the PDH servo loop, an offset of the PDH servo loop, or a combination thereof.

An embodiment 19 is the system of any of embodiments 14-18, further comprising a controller comprising a processor and a non-transitory computer-readable medium operably coupled to the processor, the non-transitory computer-readable medium comprising instructions, that, when executed by the processor, cause the controller to perform operations comprising: receiving a signal from the detector, processing the signal to determine a temporal width for the signal; and outputting the determined temporal width. An embodiment 20 is the system of embodiment 19, wherein the operations further comprise processing the signal to calculate a hydrodynamic radius of the diffusing particle and outputting the calculated hydrodynamic radius to the system.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 4B, carbonic anhydrase; and FIG. 4C, aprotinin). The diffusion events appear as dips in the transmitted probe light.

DETAILED DESCRIPTION

Provided are methods for detecting diffusing particles, including diffusing single molecules. Systems for carrying out the methods are also provided.

Regarding the methods, in embodiments, such a method comprises introducing a sample comprising a diffusing particle into a cavity of an optical microcavity; coupling probe light into the optical microcavity such that the probe light is in resonance with the optical microcavity; and detecting output light from the optical microcavity as a function of time while maintaining resonance. The diffusing particle diffuses into an optical mode volume defined by the coupled probe light in the cavity and this "diffusion event" generates changes in detected output light as a function of time. Without wishing to be bound to a particular theory, it is believed that such diffusion events induce a local refractive index increase within the optical mode volume, triggering a rapid cooling cascade, which manifests as a shift in resonance of the optical microcavity. Elastic scattering of the coupled probe light may contribute to the cooling. This photothermal distortion of the resonance of the optical microcavity combined with actively maintaining resonance during detection (e.g., using a Pound-Drever-Hall (PDH) servo loop as further described below) provides a surprisingly large amplification in detector signal and thus, readily observable changes in the detected output light as a function of time. As further described below, these changes may be analyzed to extract information about the diffusing particle, including its size. These changes may also be analyzed to separate populations of distinct particles, including molecular isomers having the same molecular weight but different shapes.

A variety of optical microcavities may be used with the present methods. Optical microcavities which confine light in small volumes by the mechanism of distributed Bragg reflection from periodical structures in the optical microcavity may be used. However, suitable optical microcavities are those configured such that the diffusing particles can access an optical mode volume generated in optical microcavity under resonance with the probe light, including the region of maximum intensity of the optical mode. This ensures spatial overlap between the diffusing particles and the optical mode. Such optical microcavities may be referred to herein as "open-access" optical microcavities.

Figure 1A:
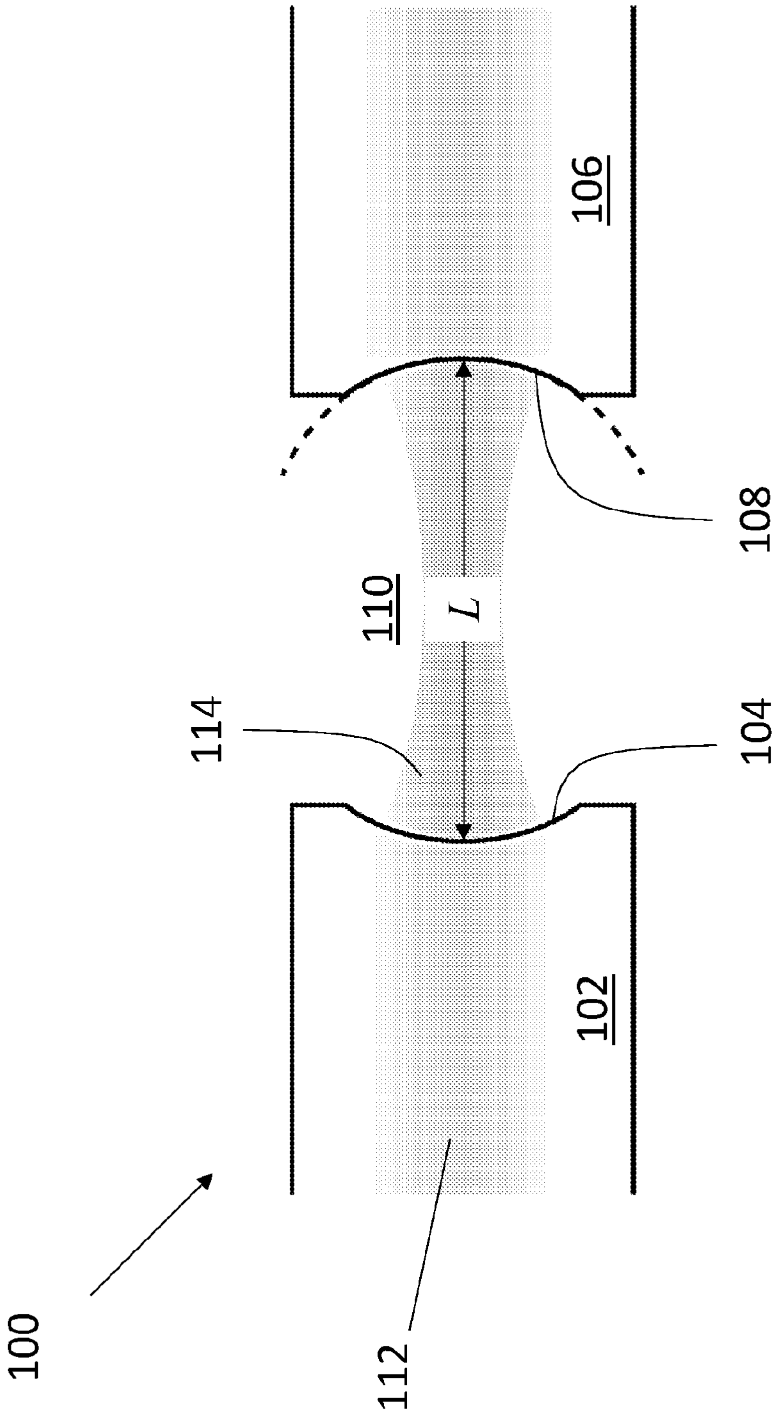
FIG. 1A is a schematic illustration of a portion of a Fabry-Perot (FP) microcavity 100 according to an illustrative embodiment. The FP microcavity 100 is an illustrative open-access optical microcavity that may be used in the present methods and systems.
Figure 1B:
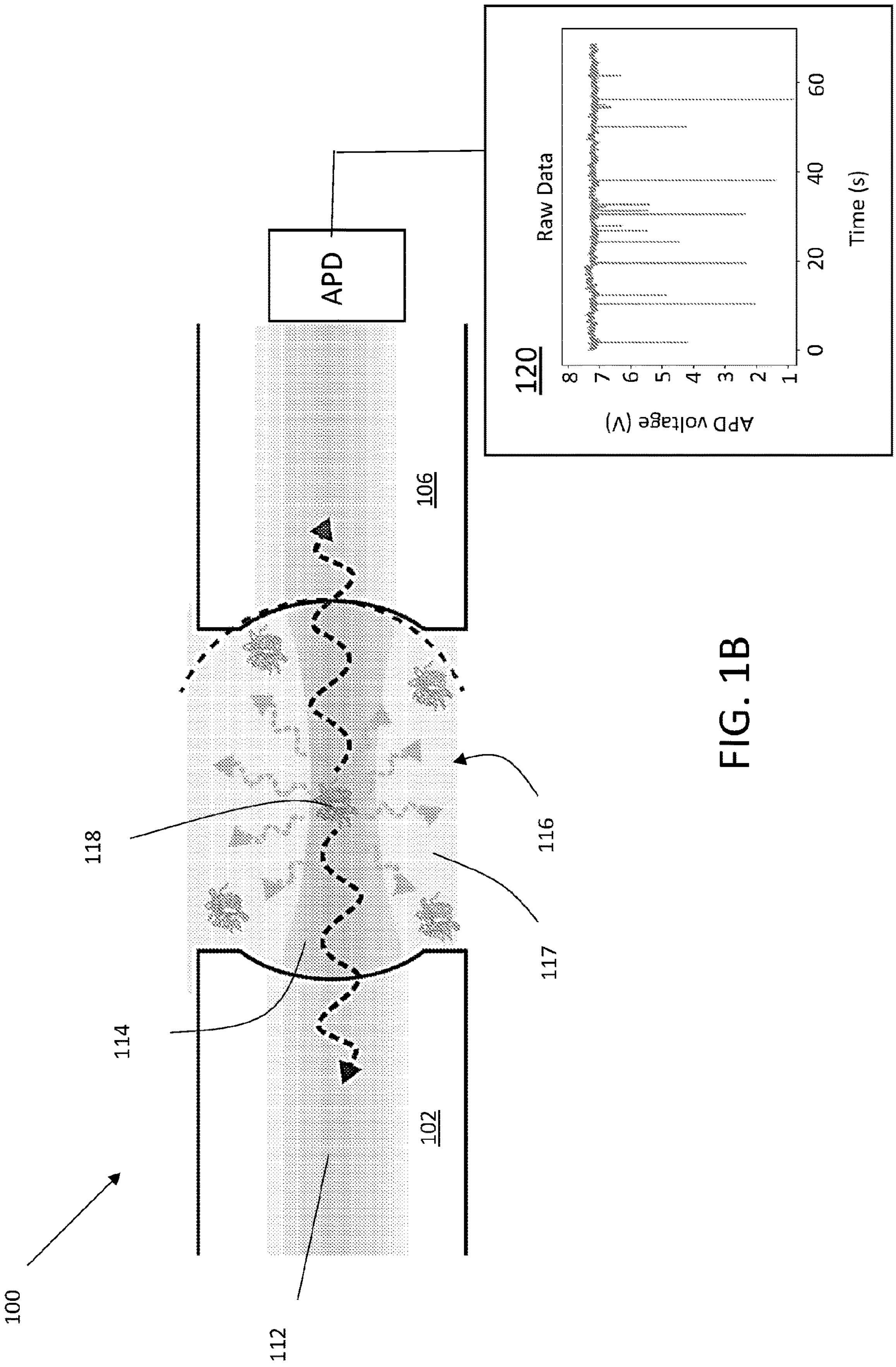
FIG. 1B is a schematic illustration of the FP microcavity 100 of FIG. 1A after introducing a sample 116 comprising diffusing particles into the cavity 110 of the FP microcavity. A particle (indicated with reference 118) diffuses into the optical mode volume defined by the coupled probe light (schematic of standing wave 114). Such a diffusion event generates changes in detected output light from the FP microcavity. This is believed to be due to the particle 118 increasing the local refractive index within the optical mode volume, triggering a rapid cooling cascade. Elastic scattering of the coupled probe light may contribute to the cooling. The present methods and systems are able to detect such single particle diffusion events as a function of time. e.g., by an avalanche photodiode (APD), resulting in plots like the one shown in the FIG. 1B. Such diffusion of single-particle events is impossible to detect using existing dynamic light scattering methods and systems.

Certain Fabry-Perot (FP) microcavities are open-access optical microcavities that may be used in the present methods, including those configured to confine light within a cavity defined by two oppositely facing, spaced apart, reflective surfaces. An illustrative such FP microcavity 100 is shown in FIGS. 1A-1B. The FP microcavity 100 comprises an input optical fiber 102 (e.g., a single mode optical fiber) having a reflective end surface 104 and an output optical fiber 106 (e.g., a multimode optical fiber) having a reflective end surface 108. The input and output optical fibers 102, 106 are oriented and aligned with respect to one another such that the first and second reflective end surfaces 104, 108 are oppositely facing and spaced apart to define a cavity 110 therebetween having a cavity length L. In this embodiment, the FP microcavity 100 is biconcave as both the reflective end surfaces 104, 108 are concave. The reflective end surfaces 104, 108 may be provided by a reflective material (e.g., a dielectric material) coated or otherwise mounted onto respective ends of the input and output optical fibers 102, 106. Other FP microcavities having other configurations as compared to the FP microcavity 100 may be used. For example, the FP microcavity is not required to be fiber-based. However, suitable FP microcavities generally include those having high Q-factors, e.g., at least $10^6$, and high finesse (F) values, e.g., at least $10^4$. The materials, dimensions, reflective surfaces (shape, material), and alignment may be adjusted to achieve these Q-factors and F values.

In embodiments, the optical microcavity is not a toroid optical microcavity (which may be referred to as a toroidal microresonator and the like) or a whispering gallery mode optical microcavity.

Reflective surfaces of optical microcavities may be cleaned to enhance or prolong performance. Such cleaning procedures may include exposure to acids, bases, solvents, plasmas, particles, gasses, or a combination thereof. Cleaning treatments using bases may include exposing the optical microcavity to a hydroxide, aqueous solvent, or organic solvent. Gaseous cleaning treatments may include exposing the optical microcavity to ozone or carbon dioxide. Plasma cleaning treatment may include exposing the optical microcavity to plasmas of air, oxygen, argon, or nitrogen.

As noted above, the present methods comprise coupling probe light into the optical microcavity such that it is in resonance with the optical microcavity. The conditions for achieving resonance depend upon the type of optical microcavity being used as well as the medium within the cavity of the optical microcavity, but generally refer to ensuring that the probe light and the optical microcavity are spectrally overlapped with one another (i.e., overlapped in frequency) and moreover, that the overlap is maximized. ("Maximized" as used herein encompasses, but does not require, perfect overlap. That is, "maximized" encompasses "nearly maximized." Achieving sufficient overlap may be evidenced by the present methods and systems exhibiting sufficient sensitivity in the detection of diffusing single-particle events, including at the signal-to-noise ratios disclosed herein (see FIG. 16.).) This may be achieved by using a Pound-Drever-Hall (PDH) servo loop operably coupled to the probe light and the optical microcavity, as further described below. The probe light may be resonant with any desired optical mode of the optical microcavity, e.g., the fundamental spatial mode. The resonance conditions described herein generally refer to the loaded optical microcavity. i.e., the optical microcavity is experiencing all of the losses and non-linearities associated with experimental operational conditions, including having its optical mode volume filled with the medium in which the particles diffuse and operating at typical pump powers.

For optical microcavities such as the FP microcavities described above, resonance is achieved by coupling the probe light into the optical microcavity such that it undergoes constructive interference to form a standing wave within the cavity of the optical microcavity. More specifically, for FP optical microcavities, such as the FP optical microcavity 100 of FIGS. 1A-1B, the resonance may be achieved by satisfying $m\lambda=2\ nL$ (Equation A), wherein m is an integer. $\lambda$ is the wavelength of the probe light being coupled into the optical microcavity, L is the cavity length of the optical microcavity and n is the refractive index of the medium inside the cavity. For a fixed cavity length L, resonance may be achieved by using probe light having a wavelength $\lambda$ that satisfies Equation A. Similarly, for probe light having a fixed wavelength $\lambda$, resonance may be achieved by using a cavity length L that satisfies Equation A. As further described below, the present methods allow for adjustments in the probe light wavelength $\lambda$, the cavity length L, or both, so as to ensure that the Equation A is met, and thus, resonance is achieved during the coupling step and maintained during the detecting step. The process of achieving resonance is illustrated in FIGS. 1A and 1B, showing a probe light 112 entering via the input optical fiber 102 and undergoing multiple back and forth reflections at the reflective end surfaces 104, 108. When Equation A is met, a standing wave 114 forms within the cavity 110. The shape and dimension of the standing wave 114 dictate the optical mode volume into which a diffusing particle may enter. It is noted that FIGS. 1A and 1B show a schematic of the standing wave 114, which may be further characterized as being composed of a series of nodes and antinodes, each of which the diffusing particle may traverse.

As further illustrated in the Examples below, resonance is further achieved by selection of additional conditions that ensure that probe light being transmitted through the optical microcavity is maximized (or alternatively that probe light back-reflected from the optical microcavity is minimized). "Maximized" ("minimized") has a meaning analogous to that described above. These additional conditions include power of the probe light, gain of the PDH servo loop, offset of the PDH servo loop, and finesse of the optical microcavity. For example, for a selected probe light power, a selected PDH gain, and a selected optical microcavity, a PDH offset may be selected to achieve maximum sensitivity to incoming diffusing particles. The Examples below refer to an optical microcavity that is "in resonance" with coupled probe light as being both "locked" and "primed." (See FIG. 10C, panel 2.)

The probe light being coupled into the optical microcavity is generally a laser beam. The laser may produce the probe light at a fixed wavelength. In such embodiments, the optical microcavity has a tunable cavity length L so as to ensure resonance can be achieved and maintained as described above. However, in other embodiments, the laser may produce probe light having a tunable wavelength. Such embodiments are useful for optical microcavities having fixed cavity lengths L, in which case the probe light wavelength may be tuned so as to ensure resonance can be achieved and maintained as described above.

Whether fixed or tunable, the particular wavelength(s) of the probe light being used generally depends upon the optical microcavity being used. For example, use of silica mirror reflective surfaces in the optical microcavity generally limits the wavelength to be in a range of about 300 nm to about 2000 nm. The probe light wavelength(s) also depends upon a medium in which the diffusing particles are dispersed. For example, use of water as the medium generally precludes the use of wavelengths higher than about 900 nm. Otherwise, the wavelength(s) of the probe light are generally independent of the particular particles being analyzed, since the interaction with the particles is non-resonant.

The present methods further comprise detecting output light from the optical microcavity as a function of time while maintaining resonance. Under this condition, diffusing particles entering the optical mode volume (including diffusing particles traversing nodes/antinodes of a standing wave therein) induce changes (i.e., perturbations) to the detected output light. The present methods enable the detection of these changes with surprisingly high signal-to-noise as compared to existing techniques (see FIG. 16). The detected output light may be probe light that is transmitted through the optical microcavity (e.g., via the output optical fiber 106 of the FP optical microcavity 100 of FIGS. 1A-1B) or probe light that is back-reflected from optical microcavity (e.g., via the input optical fiber 102 of the FP optical microcavity 100 of FIGS. 1A-1B). Maintaining the resonance during detection refers to use of the resonance conditions described above during the detecting step (i.e., use of cavity length L and probe light wavelength λ that satisfy Equation A as well as use of the additional conditions, including PDH offset (at a selected power, selected PDH gain, and selected optical microcavity) that should achieve maximum probe transmission). In this way, resonance perturbations due to the diffusing particles manifest as large, detectable changes in the detected output light. Maintaining the resonance during detection may include adjusting the cavity length L so as to satisfy Equation A, adjusting the probe light wavelength λ so as to satisfy Equation A, adjusting PDH offset, or combinations thereof. Such adjustments may occur during (i.e., concurrently with) the step of detecting the output light. Such adjustments may be carried out via the PDH servo loop operably coupled to the probe light and the optical microcavity, as further described below.

Thus, the present methods and systems involve detecting output light as a function of time under conditions of constant resonance between the probe light and the optical microcavity. This is distinguished from methods and systems such as those described in L. Kohler, et al. *Nature Communications* 12.1 (2021): 1-7, in which the probe light and the optical microcavity are intentionally brought out of resonance during detection via periodic modulations in the cavity length L.

The present methods may be used to analyze a variety of samples. The samples generally comprise a liquid medium and particles diffusing throughout the liquid medium. The term "particle" encompasses individual molecules such as monomers, oligomers, polymers (and domains thereof), proteins (and domains thereof), nucleic acids such as DNA or RNA, and enzymes (and domains thereof). Proteins, nucleic acids, and enzymes may be collectively referred to as "biomolecules." Particles may also include a collection of atoms or chemical molecules, e.g., metal nanoparticles, inorganic nanoparticles, etc. The sample may comprise a single type of particle or multiple, different types of particles. The liquid medium is not particularly limited, and may depend upon the nature of the particles in the sample. In embodiments, the liquid medium is aqueous in nature (i.e., comprising water), although non-aqueous liquids may be present. The sample may be a biological fluid from a mammalian subject. e.g., cerebrospinal fluid.

The particles may be characterized by various sizes and masses, depending upon the type of particle. However, as noted throughout the present disclosure, the present systems and methods are capable of determining the sizes of exceedingly small individual particles. This includes particles having a size of no more than 50 nm, no more than 25 nm, no more than 15 nm, no more than 10 nm, no more than 5 nm, no more than 1 nm, and in a range of from 1 nm to 10 nm. This size may be referred to as a hydrodynamic diameter or radius of the particle. These sizes include those significantly smaller than is possible to analyze using existing techniques. Regarding mass, this includes particles having a mass of no more than 100 kDa, no more than 75 kDa, no more than 50 kDa, no more than 25 kDa, no more than 10 kDa. and in a range of from 1 kDa to 15 kDa. The present systems and methods are also capable of distinguishing between particles having different sizes/masses as well as between particles having the same size/mass but different shapes.

The samples to be analyzed with the present methods are characterized by having relatively low concentrations of the diffusing particles. Generally, the concentration is sufficiently low so that the probability of a single particle occupying the optical mode volume (e.g., see the standing wave 114 in FIGS. 1A and 1B) is less than 1. Illustrative concentrations include those in the range of from 1 fM to 20 pM. As noted above, the present methods do not require that the particle be labeled with a probe that interacts with light, e.g., a fluorescent probe. Thus, the particles may be characterized as being unlabeled or label-free.

Once introduced into the interior of the optical microcavity (e.g., cavity 110 of FP microcavity 100) and while carrying out the steps of the present methods, the particles of the sample generally continue to diffuse throughout the cavity, including into the optical mode volume defined by the coupled probe light (e.g., standing wave 114 of FP microcavity 100). Although in some embodiments, the diffusing particle may adsorb to surfaces of the optical microcavity, this is not a requirement of the present methods. That is, unlike existing techniques, the present methods and systems are configured to detect changes in output light induced by diffusing particles, which are distinguished from surface-bound or surface-adsorbed particles. In embodiments, the particles may be characterized as being non-adsorbing or non-adsorbed with respect to the surfaces of the optical microcavity. Moreover, the materials of the optical microcavity may be selected (or the surfaces coated) so as to prevent the absorption of particles on surfaces of the cavity in contact with the sample. Such optical microcavities may be referred to as being non-absorbing or non-absorbent with respect to the diffusing particles.

Figure 4A:
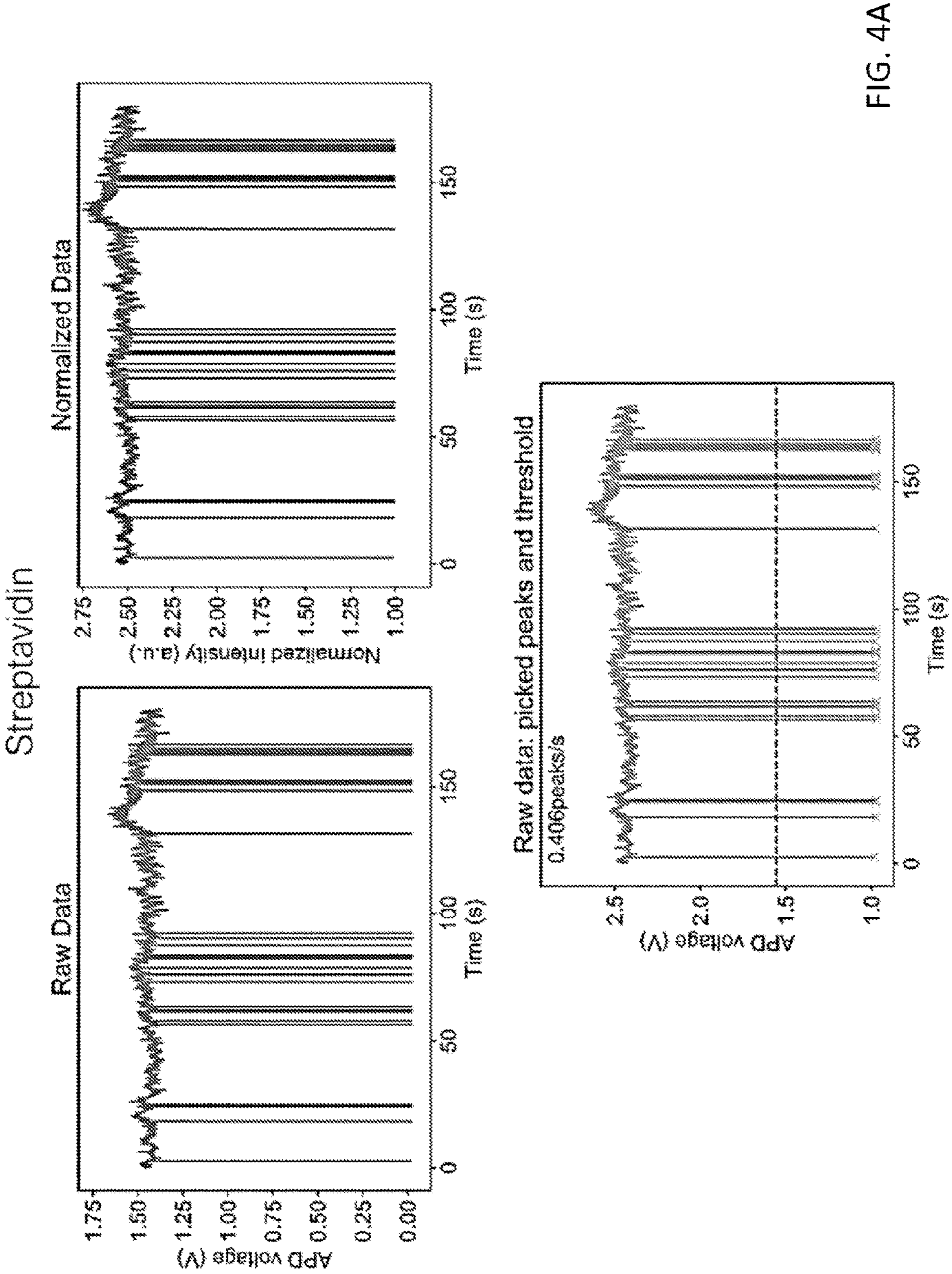
FIGS. 4A-4C show plots of signal from detector 222 (which detects probe light being transmitted through the FP microcavity) of the system 200 of FIG. 2 obtained from three samples (FIG. 4A, streptavidin.
Figure 4B:
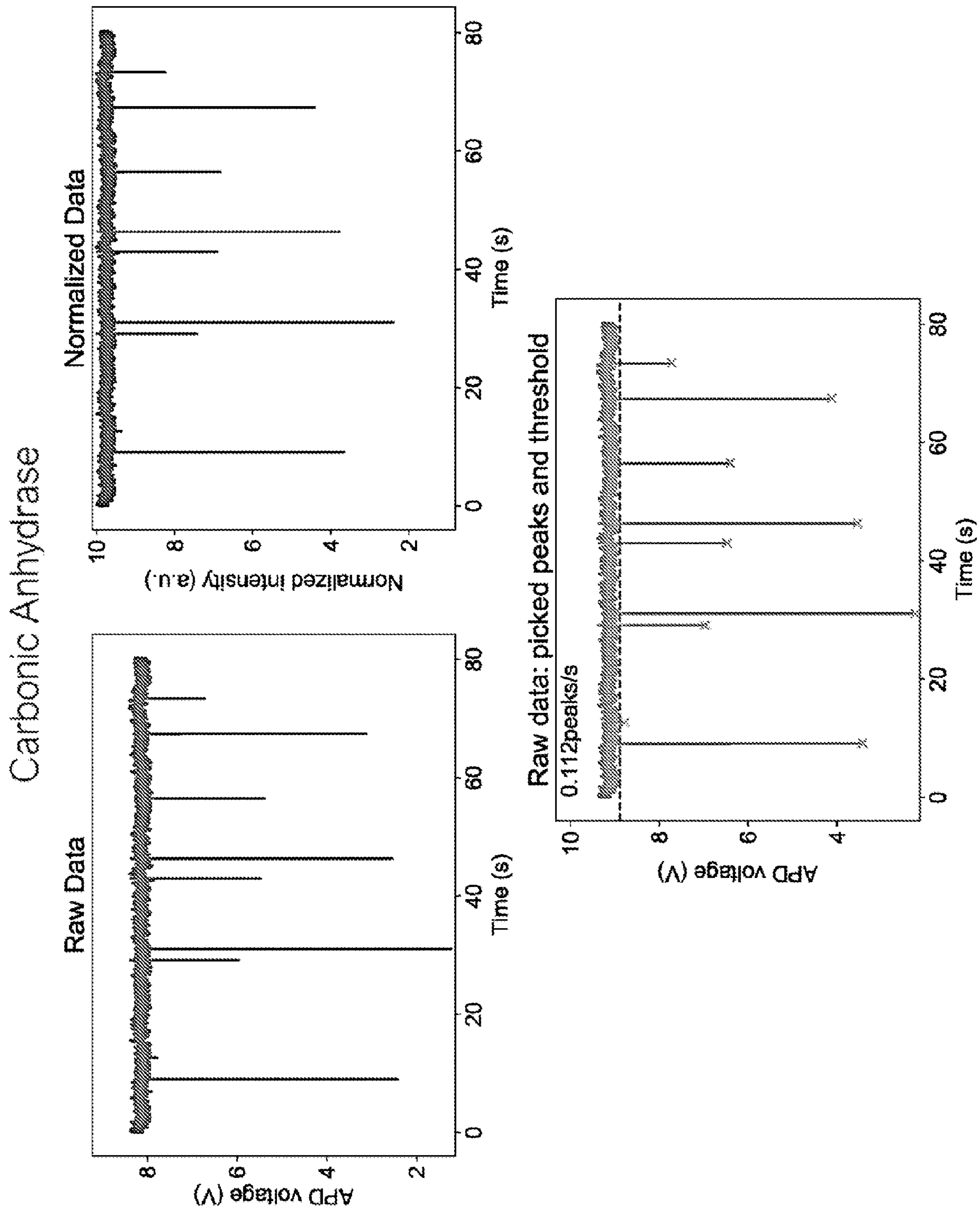
Figure 4C:
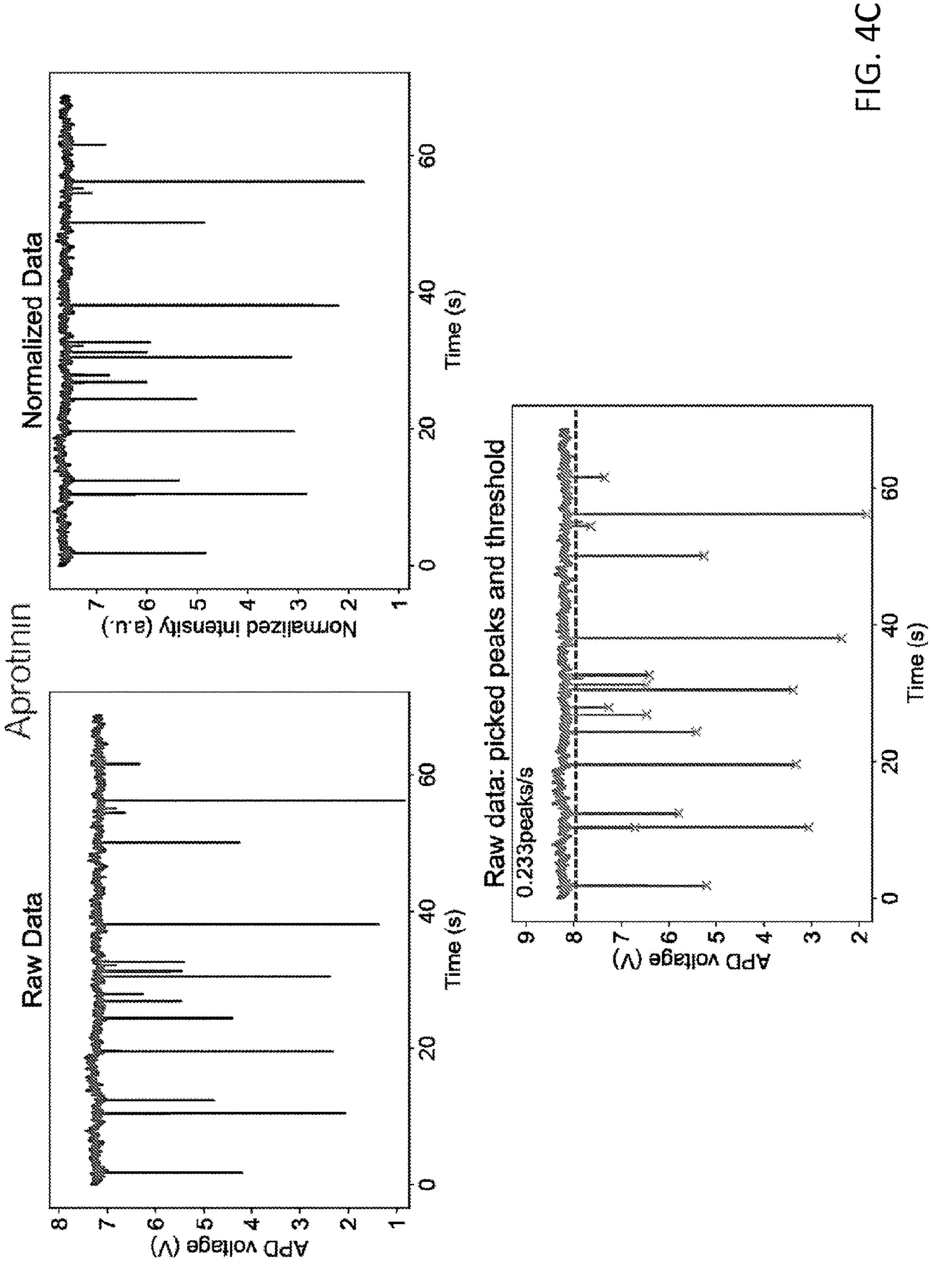

With reference to FIG. 1B, this figure shows the FP microcavity 100 of FIG. 1A, after a sample 116 comprising a liquid medium 117 and diffusing particles, including diffusing particle 118, have been introduced into the cavity 110. As in FIG. 1A, the probe light 112 has been coupled into the microcavity 100 such that it is in resonance with the FP microcavity 100, thereby forming a standing wave 114 providing maximum transmission through the microcavity 100. As noted above, diffusing particles that enter the optical mode volume (the shape and dimensions of which are dictated by the standing wave 114) constitute diffusion events that generate changes in detected output light. Specifically, probe light 112 that is transmitted via the output optical fiber 106 of the FP microcavity 100 may be detected by a detector (here, an avalanche photodiode APD) as a function of time. Illustrative signal from the APD detector is shown in a plot 120 of intensity (or power or voltage) versus time. As shown in the plot 120, the diffusion events of individual diffusing particles appear as dips. Analogously, probe light 112 that is back-reflected via the input optical fiber 102 of the FP microcavity 100 may be detected as a function of time, resulting in a plot of intensity (or power or voltage) versus time. However, by contrast to plot 120, in the case of detecting the back-reflected light, the diffusion events will appear as spikes. Other embodiments may include intermediate phases or inverted spikes and dips. Other plots of intensity versus time are shown in FIGS. 4A-4C (see Example 1) and FIG. 7A (Example 2).

Figure 7A:
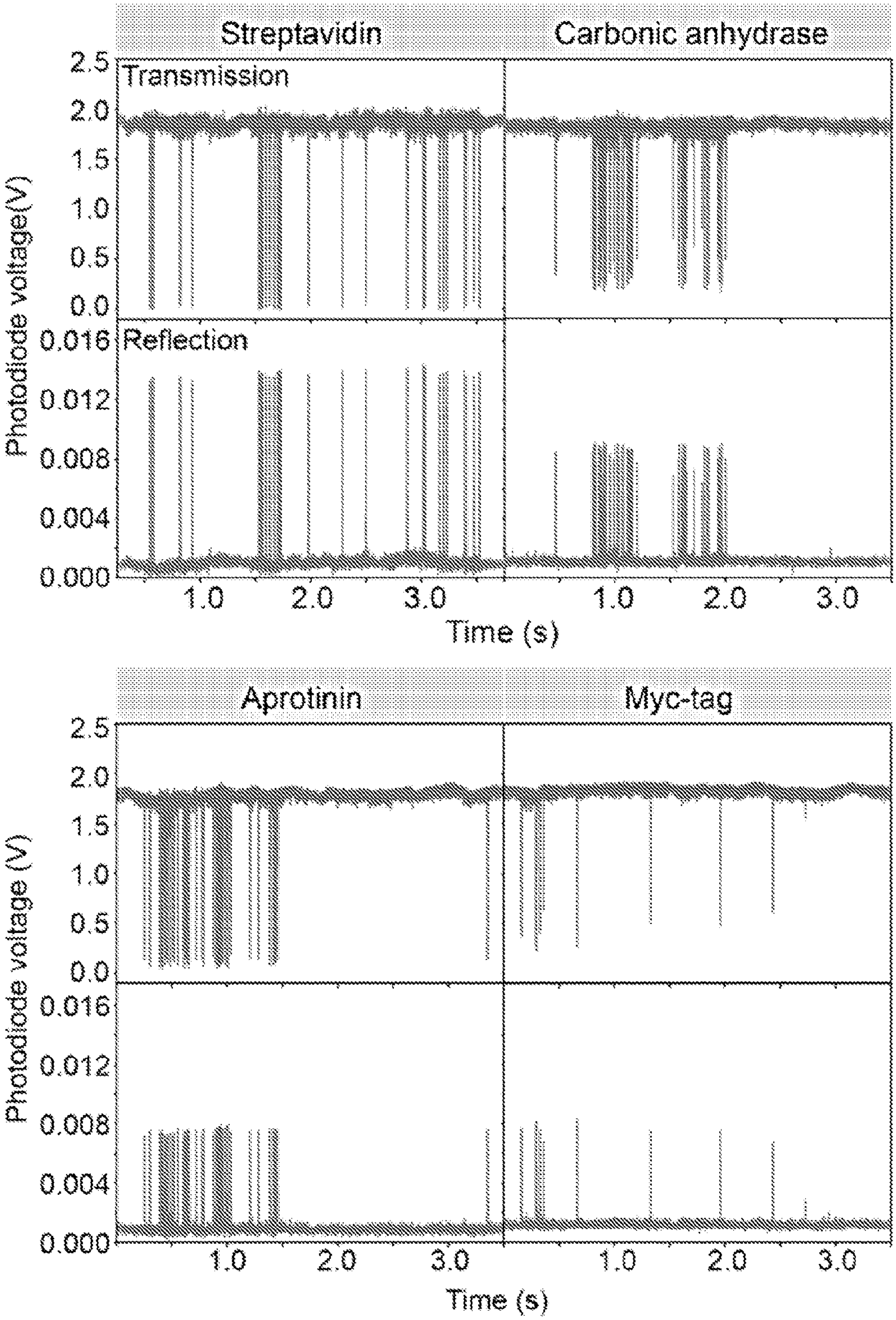
FIG. 7A shows perturbations of the locked resonant cavity mode originating from single-protein diffusion events. The locked signal was monitored in both transmission and reflection, and the events manifested as a transient reduction of the transmitted signal intensity and an increase in the reflected intensity.

Analysis of signals associated with the detected output light may include measuring the temporal width of each dip (spike) in plots such as plot 120. These temporal widths are related to the passage time (and thus, velocity) of the particle in the optical mode volume, which in turn, may be used to calculate the diffusion constant of the particle, and ultimately, the hydrodynamic radius of the particle. Various data processing techniques may be applied as part of signal analysis to extract such information. Such techniques may include measuring the full-width at half maximum (FWHM) of each dip (spike) in detector signal plots. Data processing techniques may be used to provide two-dimensional (2D) plots of the intensity and temporal width of each dip (spike) in plots such as FIGS. 4A-4C and FIGS. 7A-7B. Illustrative such 2D plots are shown in FIG. 7A. The 2D plots of FIGS. 9A-9B further demonstrate the capability of the present methods and systems to distinguish between different particles in mixtures of such particles. Other techniques may include measuring a time autocorrelation function (ACF) which may be used to calculate the diffusion constant of the particle in a manner consistent with the Fluorescence Correlation Spectroscopy, and ultimately, the hydrodynamic radius of the particle. ACF analysis is further described in Example 2 and illustrated in FIGS. 8A-8B. Analysis may involve the use of calibration plots of detector signal obtained from samples comprising diffusing particles of known sizes/masses.

Systems for detecting diffusing particles are also provided, which may be used to carry out any of the present methods. The systems are configured to detect changes in detected output light induced by diffusing particles diffusing into an optical mode volume defined by coupled probe light within a cavity of an optical microcavity. In embodiments, such a system comprises optoelectrical components configured to couple probe light into an optical microcavity defining a cavity (e.g., FP microcavity) such that the probe light is in resonance with the optical microcavity; the optical microcavity defining the cavity into which a sample comprising a diffusing particle may be introduced to diffuse into an optical mode volume defined by the coupled probe light; a detector configured to detect output light from the optical microcavity as a function of time; and optoelectrical components configured to maintain resonance during detection.

The phrase "optoelectrical components" as used herein encompasses various types of optics and/or electrical devices used to guide, manipulate, alter, process, etc., light and electrical signals. Individual optoelectrical components may be shared between other components of the system such as the source of the probe light, the optical microcavity, and the detector(s).

As further described below, such optoelectrical components may include one or more PDH servo loops operably coupled to the probe light and the optical microcavity. The systems may further comprise one or more actuators operably coupled to the optical microcavity so as to tune its cavity length L. The systems may further comprise a sample delivery assembly (e.g., a microfluidic device) operably coupled to the optical microcavity and configured to introduce the sample into the cavity. The systems may further comprise the light source, e.g., a laser, configured to generate the probe light Although multiple light sources may be used, in embodiments, the system comprises only a single light source, i.e., that which provides the probe light. The systems may further comprise a second detector. One detector may be configured to detect probe light transmitted from the optical microcavity while another detector may be configured to detect probe light back-reflected from the optical microcavity. The system may further comprise components configured to mechanically stabilize the optical microcavity. e.g., by absorbing or blocking mechanical noise. Such components include optical fiber supports (e.g., ferrules) for fiber-based optical microcavities and floating optics tables.

Figure 2:
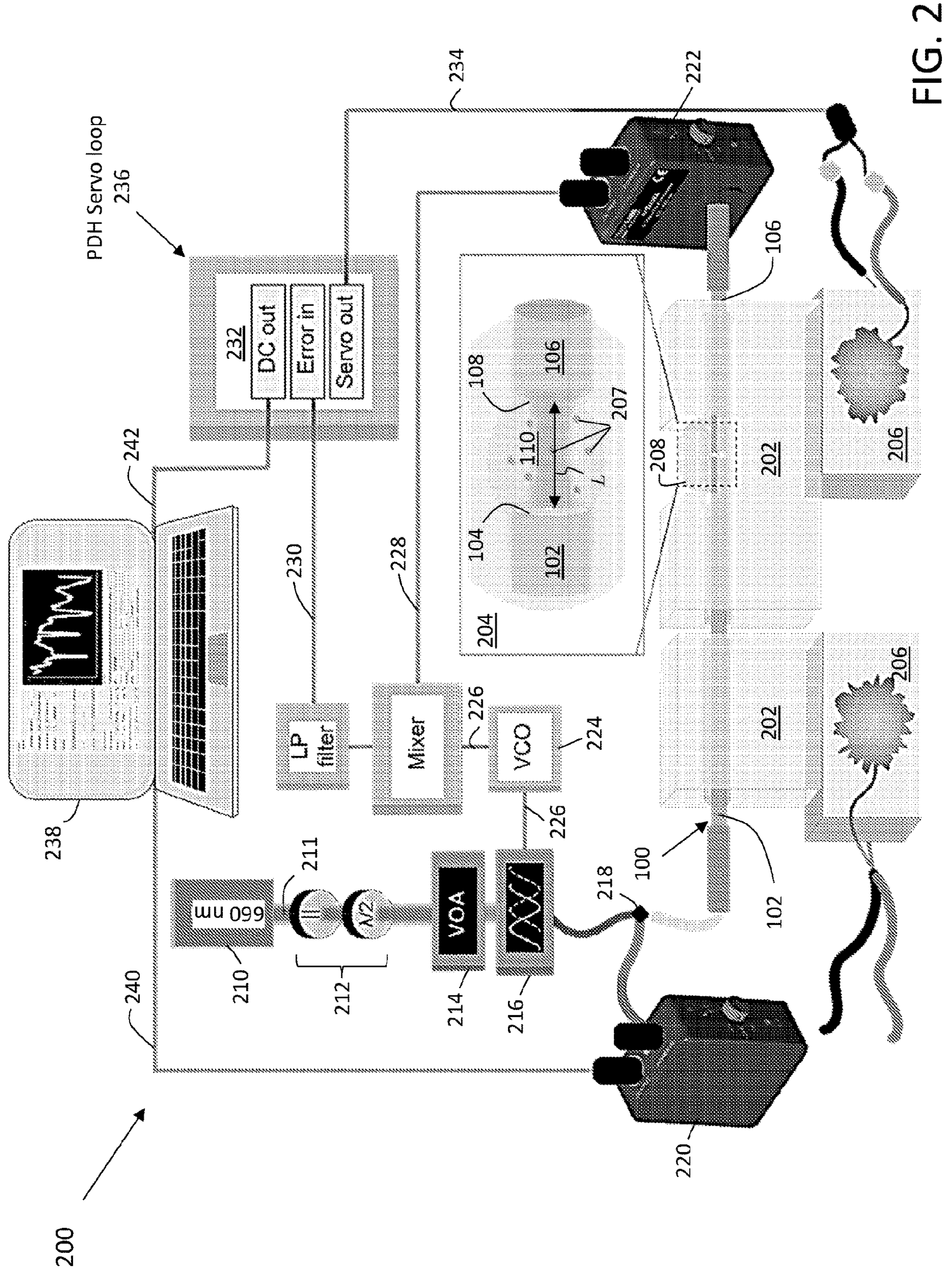
FIG. 2 is a system 200 for carrying out the present methods according to an illustrative embodiment.

FIG. 2 shows a schematic of an illustrative system 200 configured to carry out the present methods. The system 200 comprises the FP microcavity 100 of FIGS. 1A-1B, which comprises the input optical fiber 102 and the output optical fiber 106. The zoomed in box 204 shows the cavity 110 defined by the oppositely facing, spaced apart, reflective end surfaces 104, 108 of the input and output optical fibers 102, 106. In this embodiment, the input and output optical fibers 102, 106 are aligned to promote the fundamental spatial mode of the FP microcavity 100 of FIGS. 1A-1B at the expense of other modes of the FP microcavity 100. To increase passive stability, the input and output optical fibers 102, 106 are supported by glass ferrules 202 defining internal channels into which the input and output optical fibers 102, 106 are inserted. In other embodiments, other supports may be used instead of ferrules. In yet other embodiments, no such supports are required. One or both of the input and output optical fibers 102, 106 remains move-able within its respective ferrule channel. Ceramic piezo-actuators 206 are mounted to the glass ferrules 202 so as to move the input and/or output optical fibers 102, 106 relative to one another, thereby allowing the cavity length L of the FP microcavity 100 to be adjusted. In this embodiment, a sample comprising a liquid medium and diffusing particles 207 is introduced into the cavity 110 by placing a droplet 208 of the sample such that it contacts and fills the cavity 110.

The system 200 further comprises a laser source 210 (in this embodiment, a fixed wavelength laser source) configured to provide the probe light 211. The system 200 further comprises components for manipulating the probe light 211, including polarizers 212, a variable optical attenuator (VOA) 214, and a phase modulator 216. Thus manipulated, the probe light 211 is delivered to the input optical fiber 102 via one or more additional fibers (alternatively, free-space optics may be used). A fiber beam splitter 218 allows for coupling the probe light 211 to the input optical fiber 102. The fiber beam splitter 218 also allows any back-scattered light from the FP microcavity 100 traveling via the input optical fiber 102 to be detected by one of the detectors (detector 220) of the system 200. Light transmitted from the FP microcavity 100, traveling via the output optical fiber 106 is detected by the other of the detectors (detector 222) in the system 200. In this embodiment, both detectors 220, 222 are high bandwidth avalanche photodiodes.

The voltage-controlled oscillator (VCO) 224 produces reference signal 226, that is used to drive the phase modulator 216 to generate phase modulated probe light comprising a carrier frequency and side bands. This same reference signal 226 is also mixed with signal 228 from the detector 222. The mixed signal 230 is input into a proportional-integral derivative (PID) controller 232 to provide an error signal 234 that provides feedback to at least one of the piezo-actuators 206 to allow for adjustment of the cavity length L to satisfy Equation A, above, for a certain probe light wavelength $\lambda$ (here, 660 nm). A low pass passive filter (LP) may be included to suppress high frequency electrical noise. Thus, each of these components in this paragraph, e.g., the phase modulator 216, the VCO 224, the PID controller 232, etc., may be considered to provide the parts of a PDH servo loop 236, operatively coupled to both the probe light 211 and the FP microcavity 110. As further described in the Examples, below, the PDH servo loop 236 is characterized by its PDH offset which may be adjusted (depending upon the selected power of the probe light 211, the selected PDH gain, and the selected optical microcavity) to ensure that probe light transmitted through the FP microcavity 100 is maximized. Thus, the PDH servo loop 236 is configured to achieve and maintain resonance, between the probe light 211 and the FP microcavity 110 during coupling/detection. Modifications to the PDH servo loop 236 or inclusion of another PDH servo loop may be used to allow for adjustment of probe light 211 wavelength t to ensure resonance can be achieved and maintained for a certain cavity length L.

The system 200 further includes a controller 238 configured to control one or more components of the system 200. This may include control of components of the PDH servo loop 236 described above. This may also include displaying and processing signal 240 from the detector 220 as well as signal 242 from the detector 222 of the system 200. Such signals 240, 242 may be recorded by a data acquisition card (DAQ) operating at 50 kHz, which may be part of the controller 238.

More generally, the controller of the system (e.g., controller 238) may be integrated into the system as part of a single device or its functionality may be distributed across one or more devices that are connected to other system components directly or through a network that may be wired or wireless. A database, a data repository for the system, may also be included and operably coupled to the controller.

Figure 3:
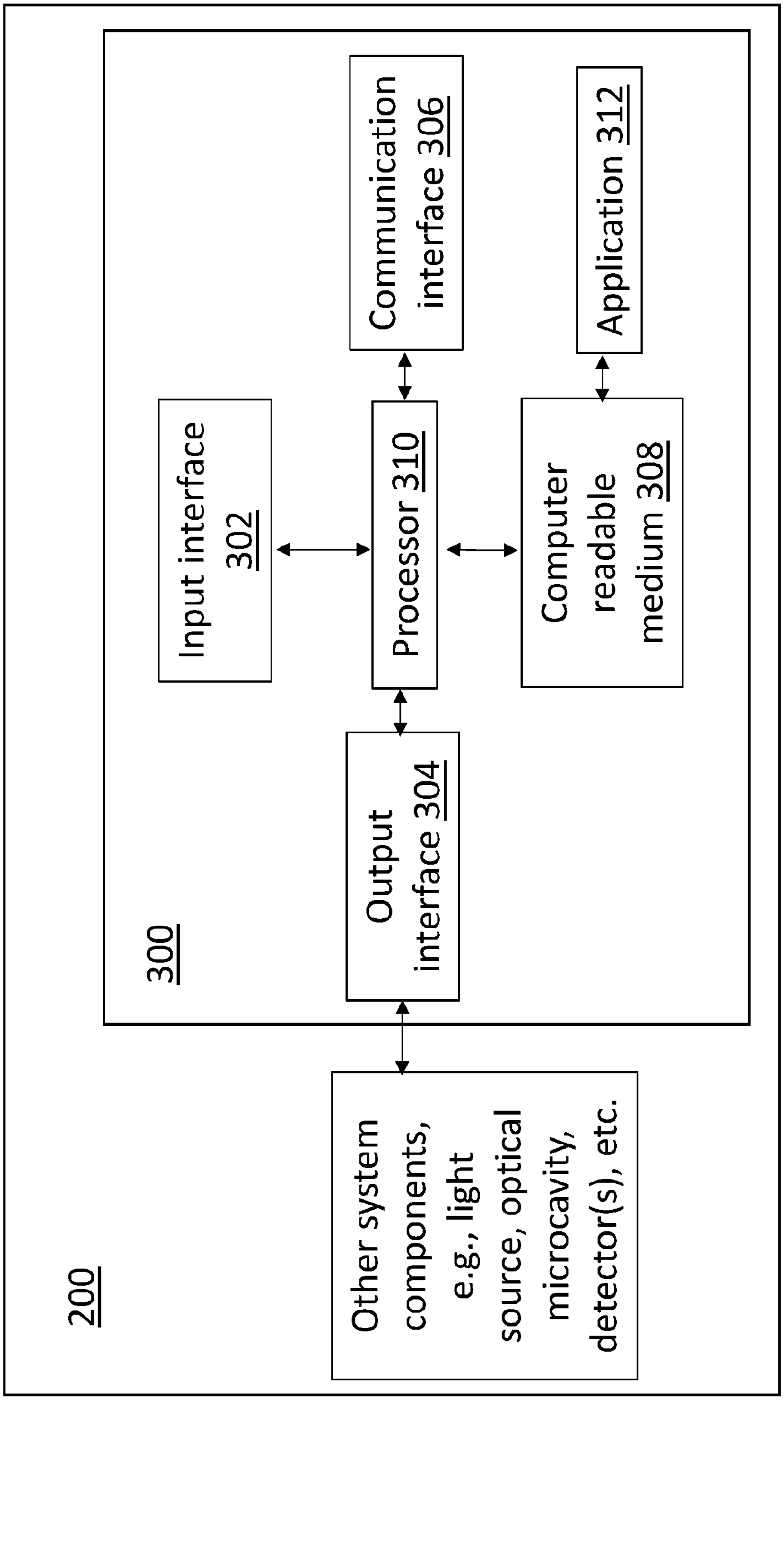
FIG. 3 is a block diagram of the system 200 of FIG. 2.

As shown in the illustrative embodiment of FIG. 3, a controller 300 which may be included in any of the present systems, including system 200, may include an input interface 302, an output interface 304, a communication interface 306, a computer-readable medium 308, a processor 310, and an application 312. The controller 300 may be a computer of any form factor including an electrical circuit board.

The input interface 302 provides an interface for receiving information into the controller 300. Input interface 302 may interface with various input technologies including, e.g., a keyboard, a display, a mouse, a keypad, etc. to allow a user to enter information into the controller 300 or to make selections presented in a user interface displayed on the display. Input interface 302 further may provide the electrical connections that provide connectivity between the controller 300 and other components of the system 200.

The output interface 304 provides an interface for outputting information from the controller 300. For example, output interface 304 may interface with various output technologies including, e.g., the display or a printer for outputting information for review by the user. Output interface 304 may further provide an interface for outputting information to other components 314 of the system 200.

The communication interface 306 provides an interface for receiving and transmitting data between devices using various protocols, transmission technologies, and media. Communication interface 306 may support communication using various transmission media that may be wired or wireless. Data and messages may be transferred between the controller 300, the database, other components of the system 200 and/or other external devices using communication interface 306.

The computer-readable medium 308 is an electronic holding place or storage for information so that the information can be accessed by the processor 310 of the controller 300. Computer-readable medium 308 can include any type of random-access memory (RAM), any type of read only memory (ROM), any type of flash memory, etc. such as magnetic storage devices, optical disks, smart cards, flash memory devices, etc.

The processor 310 executes instructions. The instructions may be carried out by a special purpose computer, logic circuits, or hardware circuits. Thus, the processor 310 may be implemented in hardware, firmware, or any combination of these methods and/or in combination with software. The term "execution" is the process of running an application 312 or the carrying out of the operation called for by an instruction. The instructions may be written using one or more programming language, scripting language, assembly language, etc. Processor 310 executes an instruction, meaning that it performs/controls the operations called for by that instruction. Processor 310 operably couples with the input interface 302, with the output interface 304, with the computer-readable medium 308, and with the communication interface 306 to receive, to send, and to process information. Processor 310 may retrieve a set of instructions from a permanent memory device and copy the instructions in an executable form to a temporary memory device that is generally some form of RAM.

The application 312 performs operations associated with components of the system 200. Some of these operations may include receiving, processing, and/or outputting signals while using the system 200. Other of these operations may include controlling components of the system 200 based on the received, processed, and/or outputted signals. Other of these operations may include receiving and/or processing detector signals generated while using the system 200. This processing may include generating plots from the detector signals and/or extracting information from the plots/detector signals about the diffusing particles being analyzed, including their size, as described above. Other of these operations may include outputting such extracted information, e.g., to a display of the system 200. Some or all of the operations described in the present disclosure may be controlled by instructions embodied in the application 312. The operations may be implemented using hardware, firmware, software, or any combination of these methods. With reference to the illustrative embodiment of FIG. 3, the application 312 is implemented in software (comprised of computer-readable and/or computer-executable instructions) stored in the computer-readable medium 308 and accessible by the processer for execution of the instructions that embody the operations of application 312. The application 312 may be written using one or more programming languages, assembly languages, scripting languages, etc.

It is noted that devices including the processor 310, the computer-readable medium 308 operably coupled to the processor 310, the computer-readable medium 308 having computer-readable instructions stored thereon that, when executed by the processor 310, cause the device to perform any of the operations described above (or various combinations thereof) are encompassed by the disclosure. The computer-readable medium 308 is similarly encompassed.

The systems may further include other components and devices, e.g., a high-performance liquid chromatography (HPLC) device operably coupled to the cavity of the optical microcavity.

Figure 6A:
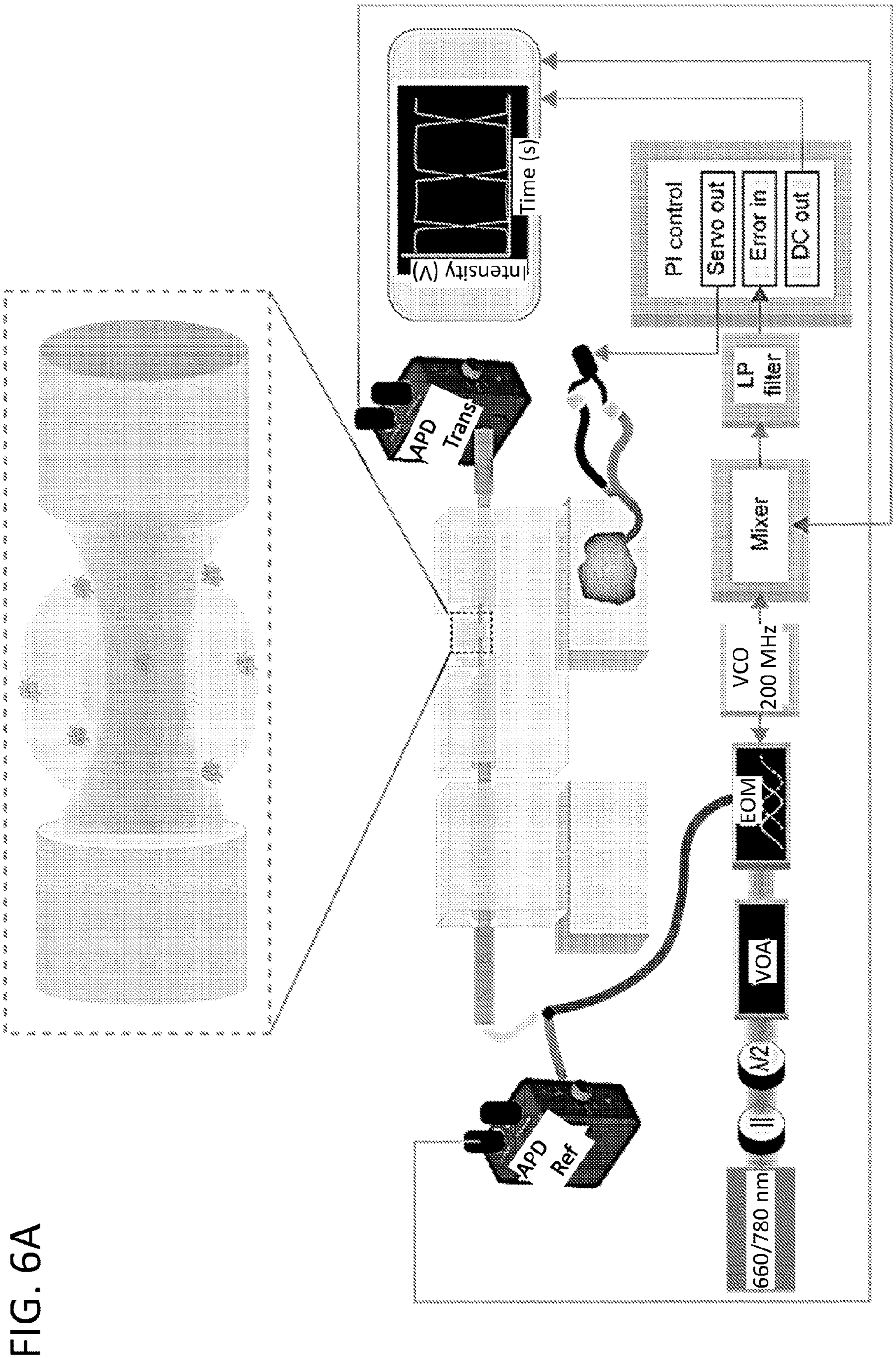
FIG. 6A shows a simplified schematic of the Fiber Fabry-Perot Cavity (FFPC)-based single-molecule sensing instrumentation used in Example 2. Laser light (660-760 nm) of <1 MHz spectral width was passed through a linear polarizer (||) and half-wave plate ($\lambda/2$), selectively attenuated with a variable optical attenuator (VOA), and phase-modulated through a lithium niobate electro-optic modulator (EOM) driven by a 200 MHz voltage-controlled oscillator (VCO). Light was then coupled into the cavity via a fiber splitter, to enable collection of reflected light, and into an input optical fiber with transmitted intensity detected on a photodiode. Pound-Drever-Hall (PDH) cavity-length stabilization, in order to maintain the cavity on resonance with the laser, was achieved using the frequency sidebands generated by the EOM driven by the VCO at 200 MHz. The error signal was generated by applying a low-pass filter to the mixed VCO reference and photodiode signals. This signal was then fed into the proportional-integral (PI) controller, which drives the ceramic piezo actuators to stabilize the cavity length to maintain resonance. Protein diffusion events were monitored in two channels on separate photodiodes, reflection and transmission.

FIG. 6A shows a schematic of another illustrative system configured to carry out the present methods. The system of FIG. 6A is configured similarly to the system 200 of FIG. 2.

Samples may be introduced into any of the present systems (including those shown in FIG. 2 and FIG. 6A) using flow mechanisms, liquid handling, or large reservoirs. This may involve integration of the optical microcavity of the system into a microfluidic device. Such a microfluidic device may include channels (flow paths) configured to facilitate delivery of aqueous or organic solvents. The present systems may also include additional structural features or components, including optical fibers, for facile integration into microfluidic devices. Such microfluidics could be used for rapidly exchanging liquid samples, fast mixing or dilution, and access to reservoirs. The microfluidic devices may be made from glass, quartz, polydimethylsiloxane (PDMS), photopolymerizable materials, or other soft materials. Fabrication of microfluidics devices can be achieved using soft lithography, additive manufacturing (e.g., laser printing and photopolymerization), or etching into hard substrate materials (e.g., glass or quartz).

The present systems may be configured to allow for the cleaning or replacement of optical microcavities, optical fibers, or both.

The present systems may be calibrated using various methods, including internal calibration. Internal calibration may enable absolute determination of sample physical parameters, including size/mass and diffusion constants. An exemplary internal calibration method may rely on applying perturbations to the optical microcavity (e.g., pulsing the cavity length L) to elicit a standardizable response (i.e., resonance shift for a particle of known size/mass and diffusion constant). As noted above, the present systems and the methods may be characterized by a signal-to-noise ratio (SNR) achieved when detecting a diffusing particle of a specific size/mass. (See FIG. 16.) In embodiments, this SNR is at least 75, at least 80, at least 90, at least 100, or at least 120 for a diffusing particle having a molecular weight of no more than 100 kDa, no more than 75 kDa, no more than 50 kDa, no more than 30 kDa, no more than 15 kDa, or nor more than 1 kDa. This includes achieving an SNR range of between any of the values in this paragraph (e.g., from 80 to 130) for a diffusing particle having a molecular weight of between any of the values in this paragraph (e.g., from 1 kDa to 80 kDa).

Figure 10A:
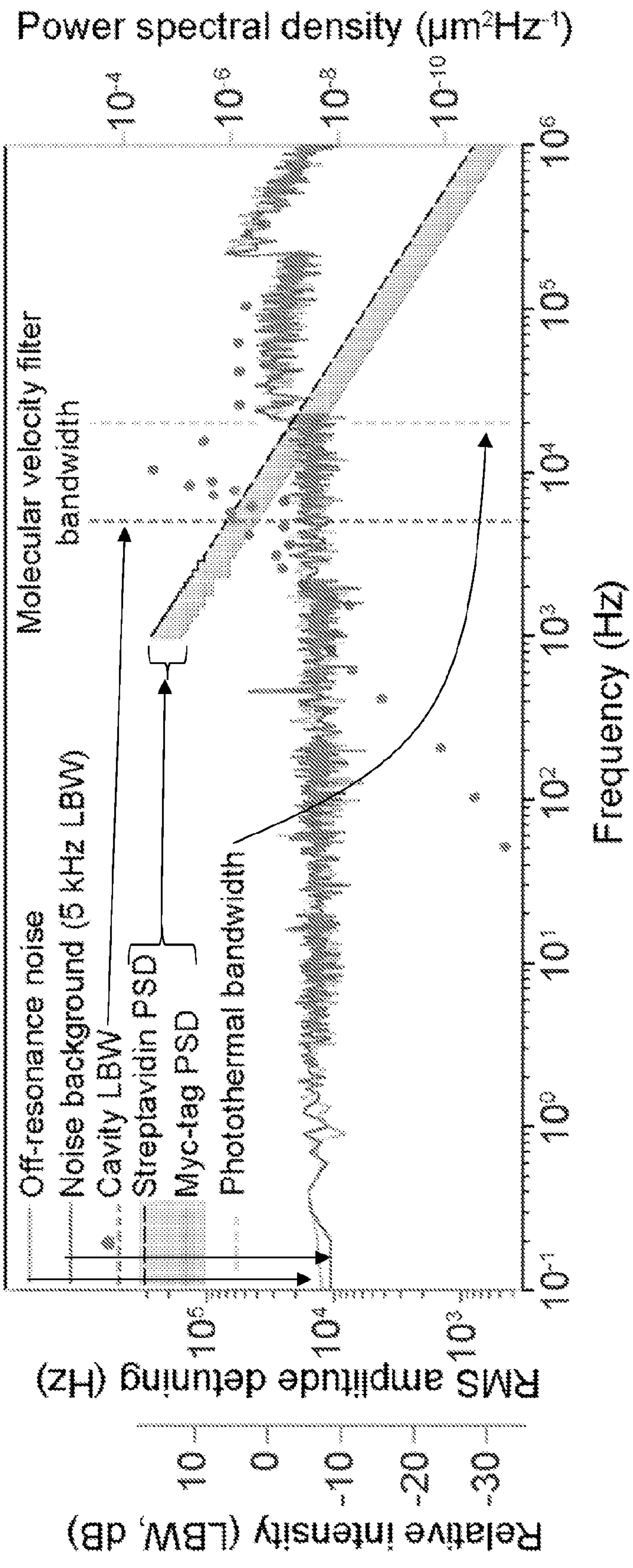
FIG. 10A shows a plot showing frequency noise spectral density in water, locking bandwidth (LBW) characterization, and mean-square-displacement power spectral density (MSDPSD) of proteins (streptavidin, aprotinin, carbonic anhydrase, and Myc-tag). The noise spectral density of the locked cavity in water rapidly converges to the detector-limited noise (off-resonance noise), highlighting the high passive stability. The locking bandwidth of 5 kHz, defined by the 0 dB feedback gain crossing, governs the lower frequency limit of the velocity filter. The upper limit of the velocity filter is defined by the photothermal bandwidth (21 kHz). The molecular MSDPSD can be integrated within this filter bandwidth to determine the root-mean-square MSD.
Figure 10B:
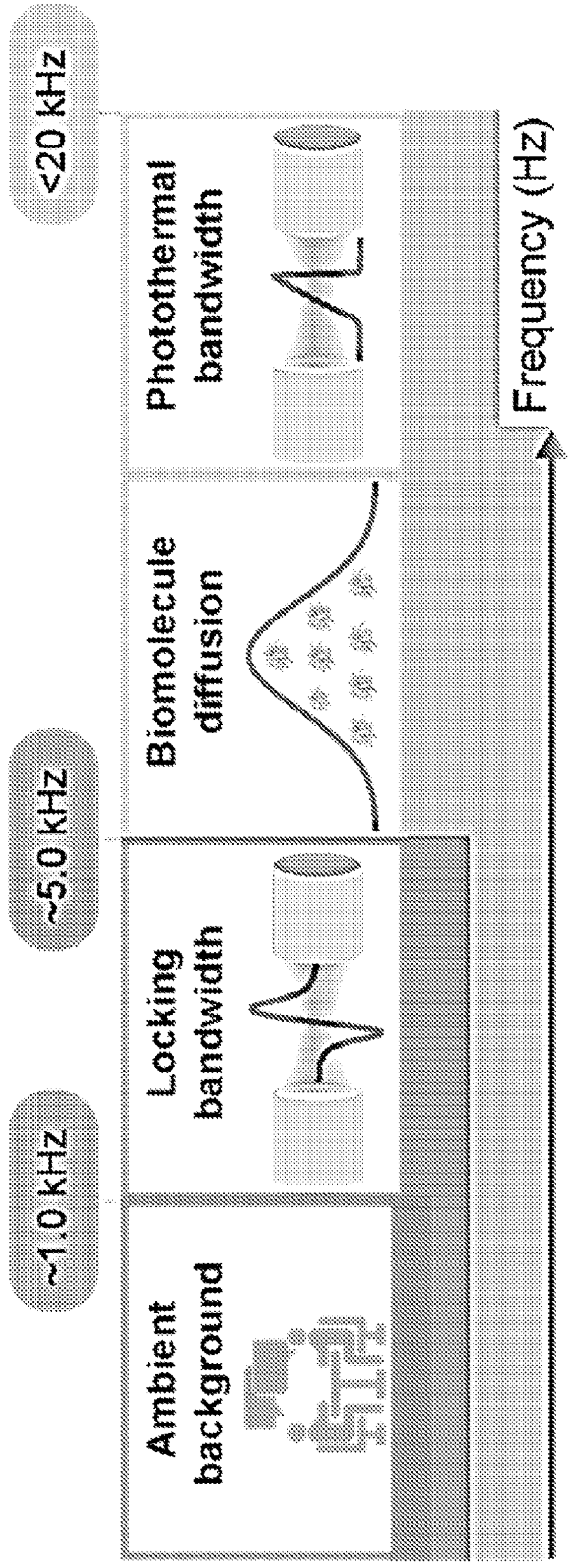
FIG. 10B shows a cartoon illustrating the key processes and their frequency bandwidths. Noise below 5 kHz is suppressed by the PDH. The upper limit of the LBW and the lower limit of the photothermal bandwidth define the molecular diffusion velocity observation window.

FIGS. 10A and 10B further illustrate that the PDH servo loop 236 of system 200 (FIG. 2) and that of the system shown in FIG. 6A are each configured as a high-pass filter that suppresses frequencies below its respective locking bandwidth (LBW), enabling detection of a higher frequency perturbations due to diffusing particles. The photothermal bandwidth (PBW), which depends upon the materials of the optical microcavity and the medium therein, sets an upper frequency limit. Together, the LBW and the PBW determine the range of detectable frequencies, and thus, the bandwidth of each system (which may be referred to as a "molecular velocity filter"). Because the LBW and the PBW are tunable (e.g., via the PDH servo loop (LBW) and the optical microcavity and the medium therein (PBW)), the bandwidth of the molecular velocity filters are also tunable.

The present systems may be adjusted to improve or change performance, sensitivity, and dynamic range. An exemplary method for adjusting the performance includes changing the frequency and bandwidth of the molecular velocity filter, which could be enabled via a proportional-integral derivative (PID) controller or by altering the thermooptic coefficient. An exemplary method for changing the sensitivity and the dynamic range of the system includes changing the input laser power, coupling efficiency, thermooptic coefficient, cavity Finesse, and cavity length.

Illustrative embodiments of the present methods and systems are provided below.

In an embodiment 1, a method for detecting diffusing particles comprises (a) introducing a sample comprising a diffusing particle into a cavity of an optical microcavity; (b) coupling probe light into the optical microcavity such that the probe light is in resonance with the optical microcavity, wherein the diffusing particle diffuses into an optical mode volume defined by the coupled probe light in the cavity; and (c) detecting output light from the optical microcavity as a function of time while maintaining resonance, wherein the diffusing particle generates a change the detected output light.

An embodiment 2 is the method of embodiment 1, wherein the optical microcavity is a Fabry-Perot microcavity. An embodiment 3 is the method of any of embodiments 1-2, wherein resonance is achieved by satisfying $m\lambda=2\ nL$, wherein m is an integer, $\lambda$ is the probe light wavelength, n is the sample's refractive index, and L is the optical microcavity cavity length. And embodiment 4 is the method of embodiment 3, further comprising adjusting $\lambda$, adjusting L, or both during step (c) to maintain resonance. An embodiment 5 is the method of any of embodiments 1-4, wherein the probe light is in resonance with a fundamental spatial mode of the optical microcavity. An embodiment 6 is the method of any of embodiments 1-5, wherein the sample has a concentration of diffusing particles such that a probability of the diffusing particle occupying the optical mode volume is less than one. An embodiment 7 is the method of any of embodiments 1-6, further comprising analyzing the detected output light to calculate a hydrodynamic radius of the diffusing particle. An embodiment 8 is the method of embodiment 7, wherein the diffusing particle has a hydrodynamic radius of less than 10 nm. An embodiment 9 is the method of any of embodiments 1-8 wherein the detected output light is transmitted probe light comprising dips or the detected output light is back-reflected probe light comprising spikes and the method further comprises measuring a full-width at half maximum (FWHM) of each of the dips or the spikes and calculating a hydrodynamic radius from the measured FWHM. An embodiment 10 is the method of any of embodiments 1-8, wherein the detected output light is transmitted probe light comprising dips or the detected output light is back-reflected probe light comprising spikes and the method further comprises measuring an autocorrelation function (ACF) from the dips or the spikes and calculating a hydrodynamic radius from the measured ACF.

In an embodiment 11, a system for detecting diffusing particles comprises: (a) optoelectrical components configured to couple probe light into an optical microcavity defining a cavity such that the probe light is in resonance with the optical microcavity; (b) the optical microcavity defining the cavity into which a sample comprising a diffusing particle may be introduced to diffuse into an optical mode volume defined by the coupled probe light; (c) a detector configured to detect output light from the optical microcavity as a function of time; and (d) optoelectrical components configured to maintain resonance while using the detector to detect output light from the optical microcavity as a function of time.

An embodiment 12 is the system of embodiment 11, wherein the optical microcavity is a Fabry-Perot microcavity. An embodiment 13 is the system of any of embodiments 11-12, wherein the optoelectrical components (d) provide a Pound-Drever-Hall (PDH) servo loop coupled to a source of the probe light and the optical microcavity. An embodiment 14 is the system of any of embodiments 11-13, further comprising an actuator operably coupled to the optical microcavity and configured to adjust a cavity length L of the optical microcavity. An embodiment 15 is the system of embodiment 14, wherein the PDH servo loop is coupled to the actuator. An embodiment 16 is the system of any of embodiments 11-15, wherein the system does not comprise optoelectrical components associated with any other source of light other than a source of the probe light. An embodiment 17 is the system of any of embodiments 11-16, wherein the optical microcavity is non-adsorbent with respect to the diffusing particles. An embodiment 18 is the system of any of embodiments 11-17, further comprising a controller comprising a processor and a non-transitory computer-readable medium operably coupled to the processor, the non-transitory computer-readable medium comprising instructions, that, when executed by the processor, cause the controller to perform operations comprising: receiving a signal from the detector, processing the signal to calculate a hydrodynamic radius of the diffusing particle; and outputting the calculated hydrodynamic radius to the system.

EXAMPLES

Example 1

The system 200 of FIG. 2 was built and then used to analyze samples containing different proteins, including streptavidin (a tetrameric protein having a mass of 66 kDa and a diameter of 5 nm); carbonic anhydrase (an enzyme having a mass of 30 kDa and a diameter of 4.6 nm); aprotinin (a globular polypeptide having a mass of 6.5 kDa and a diameter of 2.7 nm); and c-Myc (a peptide having a mass of 1.2 kDa and a diameter of 0.75 nm).

Individual samples were prepared by dispersing the molecules in water at concentrations sufficiently low to ensure that the probability of a single molecule occupying the optical mode volume was less than 1.

Experiments were carried out by placing a droplet of an individual sample in the cavity of the FP microcavity 100. The probe light 211 was coupled into the FP microcavity 100 such that it was in resonance with the fundamental spatial mode of the FP microcavity 100 (as ensured by the PDH servo loop 236). The output light was detected as a function of time using detector 222 (which detects probe light 112 transmitted via the output optical fiber 106) while maintaining resonance (as ensured by the PDH servo loop 236). FIGS. 4A-4C show illustrative plots of signal from the detector 222 as a function of time for each sample (FIG. 4A, streptavidin; FIG. 4B, carbonic anhydrase; and FIG. 4C, aprotinin). These results demonstrate the ability of the present methods and systems to detect diffusion events from single protein molecules having extremely small sizes (e.g., only a few nm). In the plots of FIGS. 4A-4C, the diffusion events appear as dips in the transmitted probe light. The output light was also detected as a function of time using detector 220 (which detects probe light 112 back-reflected via the input optical fiber 102. In those plots (not shown), the diffusion events appear as spikes.

Figure 5A:
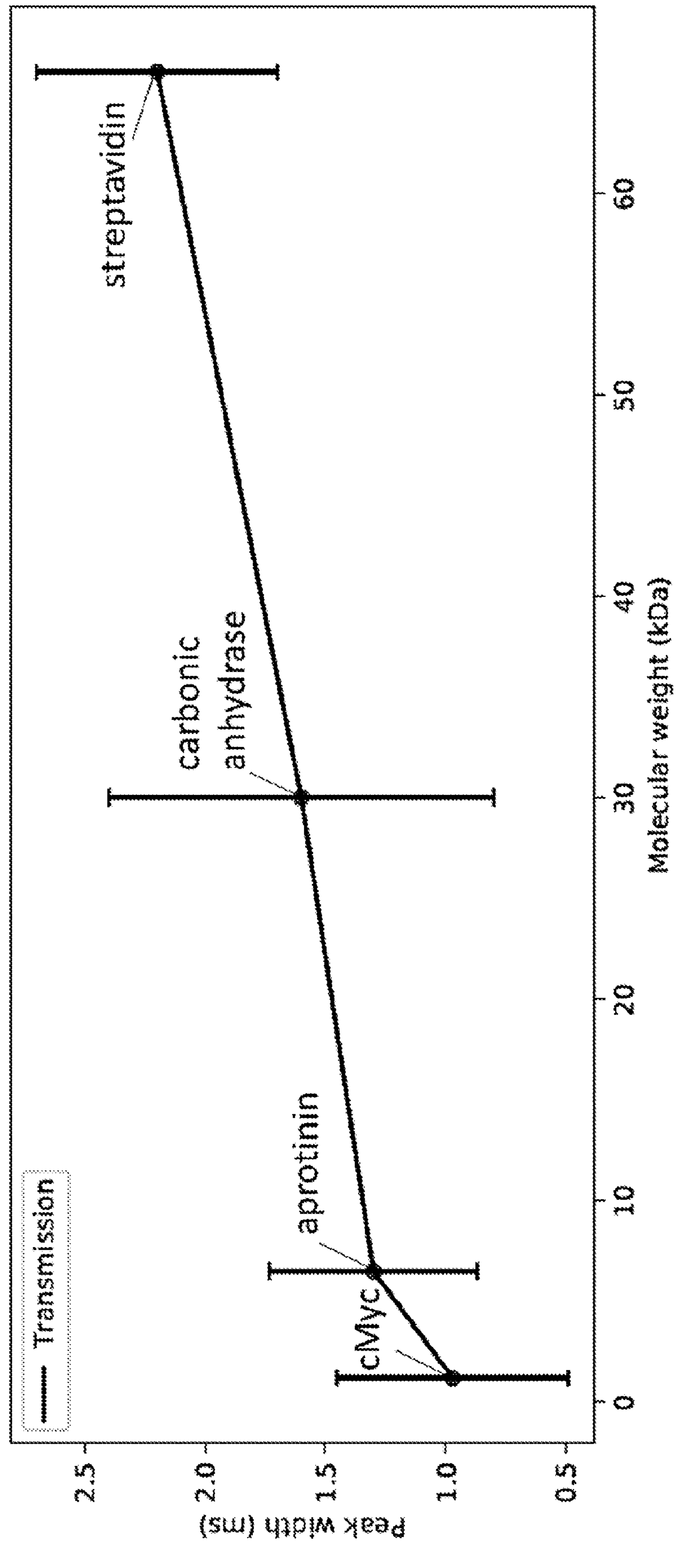
FIG. 5A shows a plot of the average full width half maximum (FWHM) of the dips as measured from each respective plot of FIGS. 4A-4C and another plot obtained from a sample comprising the protein c-Myc.
Figure 5B:
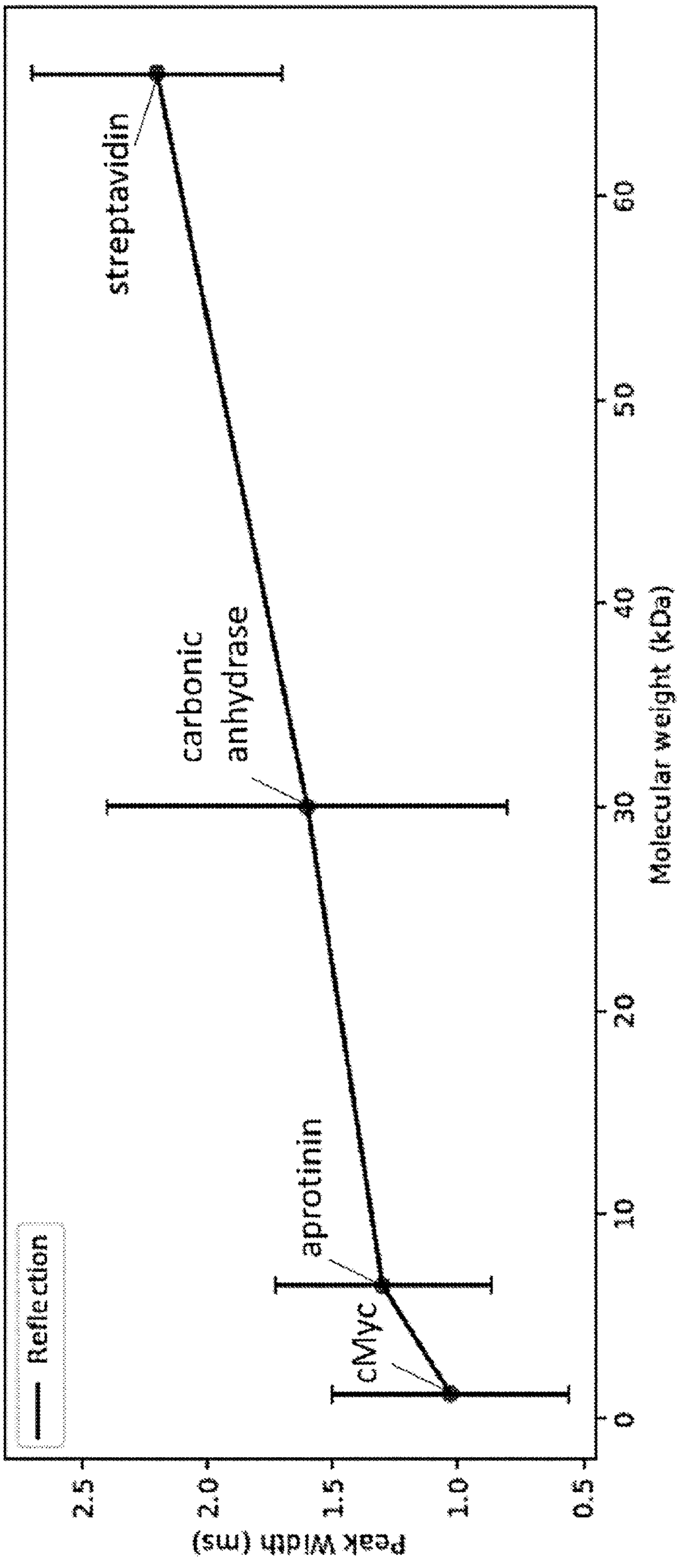
FIG. 5B is a plot of the average FWHM of spikes as measured from the analogous plots obtained from detector 220, which detects back-reflected probe light.

Moreover, as shown in FIGS. 5A and 5B, differences in mass, and consequently differences in hydrodynamic radius, are resolvable using system 200. Specifically. FIG. 5A is a plot of the average FWHM of the dips as measured from each respective plot of FIGS. 4A-4C and another plot obtained from a sample comprising the protein c-Myc. FIG. 5B is a plot of the average FWHM of the spikes as measured from the corresponding plots obtained from detector 220.

Example 2

Introduction

Tools to measure the properties of individual molecules, including in heterogenous solutions, have become cornerstones of modern molecular and biomolecular research. Nearly all single-molecule approaches use extrinsic labels, and while these labels provide important contrast and specificity, the dye labeling procedures are arduous as well as perturb the native functionality of biomolecules. Most single-molecule approaches, including all current label-free methods, also rely on surfaces for immobilization, which is a costly compromise, as the measurement may bias detection towards sub-populations in mixed samples, disrupt native molecular interactions, alter dynamics, and generally precludes quantifying valuable solution-phase properties such as the diffusion constant.

In this Example, the increased light-molecule interactions in high-finesse fiber Fabry-Pérot microcavities were used to detect individual biomolecules as small as 1.2 kDa with signal-to-noise ratios >100, even as the molecules were freely diffusing in solution. The method described herein delivers 2D intensity and temporal profiles, enabling the distinction of sub-populations in mixed samples. Strikingly, a linear relationship was observed between passage time and molecular radius, enabling the ability to gather crucial additional information about diffusion and solution-phase conformation. Furthermore, mixtures of biomolecule isomers of the same molecular weight could also be resolved. Detection is based on a novel molecular velocity filtering and dynamic thermal priming mechanism leveraging both photo-thermal bistability and Pound-Drever-Hall cavity locking. The results presented below were achieved in the absence of external surface-based signal multipliers like plasmonic enhancement and included the highest SNR reported for label-free single-molecule sensing by a substantial margin. Most importantly, the method operated without interaction with surfaces, allowing interrogation of unperturbed label-free solution-phase molecules and evaluation of molecular diffusion profiles, a carrier of key information on biomolecule conformation and binding. The present technology has broad applications in life and chemical sciences and represents a major advancement in label-free in vitro single-molecule techniques.

Materials and Methods

Experimental Setup

Mirrored Fiber Production

Copper-coated optical fiber with cladding diameter of 125 μm (IVG Fiber, Cu600) was first etched using nitric acid (70%). This etching procedure removed the copper coating, leaving a layer of carbon coating above the cladding. The carbon coating was removed with a small amount of diamond paste on cloth, however, this step was removed for later fiber production due to apparent contamination from the diamond paste. Fibers were flat-cleaved (<0.2-1°) using an automated cleaver (AFL Fujikura, CT-106).

An 18 W $CO_2$ laser (Synrad, 48-1 KAM) generated the ablation laser beam, which was guided and modified with polarizing, phase retarding, and other associated reflecting and ZnSe focusing optics. An arbitrary waveform generator (Agilent, 33220A) controlled the beam characteristics, and a digital optical power meter head (Thorlabs, S314C) with an attached console (Thorlabs, PM100D) was used to measure the beam power. Optical fiber substrates were mounted atop a fiber clamp (Thorlabs, HFF003), which rested upon a 3-axis translation system (Thorlabs, MTS50-Z8; MTS50B-Z8; MTS50C-Z8), driven by a DC servo motor controller (Thorlabs, KDC101) secured to a long-range single-axis translator for inspection-ablation positioning (Thorlabs. LNR502(/M)) driven by a motor controller (Thorlabs, BSC201). A CCD camera (Thorlabs, CS165MU) coupled to along working-distance microscope system (Navitar, 160-10) with a 20× magnification, 0.42 NA infinity corrected objective (Mitutoyo, 378-804-3) illuminated by a 635 nm LED source (Thorlabs, LEDD1B), was used to image the fiber position. Optimal ablation alignment was facilitated by illuminating the fiber core with an optical fault finder (VFLTOOL, HGB30). The laser was set to have a power of 0.28 W, and a shot time of 250 ms was controlled using a shutter in front of the fiber. These shot parameters generated fibers with radii of curvature (ROC) at the base of the ablation of 48 μm on average, and diameters, calculated by 2-σ of a Gaussian fit to the ablation profile, of 21 μm on average (interferometry profiles and resulting 2D depth profiles obtained, but not shown).

The fibers were characterized with a ZYGO Interferometer. Two perpendicular slices of the surface profile were analyzed. For calculating the ROC, the center of the ablation was assumed to be the minimum. A polynomial fit was then performed, and stepwise derivatives were averaged to calculate the ROC. For the diameter, Gaussian fitting was performed, and the diameter was taken to be two standard deviations of the fit. The ellipticity of the ablation was calculated by comparing both the ROC and the diameter values for the perpendicular slices. The decentration of the ablation was also measured by coupling the fault finder through the core of the fiber, which was then compared to the center of the ablation. The decentration, ROC, diameter, and ellipticity were all used to determine the viability of a fiber.

The fiber substrates were coated commercially with wavelengths of maximum reflectivity at either 635 nm (LASEROPTIK GmbH. Germany) or 780 nm (LAYERTEC GmbH. Germany), in which alternating layers of $Ta_2O_5$ and $SiO_2$ were deposited using ion beam sputtering (IBS). These generated distributed Bragg reflector surfaces with transmission loss <20 ppm, absorption loss <10 ppm and scattering loss <16 ppm.

Ferrule-Assembly Preparation

The cavity bridge assembly was prepared using fused silica ferrules (VitroCom, 8-1.25-1.25 mm) with an inner bore of 131 μm. The glass ferrule was cleaned using an air plasma cleaner (Harrick Plasma, PDC-001-HP) for 10 minutes. A thin layer of UV-curable glue (Dymax, 9037-F) was placed on two 150 V piezos (Thorlabs, PA4DG), which were aligned flat to the ferrule, ensuring that the direction of translation was aligned with the long axis of the ferrule. The glue was then cured using a UV light (Rolence Enterprise, Q6 UV). The assembly of ferrule and two piezos was then affixed to a glass block, which was approximately 20×7×3 mm in dimension. This assembly was then placed in an oven at 65-75 °C for 2-3 hours for additional curing of the glue. After this, wires were soldered onto the piezos. Two cuts were made in the ferrule in order to facilitate translation of the cavity length: one full-cut to separate the ferrule into two parts, maximizing the cavity length translation, and one half-cut to preserve fiber alignment along the inner bore. These cuts were made using diamond wire (Ø=125 μm) secured in a jeweler's saw. The full-cut was made off center and the half-cut was made close to the center of the ferrule. After the full-cut, a small piece of wire was placed in the bore to alert when the cut had reached the bore. During the cutting process the glass dust was removed using canned air.

The ferrule was cleaned post-cutting by first running the ferrule under deionized water for 5 minutes. Using a digital microscope to visualize, Millipore water was pipetted through the bore of the ferrule and a piece of optical fiber was run through the bore to remove any remaining glass dust. This process was repeated until no visible dust remained. The ferrule was then rinsed under Millipore water and few drops of methanol (≥99.9%) were run through the ferrule, which was then dried thoroughly using a nitrogen gas line.

Fiber Cavity Construction

The previously described high reflectivity, mirror coated optical fibers were spliced to a connectorized patch cable (Thorlabs, P3-630Y-FC-2) using a fusion splicer (Fujikura, FSM-100P). The fibers were aligned using a 6-axis piezo actuated stage (Thorlabs, MAX602D). The input fiber was mounted to this stage using a tapered v-groove fiber holder (Thorlabs, HFV002). The output fiber was held by a v-groove fiber holder secured to an XYZ translation stage. To visually align the fibers, two cameras were aligned perpendicular to the fiber axis. The top-down view used a CMOS camera (Thorlabs, DCC1545M) connected to a zoom lens (Navitar, 1-50487). This imaging system was used for both alignment and to estimate the distance between the fibers. The second perpendicular axis was visualized using a digital microscope (Dino-Lite, AM4113ZT). Using both camera axes, the fibers were then coarsely aligned to one another visually using the 6-axis stage. The next step was to finely align the fibers by recording resonances. To do this, a ramp signal from a data acquisition board (DAQ, NI, BNC-2120) was applied to a piezo controller (Thorlabs, MDT693B), which drove the piezo aligned with the fiber axis. Laser light (635-760 nm) was then injected into the input fiber and collected through the output fiber to an avalanche photodiode (APD, Thorlabs. APD430A). Resonances were measured in transmission and optimized by adjusting all parameters of the 6-axis stage. The cavity finesse was characterized by either using a wavelength tunable external cavity diode laser (Newport, TLB-6704) or via an electro-optic phase-modulator (EOM, EOSpace. PM-0S5-10-PFA-PFA-633, PM-0S5-01-PFA-PFA-765/781) by introducing sidebands at a known frequency (2.6 GHz) and the linewidth extracted via Lorentzian fitting.

The fibers were guided into the prepared ferrule using the top-down and perpendicular views and the cavity formed at the center of the half-cut. In order to secure the fibers inside the ferrule, 2 μL of low viscosity UV-curable glue (Masterbond, UV16) was deposited onto each fiber in turn at the left entrance of the non-slotted ferrule and the right entrance of the slotted ferrule. The glue was drawn up the fiber using capillary action and was UV-cured (Rolence Enterprise, Q6 UV) after ~2 mm of travel into the ferrule. The piezos on the bridge were then attached to a piezo driver (nPoint, D.200) and driven to assess the resonances under constant cavity translation.

Optical Setup

Experiments were performed on a custom-built setup (see FIG. 6A). Either a single-frequency, continuous-wave diode laser (660 nm, Cobolt Flamenco, 90261, 300 mW) of <1 MHz linewidth or a tunable Ti-Saph cavity laser of <100 kHz linewidth operating at a single frequency (760 or 780 nm, MSquared, SolsTiS) was passed through a linear polarizer and half wave-plate then fiber coupled into an electronic variable optical attenuator (Tborlabs. V600), then into an EOM (EOSpace, PM-0S5-10-PFA-PFA-633, PM-0S5-01-PFA-PFA-765/781) driven by a voltage-controlled oscillator (VCO, Mini-Circuits, ZX95-209-S+, 200 MHz). The light was then coupled into the input fiber of the cavity via a fiber-based beam splitter (Thorlabs, TW670R3A1), the power injected into the cavity was between 5-35 μW. The circulating power ($P_{circ}$) was calculated using Equation 1:

$$P_{circ} = P_{in} T \left( \frac{F^2}{\pi^2} \right) \quad \text{Equation 1}$$

where $P_{in}$ is the input power, η is the mode matching overlap integral. T is the transmission loss of the mirror coating (10 ppm) and F is the cavity finesse. This expression is valid for cavity systems influenced by absorption losses. The remaining path of the splitter was collimated and then focused (Thorlabs, C560TME-B) onto the active area of an APD (Thorlabs. APD430A) enabling collection of reflected resonance light. The reflected signal voltage was sent to a DAQ board (NI, BNC-2120) and monitored using custom software. The transmitted light was collected through the output fiber of the cavity, collimated and focused (Thorlabs. C560TME-B) onto the active area of an APD (Thorlabs, APD430A). The transmitted signal voltage was sent to a diplexer (Mini-Circuits. ZDPLX-2150-S+), the low frequency component (DC-10 MHz) was then directed to the DAQ board (NI, BNC-2120) in order to monitor the transmitted signal. The high-frequency component (50-2150 MHz) was amplified and sent to a frequency mixer (Mini-Circuits. ZP-IMH-S+) in which it was multiplied by the sinusoidal signal of the VCO under a homodyne detection scheme. The resulting frequency components were low-pass filtered (Mini-Circuits, SLP-1.9+) to extract the DC error-signal and directed to the error input of the Pound-Drever-Hall lockbox (PDH, Vescent, D2-125). The locking feedback was supplied to the piezos driving the cavity length via the servo output of the PDH lockbox.

Hardware Control and Data Collection Software

Experiments were performed using code written in-lab using Python 3 to handle both instrument control and data collection. The code interfaced with a DAQ board (NI, BNC-2120) and oscilloscope (Rigol, DS 1104). For DAQ and oscilloscope connections, control was established using the PyLabLib package published under the GPL-3.0 license (doi.org/10.5281/zenodo.7324876). The control code was written together with a graphical user interface (GUI) to streamline user control. The GUI and interactable elements of the program use the Qt framework through PySide2 bindings under the GPLv2 license. A copy of the control software is available for free use under the GPLv3 license at https://github.com/FairhallAlex/ces_tools.

Sample Preparation

Lyophilized Streptavidin (MilliporeSigma, 189730), Carbonic anhydrase (MP Biomedicals, 0215387910), Aprotinin (MilliporeSigma. A6106) and c-Myc peptide (MilliporeSigma, M2435) were dissolved to 1 $mgml^{-1}$ in phosphate buffered saline (pH 7.4), aliquoted to appropriate volumes and stored at −20 °C. For experimentation, samples were thawed on ice and diluted to the working concentration (0.25 pM-15 pM) in filtered (Ø=20 nm, Whatman Anotop, WHA68091002) ultrapure Millipore water (18 MΩ, pH 7). To ensure that the measurements would be at the single-molecule level, the optical mode volume was calculated to host an average of 0.7 molecules at the highest working concentration (15 pM).

DNA sequences for each construct were manually designed and validated by NUPACK (www.nupack.org). Commercially available oligonucleotides (Integrated DNA Technologies. Error! Reference source not found.) were purchased and used without purification. To assemble each structure, corresponding DNA strands (5 μM) were mixed in folding buffer (25 mM HEPES, 100 mM KCl, 10 mM MgCl2, pH 7.4), then annealed in a PCR thermo-cycler (Bio-Rad) by a linear cooling step from 95 °C to 20 °C over 2 hours (−0.1 °C per 10 second). The products were further purified by a size-exclusion chromatography column (Superdex 200 increase 10/300) on a ÄKTA pure system (Cytiva), to remove extra strand and potential aggregates. The final concentration of each construct was determined by Nanodrop (Thermo Fisher Scientific). Samples were stored at 4 °C for less than 1 month before use.

Table 1. DNA Structures and Sequences

| Structure | Sequence |
| --- | --- |
|  | TGGAGAGAATCGGTCACAGTACAACCG (top)<br>CGGTTGTACTGTGACCGATTCTCTCCA (bottom) |
|  | TGGAGAGAATCGGTCACA (bottom right)<br>GTACAACCGTTCTCTCCA (top right)<br>TGTGACCGACGGTTGTAC (left) |

Experimental Data Collection

Single Biomolecule Diffusion Experiments

Prior to introducing proteins, filtered (Ø=20 nm, Whatman Anotop. WHA68091002) MilliQ water (8 μL) was added to the cavity. The input power in the cavity was controlled with an applied voltage to the VOA (Thorlabs, V600A) to ensure consistent power was used for all comparable experiments. The fundamental transmitted cavity mode was found under active cavity length translation and PDH locked with a proportional gain of −40 dB. The locked position was tuned to the maximum possible transmission using the relative voltage offset on the lockbox (Vescent, D2-125). If spurious events were detected during the lock, the cavity was unlocked and cleaned under a flow of filtered MilliQ water and dried with $N_2$. This process was repeated after protein experiments to ensure the cavity was clean. The transmitted and reflected signals were monitored as a function of time at either 50 kHz or 500 kHz acquisition frequency. Intensity-time traces containing single-molecule events were saved as .csv files every 30 seconds using the custom software described above. Water control experiments were continued until 5 minutes of data in the absence of a spurious signal was collected.

Solutions of proteins (either Streptavidin. Carbonic Anhydrase, Aprotinin or Myc-tag, 0.2-15 pM, 8 μL) or DNA (8 μL, 10 pM) in filtered MilliQ water were introduced into the cavity. The input power in the cavity was controlled with an applied voltage to the VOA to ensure consistent power was used for all comparable experiments. The fundamental cavity mode was found under active cavity length translation and PDH locked with a proportional gain of −40 dB. The transmitted and reflected signals were monitored as a function of time at either 50 kHz or 500 kHz acquisition frequency. Intensity-time traces containing single-molecule events were saved as .csv files every 30 seconds using the custom software described above.

Locking Bandwidth Characterization

Figure 11:
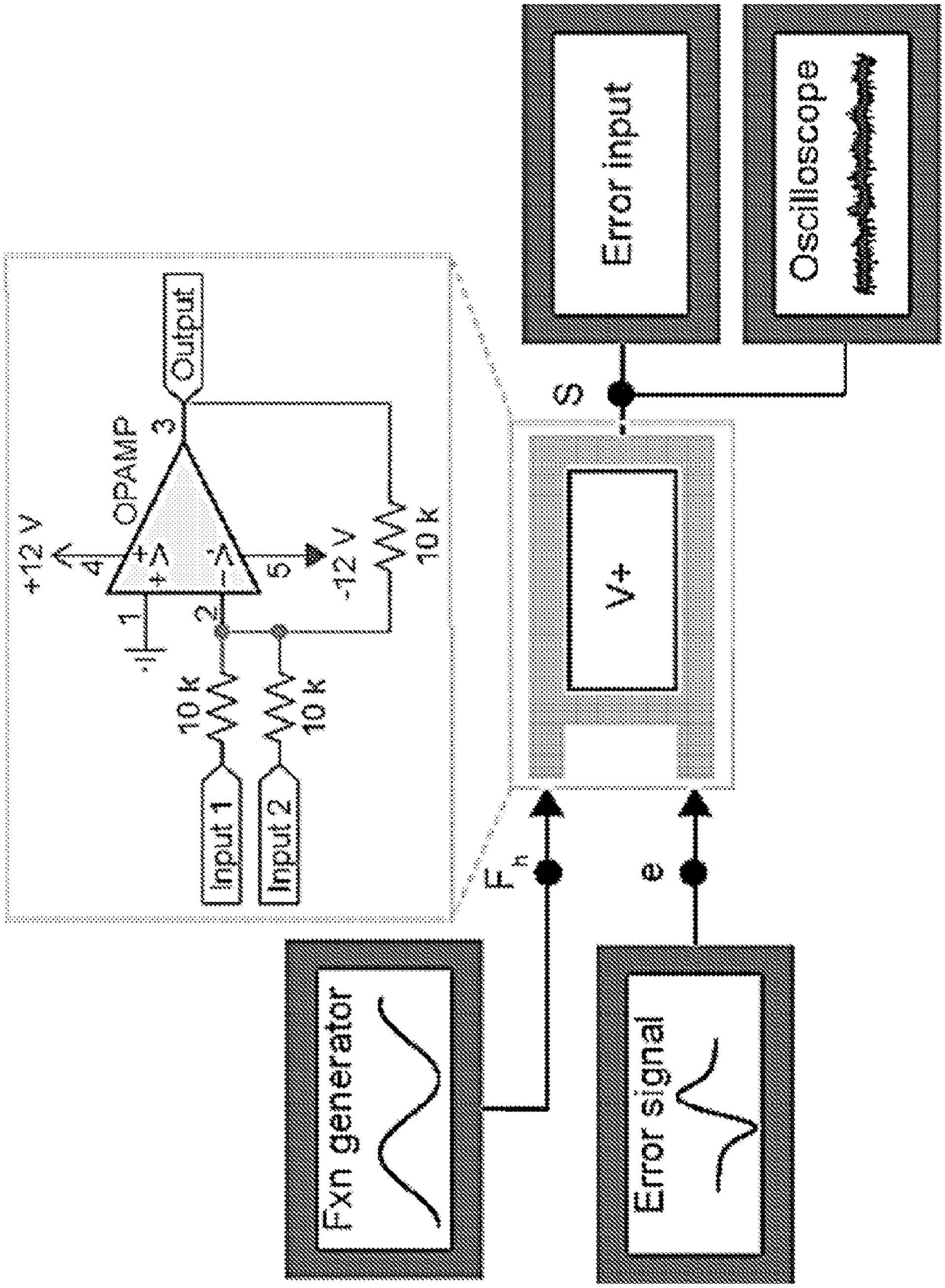
FIG. 11 shows a schematic of the system used to measure the locking bandwidth (LBW) of the cavity used in Example 2, which was measured by adding a harmonic perturbation (Fh) from the function generator (Fxn generator) of known frequency and amplitude together with the error signal (e) using a voltage adder (V+) to the PI input (error input).

The locking bandwidth (LBW) of the cavity was measured by adding a harmonic perturbation ($F_h$) of known frequency and amplitude together with the error signal (e) using a voltage adder to the PI input (see FIG. 11). To maintain a linear relationship between the voltage of the error signal during locking and the frequency detuning of the cavity, the amplitude of the perturbation was optimized to 0.2× the peak-to-peak amplitude of the error signal. While the cavity was locked, the sum of the perturbation signal and the error signal for different frequencies of the perturbation signal were registered. This allowed for the measurement of the frequency at which the lock ceased to be effective at compensating for the perturbation to the system to determine the 0 dB gain value and thus the LBW of ~5 kHz (see FIG. 10A).

Noise Background Experiments

Figure 12:
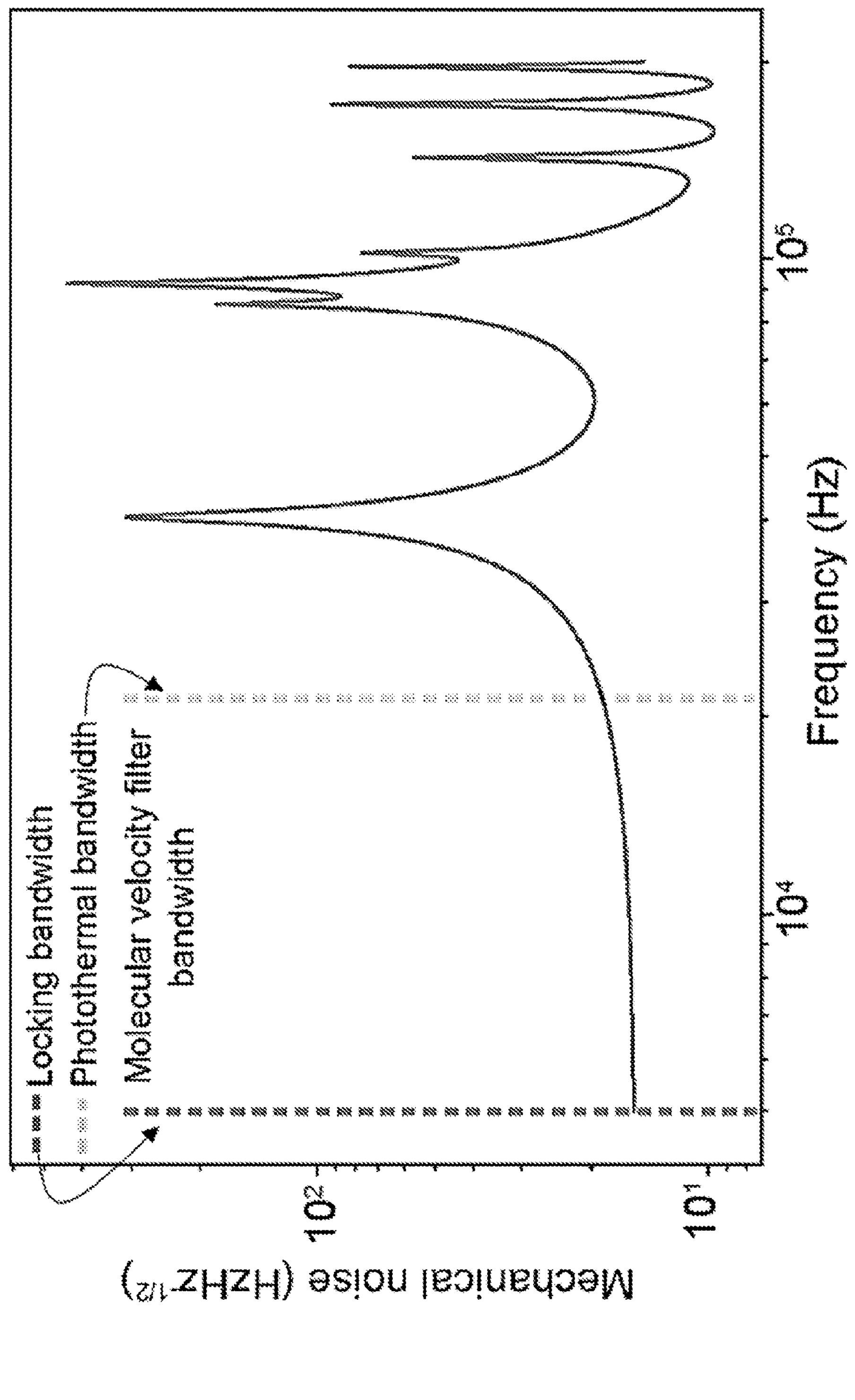
FIG. 12 shows the frequency noise spectral density for the mechanical motion of the cavity assembly used in Example 2 extracted from finite element simulations of the mechanical modes. The resonant mechanical modes lie outside of the velocity-filter bandwidth indicating that the cavity is highly stable within the observation window. The amplitudes of the resonant mechanical modes are below the detector noise limit and are less than the calculated resonance shift for a <1 nm molecule.

The noise profile of the locked cavity was measured from the error signal data. The voltage amplitude of the error signal was converted to its corresponding cavity frequency shift using the scanned error signal slope calibrated with the modulation sidebands at 2.6 GHz. From the calculated Fourier transform of the error signal, the RMS values of the cavity resonance frequency shift were extracted. This measurement was performed for different proportional gain settings where the maximum noise suppression was reached for the maximum locking bandwidth at ~5 KHz. The noise floor was measured from the off-resonance error signal. This value, as well as the cavity finesse and gain, determined the LBW. Effective noise suppression of external perturbations by the PDH locking loop at the level of the noise floor throughout the LBW was found. While the source of low frequency noise was mainly due to ambient acoustic waves, mechanical waves that couple through the cavity system via contact points to the optical table, higher frequency noise (above the LBW) inherent to the electronic control systems was suppressed using a low pass passive filter before the piezo connection. Mechanical resonances of the cavity were expected to appear at frequencies above the LBW, however its magnitude was below the detector noise floor, at the level of $10^3$ $HzHz^{-1/2}$ (see FIG. 12). The high mechanical passive stability of the cavity and the active PDH defined a frequency region where the cavity can be more sensitive to internal perturbations, as further described below.

Voltage Pulse Experiments

Figure 13A:
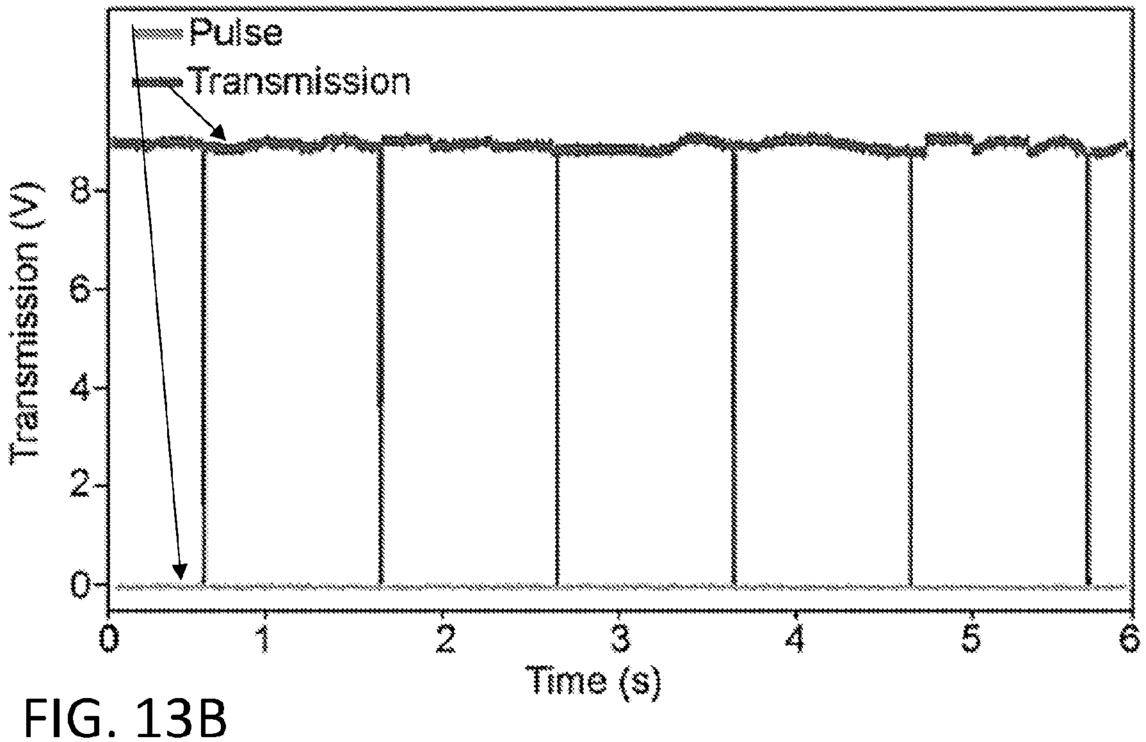
FIG. 13A is a plot of transmitted intensity of locked cavity of Example 2 showing perturbations to the lock when 1 mV voltage pulses are applied to the piezos at a frequency of 1 Hz.
Figure 13B:
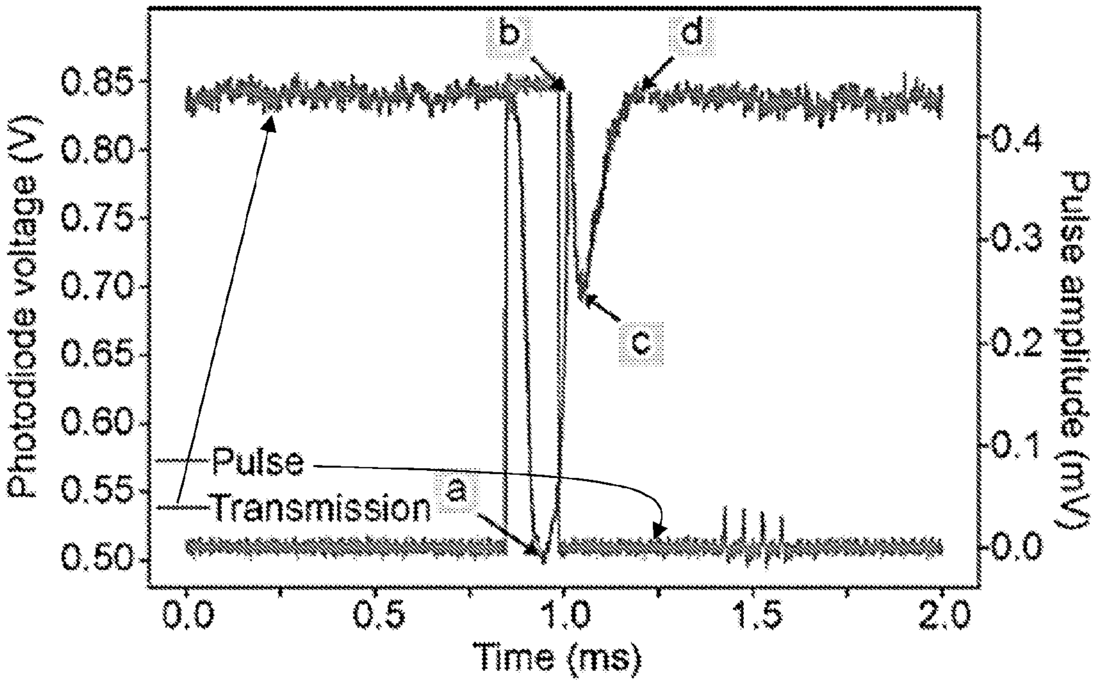
FIG. 13B shows how the applied pulse, input-power and cavity locking parameters can be optimized to mimic signals induced by diffusing molecules. The step down voltage (bottom trace) produced a steep reduction of the locked transmission signal (top trace) due to the photo-thermal effect (a), this was followed by a brief recovery to the locked state by the PI feedback loop (b) followed by a second descent of the transmission signal as the step-up voltage of the pulse shifts the cavity in the opposite direction (c), finally the PI control recovers the locked state (d).

To demonstrate the mechanism described below (and see FIG. 10C), controlled perturbations were induced to the locked cavity to mimic molecular perturbations to the cavity. The passage of molecules into the cavity resulted in an increase in the average refractive index and a consequent decrease in frequency. This frequency decrease was mimicked by transiently, slightly increasing the length of the cavity by applying a voltage pulse to the piezo. Based on the measured duration of molecular transit events (from representative signal traces of proteins obtained but not shown) and their prominence, the parameters of the pulse, including duration and amplitude, were initially selected to approximately induce similar detuning magnitudes and cavity transmission profiles (see FIGS. 13A-13B). Specifically, as shown in FIGS. 13A-13B, square pulse signals of 140 μs-1 ms duration and 1 Hz repetition rate were produced to affect the cavity length while the cavity was locked. The pulse produced by a function generator (Keysight. DSOX1204G) was added to the servo output of the lockbox; this combined signal was then directed to the piezos. The transmission signal of the locked cavity over time was recorded to ensure that all perturbation events and pulse signals were correlated. A small reaction delay was seen due to the length of the cables that drive the piezo, the reaction time of the electromechanics and the transmission signal to the DAQ card. The transmission profile is the result of the step-down voltage perturbation which produced a steep reduction of the locked transmission signal due to the photo-thermal effect (a), this was followed by a brief recovery to the locked state by the PI feedback (b) followed by a second descent of the transmission signal as the step-up voltage of the pulse shifts the cavity in the opposite direction (c), finally the PI control recovered the locked state (d). When the pulse was generated, the resulting perturbation had a profile that resembled the transmitted signal profiles of the cavity due to the molecular interaction, i.e., a shift to smaller frequencies (FIG. 7A).

Photothermal Broadening and Thermo-Optic Coefficient

Optical microcavities with small mode volumes are susceptible to dynamic photothermal non-linearities that originate from the build-up of intense optical fields causing the temperature to increase in the cavity. Coupling between the heat and cavity resonance frequency can result in drift of resonance frequencies and cooling cascades.

Figure 14:
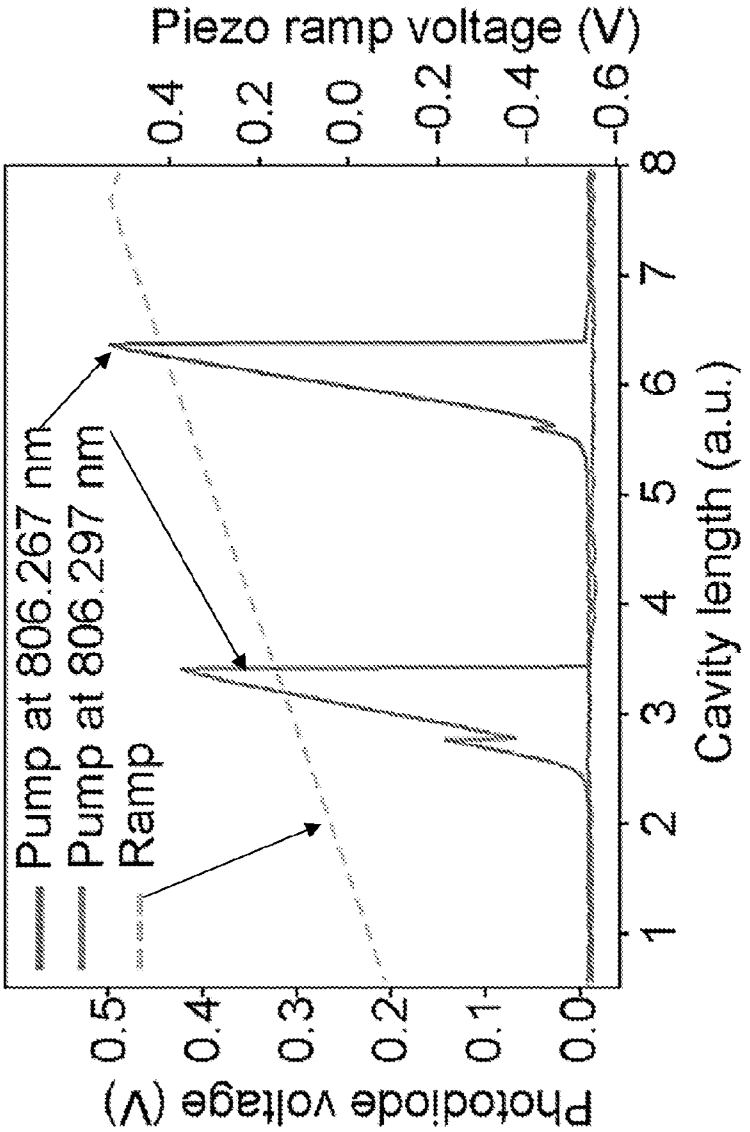
FIG. 14 shows the photothermal induced broadening of the transmitted cavity resonance in water, collected under cavity length tuning at two different pump wavelengths as described in Example 2. The shift in pump wavelength to the right shifts the resonance position to lower piezo ramp voltage, demonstrating that increased piezo ramp voltage corresponds to increased cavity length. Furthermore, the direction of the broadening is indicative of a negative thermo-optic coefficient of the medium as is expected for water. Despite the low circulating power (5.5 mW), photothermal broadening was apparent and leveraged to enable the high sensitivity of this measurement. The smaller peaks originate from polarization splitting due to the birefringence of the cavity mode. Data collected with cavity four.

These photothermal dynamics depend on the thermo-optic coefficient (dn/dT) of the medium dominating the thermal dissipation. Increasing the temperature of a medium with a negative dn/dT will result in a decrease in the refractive index, and a consequently lower cavity resonance wavelength (high frequency). When the cavity length or laser frequency is scanned, the resonance may drift to higher or lower wavelengths depending on the direction of the scan and the cavity-laser detuning. When the cavity length is scanned to longer lengths, the optimal resonance condition (Equation 2), $$m\lambda = 2nL \qquad \text{Equation 2}$$

where m is an integer, λ is the wavelength, n is the refractive index of the medium and L is the cavity length, appears to change as n decreases, resulting in a need for still higher lengths, and resulting in a distorted line shape, (see FIG. 14). This behavior is expected in FFPCs when the medium is air and the thermal dissipation is dominated by the mirror coatings, where an "effective" negative dn/dT due to thermal expansion results in a shorter cavity length. A negative dn/dT is also expected when the medium is water. As shown in FIG. 14, the photothermal behavior in the FFPCs described herein were characterized with water by actively scanning the cavity to increasing length and observing the direction of photothermal broadening in water. A positive voltage gradient was applied to one of the piezos and confirmation that the positive voltage corresponded to increasing cavity length was confirmed by tuning the wavelength of the pump laser and observing a shift of the resonance position to higher voltages with a lower pump wavelength. The direction of the broadened resonance was observed to be towards longer cavity lengths, thus lower wavelengths, as expected for a system dominated by a medium with a negative thermo-optic coefficient.

Photothermal Bandwidth Measurement

Figure 15A:
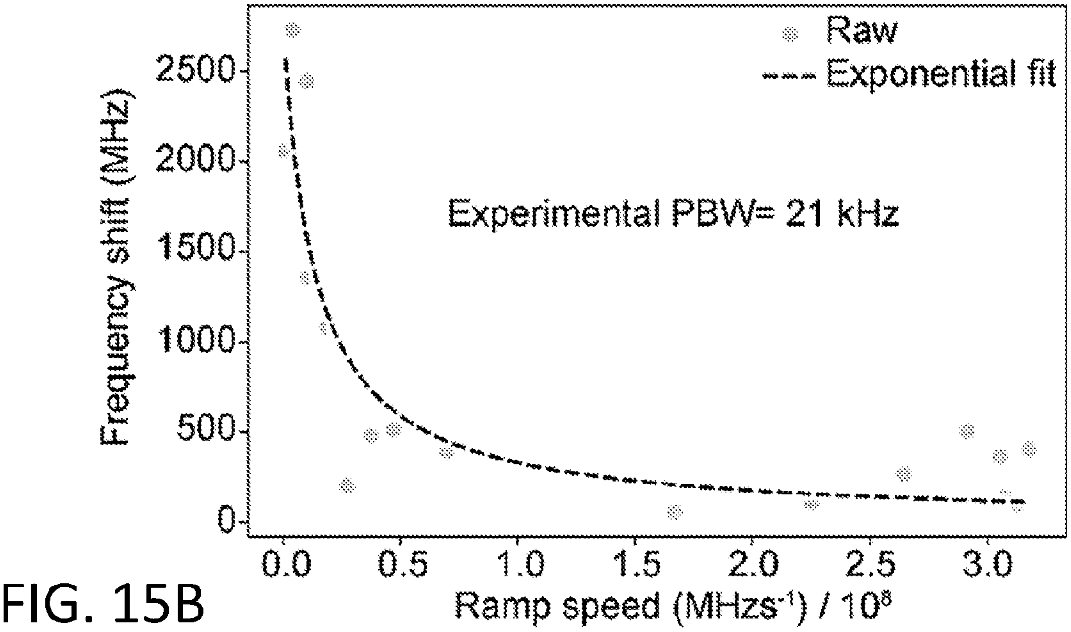
FIG. 15A shows the experimental determination of the photothermal bandwidth (PBW) as described in Example 2. The calculated bandwidth is 21 kHz, defining the upper limit of the molecular velocity filter (data collected with cavity four). As a comparison.
Figure 15B:
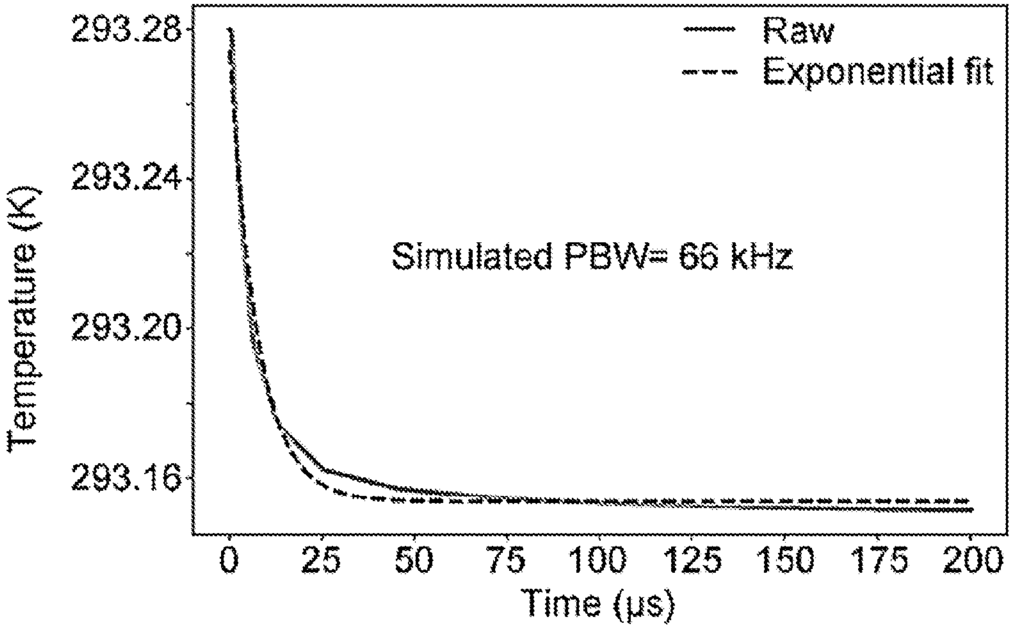
FIG. 15B shows the theoretically quantified PBW based on finite element simulations of the rate of cooling in the cavity.

Photothermal broadening of cavity lineshapes as a function of applied ramp speed was recorded in order to quantify the photothermal bandwidth of the cavity in water (see FIGS. 15A-15B). Resonances were recorded in transmission as a function of time, and the cavity length was tuned using a ramp signal applied to the piezos from a function generator (Keysight, DSOX1204G). Phase modulated sidebands at a known frequency (2.6 GHz) were applied to be used as a frequency calibration marker to each trace. Initially, the ramp frequency and amplitude were chosen to minimize the photothermal effects in the cavity. This was determined by matching resonance lineshapes during both the increase and decrease of ramp voltage. This trace was used to measure the linewidth of the cavity. From there, both the ramp speed was scanned and traces were recorded for both the increase and decrease in ramp voltage components of the ramp signal.

Data Analysis

Single-Molecule Diffusion and Autocorrelation Analyses

Analysis of transmitted and reflected signals resulting from perturbation by single biomolecules was performed with custom written code using Python 3. Biomolecule and water control data collected at a single input power were first normalized to the maximum (for reflection) or minimum (for transmission) signal intensity to enable all signal peaks at a comparable power to be selected with a single threshold between 0-1. Single events were identified and analyzed using the SciPy.signal find_peaks package. Signal peaks were selected at a prominence threshold of 0.35. A temporal filter of 2 ms was applied to ensure that only peaks separated in time by greater than 2 ms were selected. Temporal widths were determined at the full width at half maximum of the event, and prominences were determined as the vertical distance between the maximum of the peak and the local background intensity.

Autocorrelation analysis was performed to quantify the temporal behavior of the single-molecule events in the intensity-time traces with custom code written in Python 3. A normalized function was generated by comparing time-shifted values to one another (Equation 3):

$$G_K = \frac{\sum_{i=1}^{N-k}(Y_i - \overline{Y})(Y_{i+k} - \overline{Y})}{\sum_{i=1}^{N-k}(Y_i - \overline{Y})^2} \qquad \text{Equation 3}$$

where k is the number of time steps, N is the total number of points, $Y_1$ is the intensity for a specific time and $\overline{Y}$ is the average intensity. Several 30 s intensity-time traces for proteins diffusing in the locked cavity were concatenated. To ensure that the background was approximately continuous between files, the minimum of each file was found and then subtracted from every point. Events were identified with an intensity threshold 2.5 standard deviations from the mean and used to generate an autocorrelation trace. The function sm.tsa.acf from the package statsmodels.api, was used to generate the autocorrelation function. These functions were plotted for the four different proteins (streptavidin, carbonic anhydrase, aprotinin and Myc-tag, see FIG. 8A), and the values for different decay times were extracted. The time to decay to 40% of the autocorrelation time is shown to be linear with protein radius, FIG. 8B. This linear trend was preserved for a large range of decay values (data not shown), demonstrating the robustness of the analysis. A copy of the analysis software is available for free use under the GPLv3 license at https://github.com/FairhallAle/ces_tools.

Locking Bandwidth Analysis

To extract the effective LBW of the system, the Fourier transform of the signal measured at point S was computed for each perturbation frequency (see FIG. 11). The amplitudes at the perturbation frequency were extracted and normalized with respect to the input signal $F_h$ and converted to decibels. The results of the normalized values are shown as a function of input frequency of the sine wave (FIG. 10A). The corresponding LBW was determined to be ~5 kHz at the 0 db crossing point. At larger frequencies the signal was amplified due to a change in phase of the control circuit known as the servo bump. At even higher frequencies the lock had no influence on the perturbation signal and the relative intensity remained at 0 db.

Signal-to-Noise Ratio Determination

The data traces were smoothed using various bin sizes to generate a moving average, following:

$$F_{smoothed,i} = \frac{\sum_{j=i}^{i+(n-1)} F_{raw,j}}{n} \qquad \text{Equation 4}$$

where n is the bin size and $F_i$ is the value of the function at index i. This smoothing procedure was performed for a series of different bin sizes from n=1 to n=250. Following smoothing, the trace was normalized. Smoothing of the data was only performed for SNR calculations. To then calculate the signal-to-noise ratio (SNR), the standard deviation of the background ($\sigma_N$) was taken from the longest segment of background in the trace. The signal (S) was then calculated from the amplitude of the peaks and the SNRs for the proteins measured in this Example (see FIG. 16) were calculated by:

$$SNR = \frac{S}{\sigma_N} \qquad \text{Equation 5}$$

quantifying the SNR for each peak under each smoothing bin size. Giving the maximum average SNR, a bin size of 190 was used for all datasets.

Figure 16:
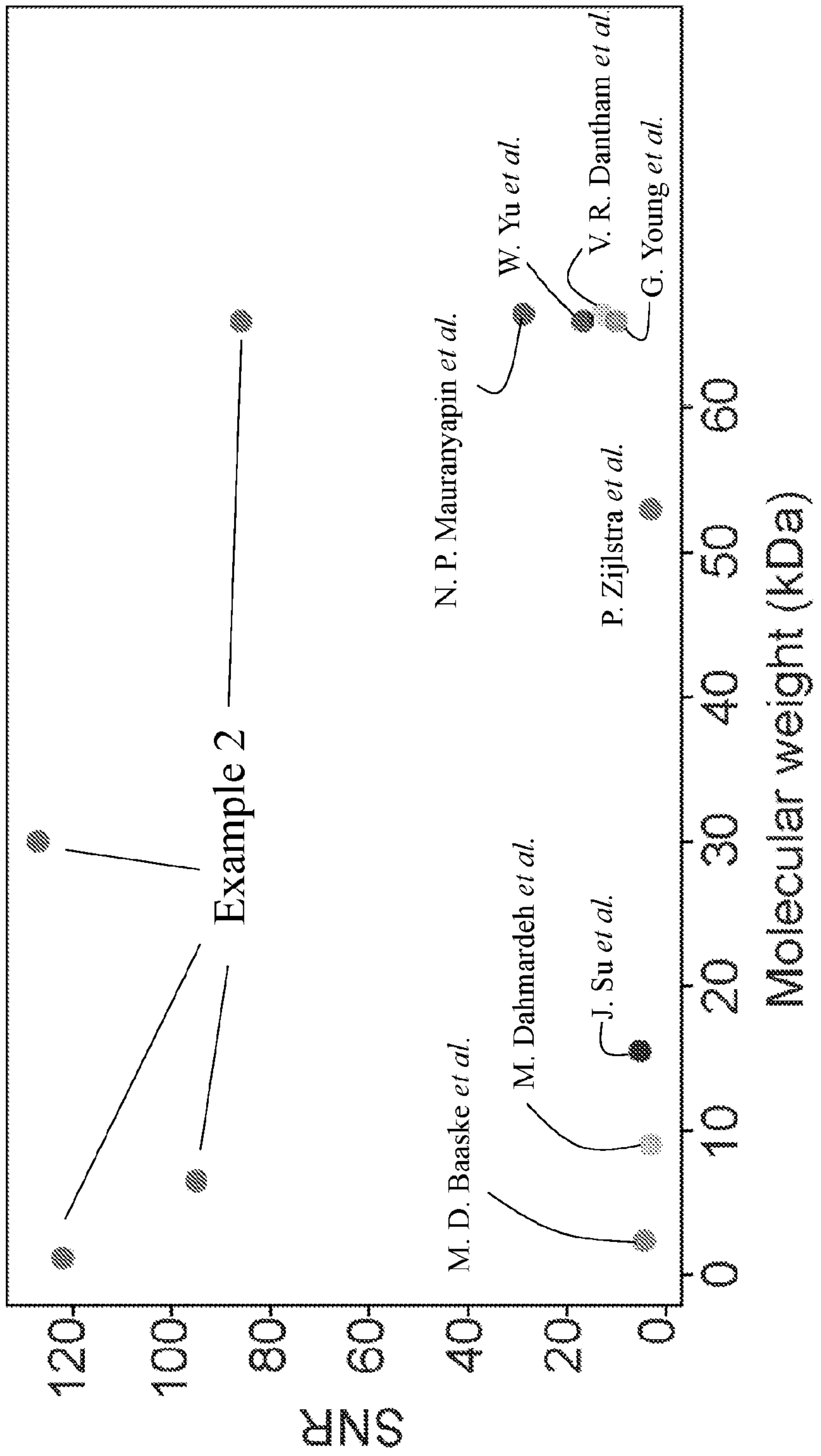
FIG. 16 shows a comparison of signal to noise ratios obtained from the system used in Example 2 and from existing systems. Single-molecule diffusion data was from FIG. 7A and collected in cavity one.

As shown in FIG. 16, for comparison with other techniques, where provided, SNR values were taken directly from the following references: V. R. Dantham et al. *Nano Lett.* 13, 3347-3351 (2013); P. Zijlstra et al., *Nat Nanotechnol.* 7, 379-382 (2012); W. Yu et al. *Nat Commun.* 7, 12311 (2016); G. Young et al., *Science.* 360, 423 427 (2018); M. Dahmardeh et al., *Nat Methods.* 20, 442-447 (2023). For reference N. P. Mauranyapin et al., *Nat Photonics.* 11.477-481 (2017), data was extracted into a .csv from FIG. 9A using WebPlotDigitizer. The SNR was then calculated by taking the maximum of the signal and dividing it by the standard deviation of a region without signal. For reference J. Su et al., *Light Sci Appl.* 5, 1-6 (2016), the resonance shift was taken to be 5 nm as a high estimate from FIG. 10C and divided by the reported noise level of $9.6\times10^{-4}$ fm. For reference M. D. Baaske et al., *Nat Nanotechnol.* 9, 933-939 (2014), the standard deviation of the noise was calculated by estimating 3a from FIG. 10B and dividing that by 3. The SNR was then calculated using the mean reported value of 2.5 fm for the 8-mer and then dividing by the previously calculated standard deviation.

Photothermal Bandwidth Determination

To determine the photothermal bandwidth, the frequency shift of the photothermally broadened peak was calculated for each corresponding ramp speed. The photothermally broadened peak for each ramp speed had the larger distance between the left sideband and the main peak, which was determined to be the interpeak distance. Using this information, the frequency shift for each ramp speed was then calculated by calculating the difference between the photothermally broadened interpeak distance and the photothermally narrowed interpeak distance. The frequency shift as a function of the ramp speed (see FIG. 14) was then fitted to Equation 6.

$$\beta(x) = \frac{\beta_{ad}}{1 + x\tau} \quad \text{Equation 6}$$

where $\beta_{ad}$ and $\tau$ corresponded to the adiabatic thermal resonance shift and the thermal reaction time constant respectively. $\beta(x)$ is the frequency shift and x is the linewidth. $\beta_{ad}$ was calculated to be 8.28 linewidths and $\tau$ was calculated to be 23.7 linewidths per microsecond. Then using Equation 7:

$$f_{th} = \frac{1}{2\tau} \quad \text{Equation 7}$$

$\tau$ was converted to $f_{th}$, (21 kHz) which is the bandwidth for photothermal resonator length stabilization.

Simulations and Calculations

Calculated Resonance Shift

Analytical expressions can be used to determine frequency shifts from small objects. Essentially, these are the shifts without any additional photothermal enhancements and can be thought of as the observed shifts in cavities with extremely small circulating power. Two approaches were used. First, Equation 8 was applied following the approach by L. Kohler, et al. Here, the polarizability of the molecule is calculated via the Lorentz-Lorenz equation, Equation 9, for mixtures weighted by the overlap between the mode volume and the molecule and divided by the volume of the molecule:

$$\langle\alpha\rangle = \frac{a}{V_{mol}} \int_{V_{mol}} dV_{np}\left(\frac{\omega_0}{\omega(z)}\right)\exp\frac{-2(x^2+y^2)}{\omega(z)^2}\cos^2(kz) \quad \text{Equation 8}$$

$$a = 4\pi r^3 \epsilon_0 \frac{n_{mol}^2 - n_{water}^2}{n_{mol}^2 + n_{water}^2} \quad \text{Equation 9}$$

$$\omega(z) = \frac{\omega_0}{\sqrt{1+\left(\frac{z}{z_0}\right)^2}} \quad \text{Equation 10}$$

The mode area and the Rayleigh length are:

$$\omega_0^2 = \frac{L\lambda_m}{\pi}\sqrt{\frac{G_1G_2(1-G_1G_2)}{(G_1+G_2-2G_1G_2)^2}} \quad \text{Equation 11}$$

$$z_0 = \pi\omega_0^2/\lambda_m \quad \text{Equation 12}$$

correspondingly. Here L is the cavity length, $\lambda_m=\Delta_0/n_{water}$ is the wavelength in the medium, and the cavity geometry parameters are $G_i=1-L/R_i$, where $R_i$ are the radius of curvature of each mirror. The cavity frequency shift is:

$$\Delta v = \frac{\langle\alpha\rangle c}{2\lambda_m \epsilon_0 V_{mode}} \quad \text{Equation 13}$$

where c is the speed of light in vacuum and the mode volume is $$V_{mode} = \pi\omega_0^2 L/4.$$

This approach differs from Kohler et al. as the molecules are significantly smaller than the mode volume and therefore the mode shape shifts a negligible amount on the length scale of the molecule.

For the four proteins interrogated in this Example the corresponding resonance shifts ($\Delta$v) and losses that would be induced by interaction with the cavity mode were calculated (Table 2).

Table 2. Calculated resonance shifts induced by proteins streptavidin, carbonic anhydrase, aprotinin and Myc-tag upon interaction with the mode volume of the FP microcavity. This approach was taken from Kohler et al.

| Protein | Refractive index | Protein radius (nm) | $\Delta$v (kHz) |
|---|---|---|---|
| Streptavidin | 1.43 | 2.80 | 49.0 |
| Carbonic anhydrase | 1.43 | 2.10 | 21.0 |
| Aprotinin | 1.43 | 1.45 | 6.7 |
| Myc-tag | 1.43 | 0.75 | 0.96 |

The second approach was adapted from J. Su et al. First, the polarizability was calculated as previously shown using Equation 8. The wavelength shift was then calculated following Equation 14:

$$\Delta\lambda_{max} = \frac{\langle\alpha\rangle\left[\frac{E_0^2(r_e)}{E_{max}^2}\right]}{2V_m}\lambda \quad \text{Equation 14}$$

where r was the particle radius, λ the free space wavelength, $$\frac{E_0^2(r_e)}{E_{max}^2}$$

was calculated to be 1/5.5 for the microtoroid of J. Su et al. and 1/4.8 for the FP microcavity, since the molecule is able to overlap with the mode maximum. To calculate the resonance shift expected from interaction of the proteins with a toroidal microresonator the mode volume, $V_m$, was taken from J. Su et al. and was equal to 330 $\mu m^3$. In order to compare to the expected resonance shift from the FP cavities used in this Example, $V_m$ was calculated to be 80 $\mu m^3$. Given these values, the resulting frequency shifts were calculated as shown in Table 3.

Table 3. Calculated resonance shifts induced by proteins streptavidin, carbonic anhydrase, aprotinin and Myc-tag upon interaction with the optical mode of a toroidal microcavity. This approach compares the calculated shifts given the mode volume of a toroidal microcavity and our FP microcavity and was taken from J. Su et al.

| Protein | Refractive index | Protein Radius (nm) | Δν toroid (kHz) | Δν FP (kHz) |
|---|---|---|---|---|
| Streptavidin | 1.43 | 2.8 | 3.796 | 15.064 |
| Carbonic anhydrase | 1.43 | 2.1 | 1.601 | 6.355 |
| Aprotinin | 1.43 | 1.45 | 0.530 | 2.092 |
| Myc-tag | 1.43 | 0.757 | 0.075 | 0.297 |

The magnitude of the resonance shifts induced from the interaction between the proteins and the mode of a toroidal microresonator were significantly less than the shifts from the same interaction in the FP cavities. The confinement of the optical mode in the medium outside of the dielectric material in FP microcavities allowed for stronger overlap between the molecule and the mode when compared to a toroid, in which the mode was confined within the dielectric material (see Table 2). Furthermore, the smaller mode volume in the FP microcavity facilitated stronger light-matter interactions further resulting in larger resonance shifts compared to those achieved with a toroidal microcavity (see Table 3).

Molecular Velocity Distributions and Molecular Mean-Square-Displacement Power-Spectral-Density The velocity distribution of particles undergoing free Brownian motion in solution follow Equation 15 and Equation 16 (17):

$$m^* = m_p + \frac{1}{2}m_f \quad \text{Equation 15}$$

$$f(v) = \sqrt{\frac{m^*}{2\pi k_B T}}\, e^{-\frac{m^* v^2}{2k_B T}} \quad \text{Equation 16}$$

for particle of mass $m_p$, solution mass $m_f$, and solution temperature T. An effective mass was calculated in order to include the effects of the solution on the acceleration of the particle. With these equations, one can approximate the likelihood of a particle to move with a given velocity (see FIG. 17A). The smaller the particle, the wider the velocity distribution becomes.

Figure 17A:
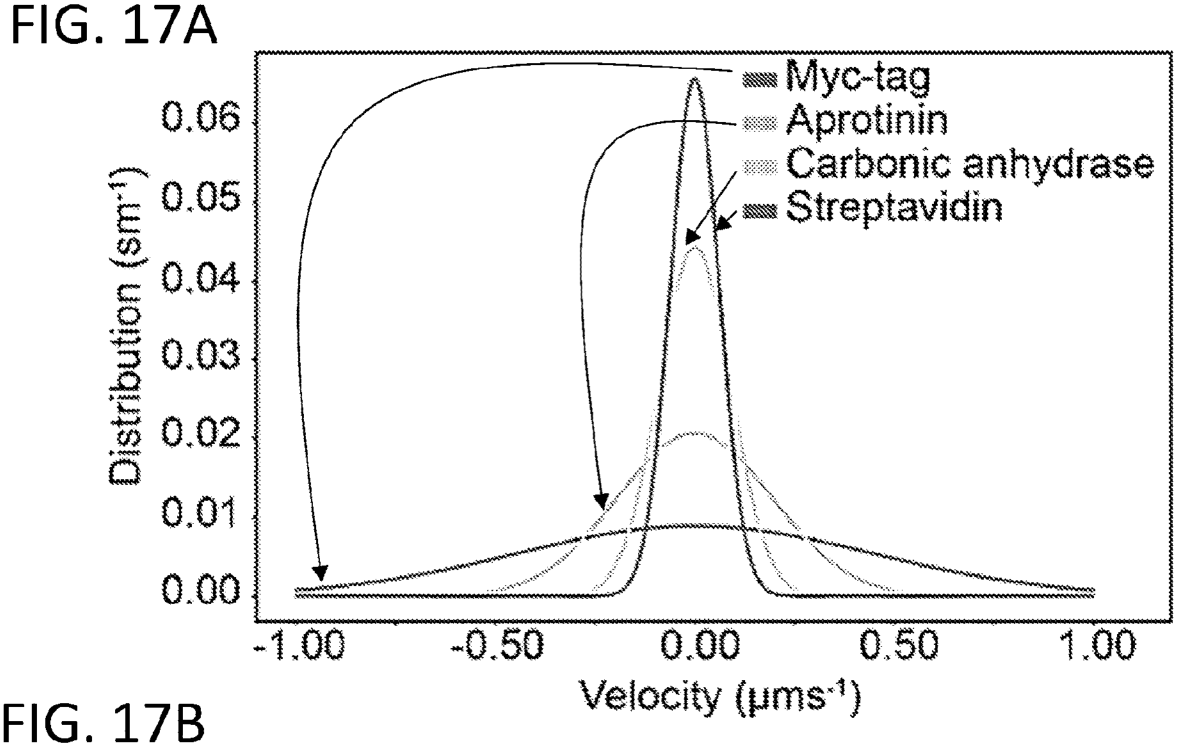
FIG. 17A shows the calculated velocity distribution profiles for Myc-tag, aprotinin, carbonic anhydrase and streptavidin.
Figure 17B:
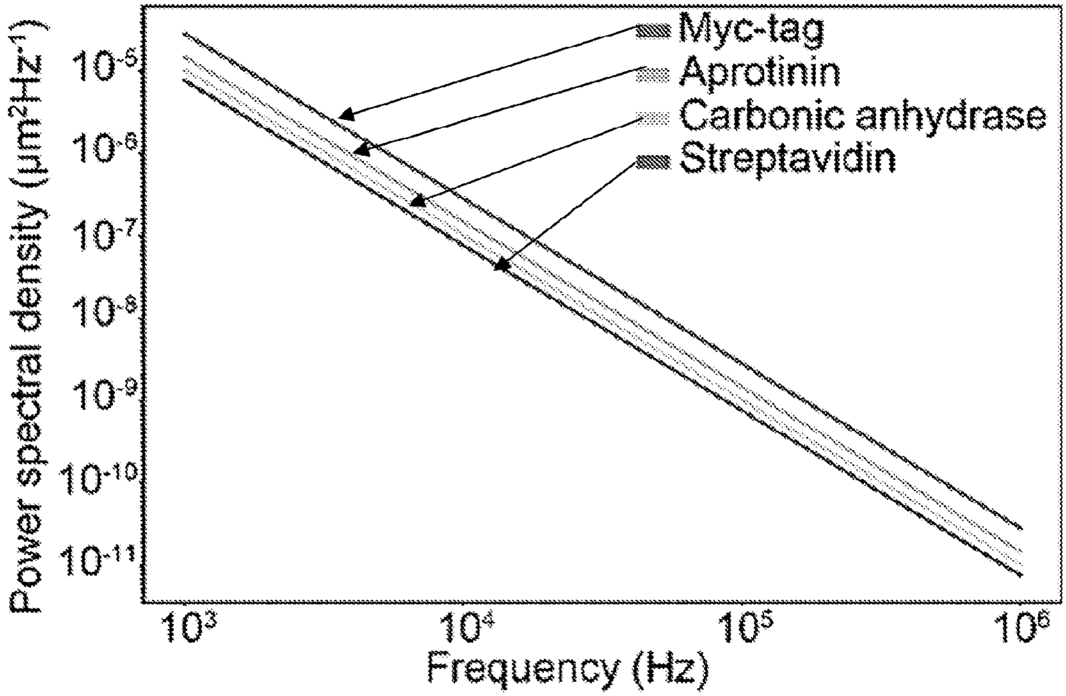
FIG. 17B shows a mean-square-displacement power spectral density plot (MSDPSD), the upper and lower bounds are replicated in FIG. 10A. Integrating within the bandwidth of the velocity filter observation window (5 kHz-21 kHz) provides an approximate MSD for the molecule.

The mean squared displacement power spectral density (MSDPSD) of a particle undergoing free Brownian motion can be calculated with the Equation 20, derived as a solution to the Langevin equation:

$$D = \frac{k_B T}{6\pi\eta r} \quad \text{Equation 17}$$

$$\tau_f = \frac{r^2\rho_f}{\eta},\ \tau_p = \frac{m}{6\pi\eta r} \quad \text{Equation 18}$$

$$\phi_f = \frac{1}{2\pi\tau_f},\ \phi_p = \frac{1}{2\pi\tau_p} \quad \text{Equation 19}$$

$$P_{free}(f) = \frac{D}{\pi^2 f^2}\frac{1+\sqrt{f/2\phi_f}}{\left(\sqrt{f/2\phi_f}+f/\phi_p+f/9\phi_f\right)^2+\left(1+\sqrt{f/2\phi_f}\right)^2} \quad \text{Equation 20}$$

for particle radius r, particle mass $m_p$, solution density $\rho_f$, solution viscosity η, and solution temperature T. The τ terms are time constants, $\tau_f$ related to inertia of the surrounding fluid, and $\tau_p$ to the inertia of the particle itself. It was noted that this version of the equation is for a free particle (not confined by an optical trap). This equation was plotted for the four proteins using known mass values and radius values for streptavidin, carbonic anhydrase, and aprotinin, with a calculated radius for Myc-tag (FIG. 10A and FIG. 17B). A range from 1 kHz to 1 MHz was used, and the integral over the range 5 kHz to 21 KHz was calculated, giving 0.00875 $\mu m^2$ for Myc-tag, 0.00457 $\mu m^2$ for aprotinin, 0.00315 $\mu m^2$ for carbonic anhydrase, and 0.00237 $\mu m^2$ for streptavidin.

Simulated Photothermal Bandwidth Determination

Finite element simulations were performed using COMSOL (version 6.0). The adiabatic model was used to solve for the stable equilibrium of the cavity resonance frequency/length/wavelength under high circulating power conditions. While the cavity was locked, the heat generated by the absorbed circulating power was dissipated by the heat conduction into the surrounding medium. The cavity equilibrium resonance frequency was determined by the heat conductance of the system (K) (assuming no convection or radiation). The thermal conductance of the system was calculated by considering a volume of water, equivalent to the optical mode volume, which was heated according to Equation 22. If $\alpha_{water}$ is the absorbed power in water:

$$a_{water} = \pi\frac{1}{F_{air}} - \frac{1}{F_{water}} \quad \text{Equation 21}$$

where F is the finesse in air/water respectively, the total absorbed power is:

$$P_{abs} = P_{circ}a \quad \text{Equation 22}$$

here. $P_{circ}$ is defined in Equation 1 as the circulating cavity power. Consequently, the total power flow across a gaussian surface surrounding the mode volume of the cavity is measured on a 200 μs time-scale. This integration time was arbitrarily chosen to be much longer than the measured photothermal time-constant of the system, determined to be 7.57 μs. Based on the distribution of the optical mode (not shown) for the geometry of cavity one, a cylinder of water with radius 1.25 μm and length 19 μm was used as the heat source to the model. A volume of water defined by a sphere (radius 25 μm) acted as a heat sink for the system. A glass cylinder of diameter 125 μm was placed tangent to each circular face of the heat source, representing the fibers. Using the Heat Transfer in Solids and Fluids module, a constant power density of 42.2 GW/m$^3$ was applied to the cylinder. This power density was calculated based on the circulating power of the cavity and the absorption of water, giving 3.93599 μW of absorbed power over the volume of the cylinder. The system was set to an initial temperature of 293.15 K and was allowed to evolve with this power input, approaching a temperature of 293.28 K.

To estimate the thermal relaxation time, the system was initialized at the equilibrium temperature and its characteristic temperature decay profile was studied. The resulting temperature over time data was then fit with an exponential decay curve (see FIG. 15B). This yielded a time constant of 7.57 μs, consistent with a thermal bandwidth of 66.05 kHz approximately 3-fold larger than the measured value of 21 kHz (see FIG. 15A). This small discrepancy was due to non-idealities not considered in the simulation, such as additional contact points with the ferrule which were not considered.

Fiber Cavity Mechanics

Finite element simulations on mechanical fluctuations of the cavity were performed using COMSOL (version 6.0). The fiber cavity was modelled (schematic not shown) including the fibers (glass), ferrule (glass) and piezos (Lead zirconate titanate with Young's Modulus 82.1 GPa and Poisson Ratio 0.39), and glass plate. The piezos (2.5 mm×2.3 mm×2.5 mm) sat on top of the glass block (20 mm×7 mm×3 mm). The slotted ferrule section had the left half (3.4 mm×1.25 mm×1.25 mm) separated from the right (4.6 mm×1.25 mm×1.25 mm) by a gap of 125 μm. The bore was placed 0.833 mm from the bottom of the ferrule, with a radius of 65.5 μm. There was a half cut through the right ferrule, 0.5 mm from the full gap between left and right. The fibers were each placed within the bore, tangent to the bottom, with a radius of 125 μm. A 19 μm separation between the fibers defined the optical cavity. The water was modeled as an ellipsoid (1 mm×0.6 mm×1.25 mm), centered on the plane of the top of the ferrule, directly above the gap between the fibers. The parts of this ellipsoid clipping with the fibers and ferrule were removed. The two modules used for this simulation were Solid Mechanics for all the glass components and piezos, and Pressure Acoustics, Frequency Domain for the water components. Multiphysics boundaries between the two were included. The eigenfrequencies and eigenmodes of this system both with and without water were calculated. Eigenmodes appearing in both the air and water simulations were used for further calculations.

The noise spectral density was calculated as previously described. From the simulations, the effective masses of the eigenmodes were first calculated, following the equation:

$$m_{eff} = \frac{\int_V dV\rho(x, y, z)\cdot|u(x, y, z)|^2}{max_V(|u(x, y, z)|)^2} \qquad \text{Equation 23}$$

where V is the volume of the simulation, ρ(x, y, z) is the density at a given position, u(x, y, z) is the displacement field at a given position, and $max_V$ is the maximum within the volume of the simulation. The zero-point motion of the modes is then calculated, following the equation:

$$x_{ZPM} = \sqrt{\frac{\hbar}{2m_{eff}\Omega_m}} \qquad \text{Equation 24}$$

where Ωm is the angular frequency of eigenmode m. The optomechanical coupling rates were then calculated, following:

$$G = \frac{-2\pi v_0}{L_{cavity}} \qquad \text{Equation 25}$$

$$g_0 = G\cdot x_{ZPM}\cdot\left(\frac{u_{x,mirror1}}{max_V(|u(x, y, z)|)} - \frac{u_{x,mirror2}}{max_V(|u(x, y, z)|)}\right) \qquad \text{Equation 26}$$

where $L_{cavity}$ is the length of the cavity (here 19 μm), $u_x$ is the maximum displacement in the x direction for an arbitrary perturbation (parallel to the cavity optical axis), and $v_0$ is the optical frequency being coupled to.

A linewidth of 1000 Hz ($\Gamma_m$=6283.185) was used as an approximation for all of the modes. With these linewidths, the frequency noise spectral density can be calculated, following the equation:

$$S_v(f)^2 \approx \frac{2g_0^2}{4\pi^2}\cdot\frac{2\Omega_m}{\hbar}\cdot\frac{2\Gamma_m k_B T}{(\Omega^2-\Omega_m^2)^2+\Gamma_m^2\Omega^2} \qquad \text{Equation 27}$$

where Ω is the noise angular frequency (Ω=2πf), temperature is T, and Boltzmann constant is $k_B$.

The noise floor of the cavity was an order of magnitude lower than the detector noise floor (see FIG. 12) within the molecular velocity bandwidth. A stepwise integral of $S^2$ from the locking bandwidth (5 kHz) to the photothermal bandwidth (21 kHz) was calculated, and then the square root taken, giving the integrated noise within the selected region. The integrated noise over the observation bandwidth was on the order of the resonance shift expected from the smallest molecule, Myc-tag (Table 2).

Finally, Table 4 collects the parameters of the cavities used for the experiments in this Example.

Table 4. Parameters of the cavities used in this Example. The cavities used to collect the data shown in certain of the figures are indicated in this table, the cavities used to collect the data shown in the supplementary figures are indicated in the respective figure legends.

Figure 7B:
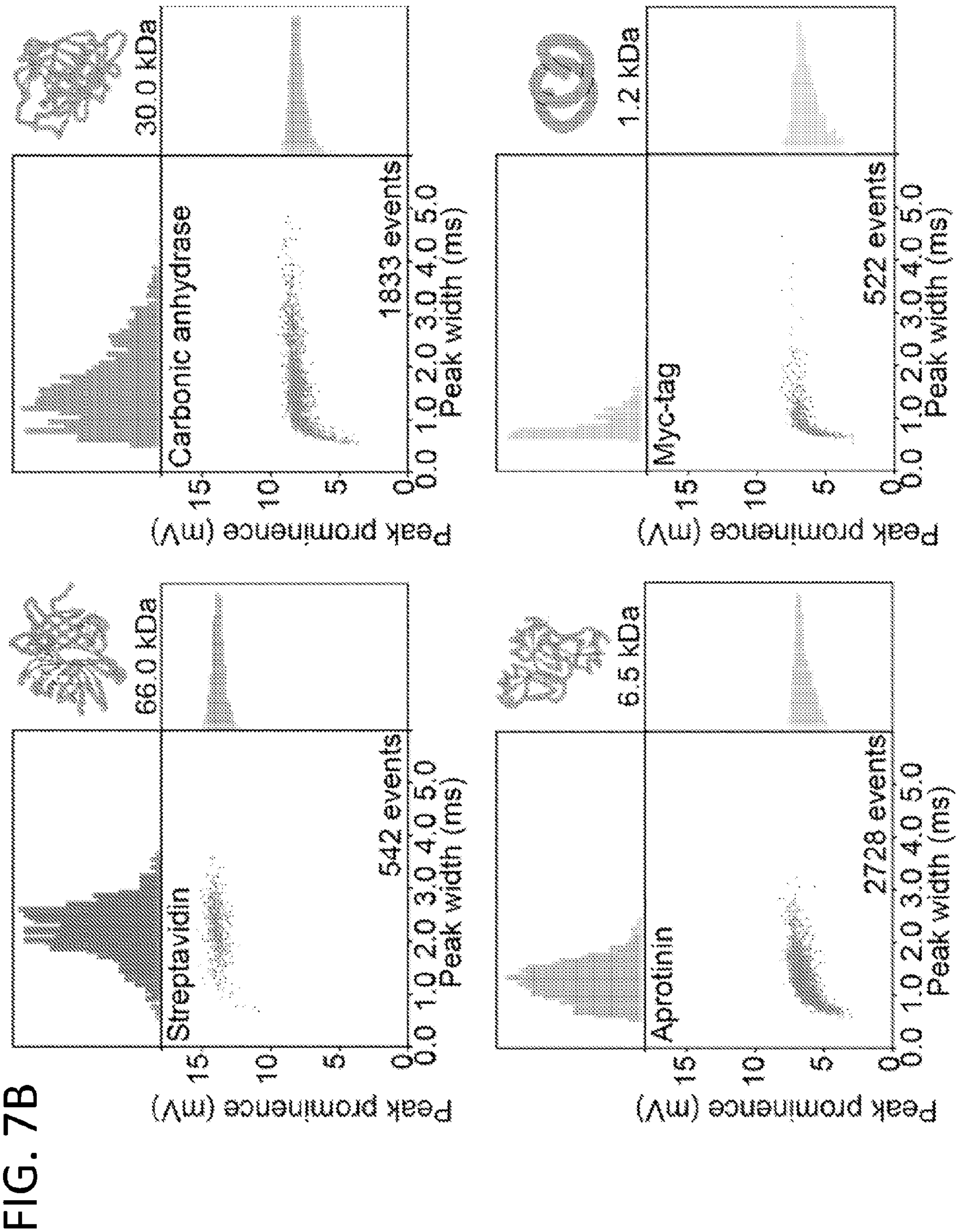
FIG. 7B shows 2D plots and accompanied histograms of the extracted prominences and temporal widths of the reflected signals.

| Parameter | Cavity one | Cavity two | Cavity three | Cavity four |
|---|---|---|---|---|
| $\lambda_{pump}$ (nm) | 660 | 660 | 660 | 760 |
| Finesse | 37450 | 17909 | 21780 | 30000 |
| Cavity length (μm) | 19 | 19 | 24 | 20 |
| Δv (MHz) | 206.87 | 398.83 | 286.9 | 261 |
| ROC mirror 1 (μm) | 122.4 | 116.9 | 60.9 | ~170 μm |
| ROC mirror 2 (μm) | 97.7 | 105.5 | 67.5 | ~170 μm |
| FIG. 6A | X | | | |
| FIG. 7A-7B | X | | | |

-continued

Figure 8B:
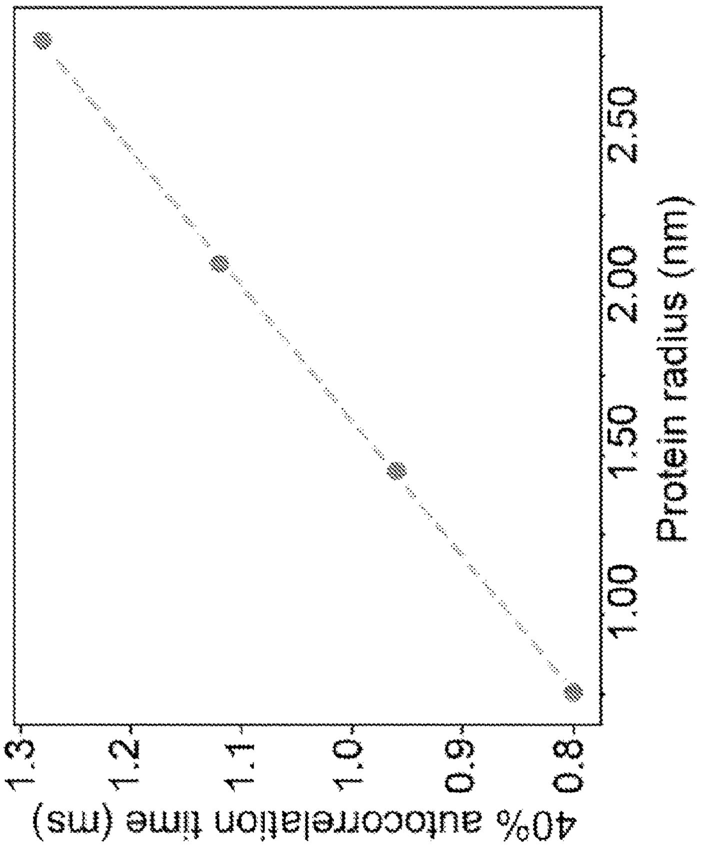
FIG. 8B shows a relationship between autocorrelation time at an autocorrelation threshold of 40% and the protein radius, showing a clear linear correlation.
Figure 8A:
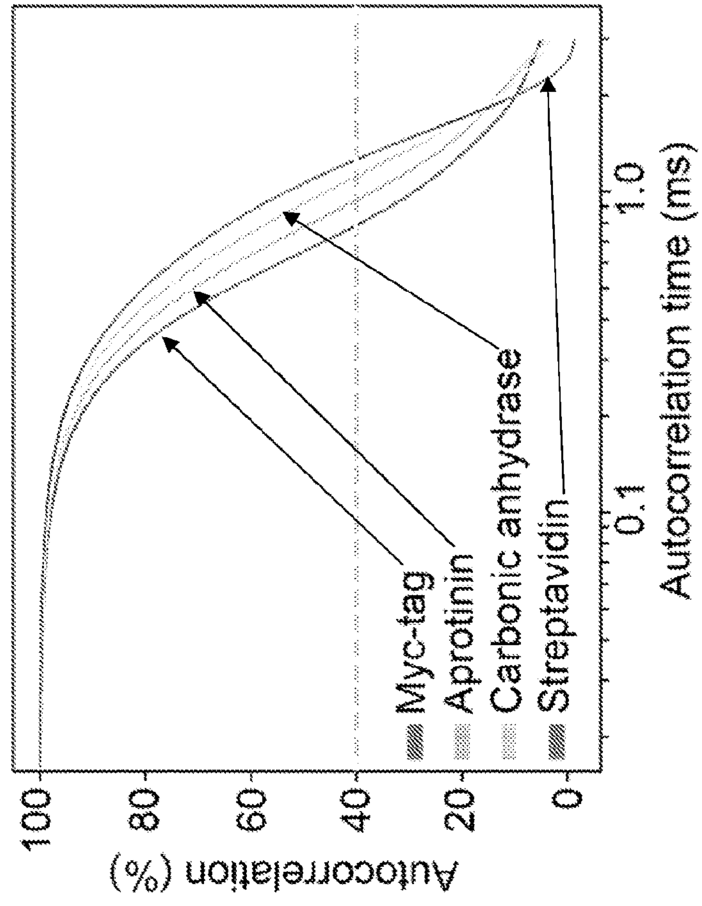
FIG. 8A shows ensemble autocorrelation of several hundred single-protein diffusion events.
Figure 9B:
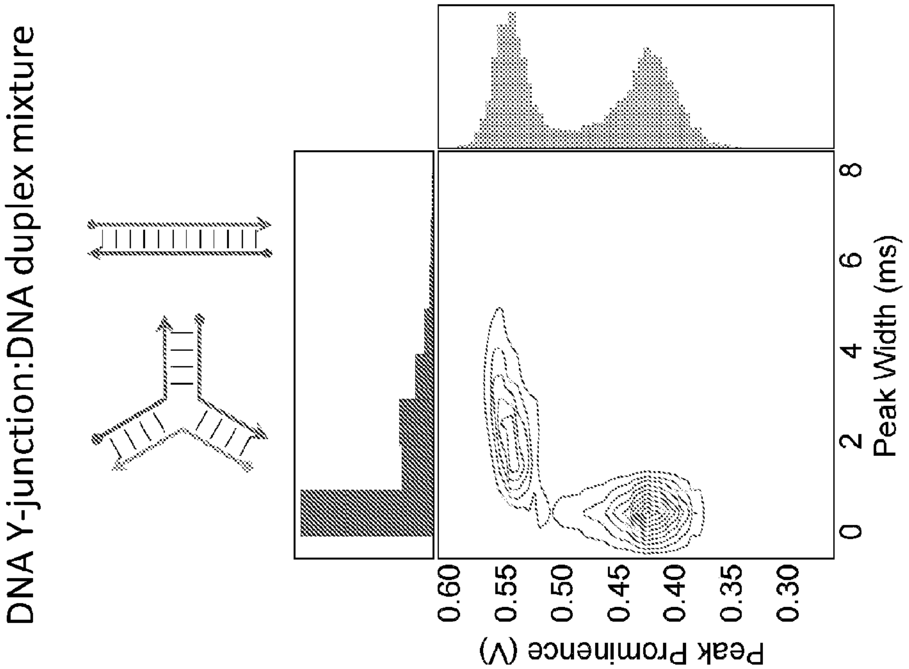
FIGS. 9A-9B show 2D plots of peak prominence versus temporal width and subsequent independent histograms for (FIG. 9A) a mixed protein sample of aprotinin (6.5 kDa, 1.45 nm) and Myc-tag (1.2 kDa, 0.75 nm) and (FIG. 9B) a mixed DNA structure sample of a duplex (16.6 kDa, 9 nm) and Y-junction (16.6 kDa, 5 nm), with multiple populations clearly resolved.
Figure 9A:
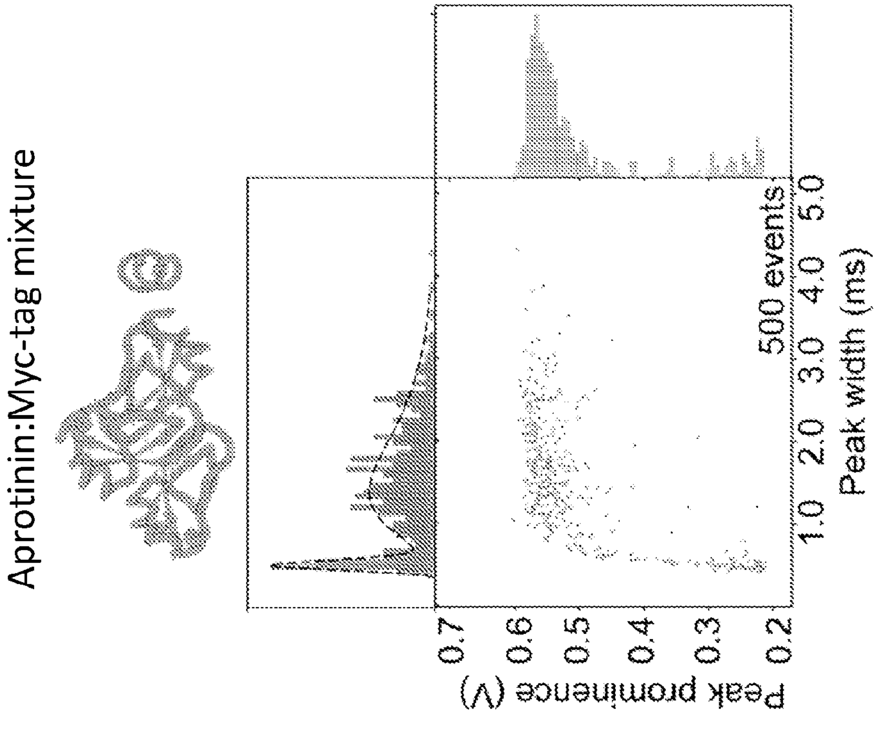
Figure 10C:
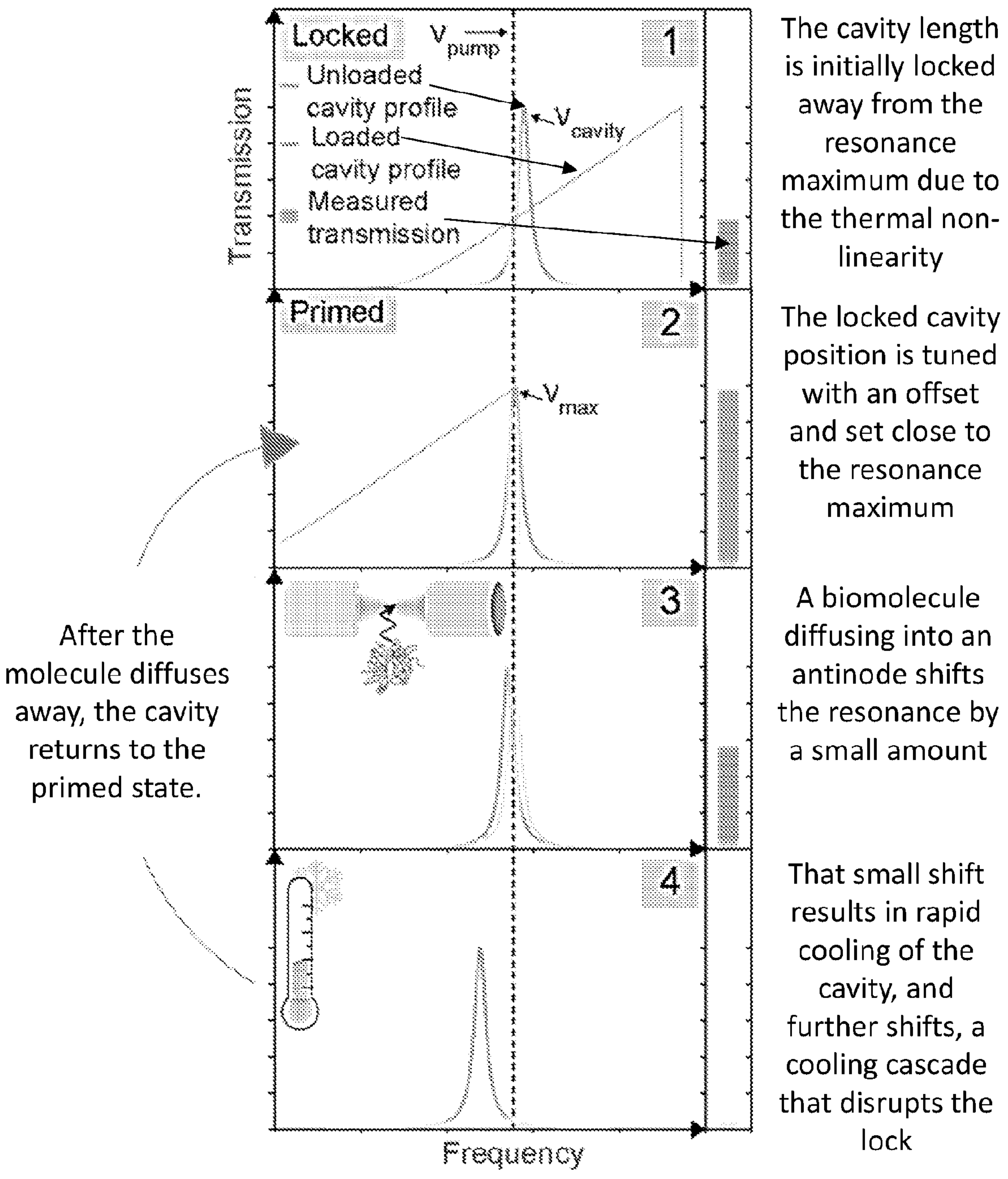
FIG. 10C shows a schematic describing the mechanism of dynamic thermal priming (see Example 2 for details).

| Parameter | Cavity one | Cavity two | Cavity three | Cavity four |
|---|---|---|---|---|
| FIG. 8A-8B | X | | | |
| FIG. 9A-9B | | X | | |
| FIG. 10A-10C | | | | X |

Results

Figure 6B:
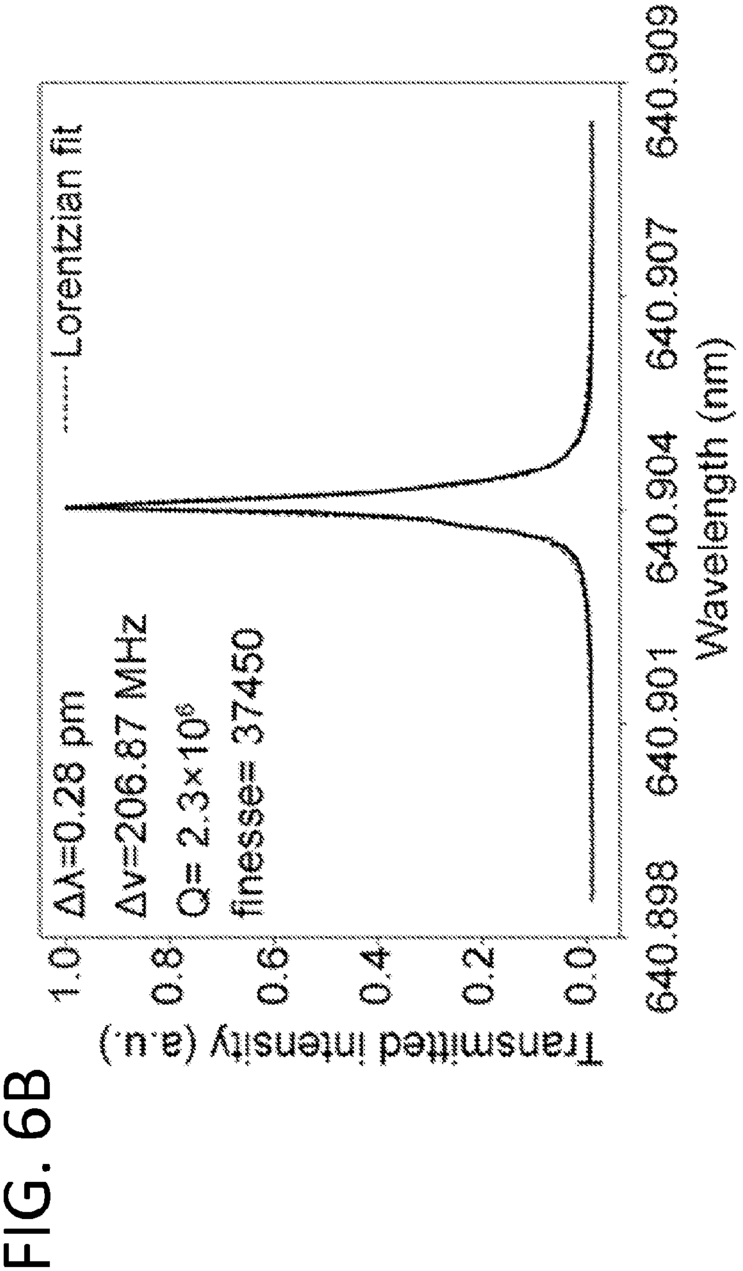
FIG. 6B shows a wavelength scan used to determine the spectral linewidth of the cavity modes to be probed. The cavity finesse was 37450 in water.

As described above, the FFPC was assembled from two single-mode optical fibers with concave laser-ablated end facets which were subsequently coated with high-reflectivity dielectric layers (interferometry profiles and resulting 2D depth profiles obtained, but not shown). The fiber mirrors were aligned and affixed laterally within a cut fused silica ferrule (FIG. 6A) to increase the passive mechanical stability of the resonator. The optical modes were probed with static-frequency lasers over 660-760 nm, with laser output injected into the input fiber. Reflection and transmission channels were independently monitored on a pair of photodiodes (FIG. 6A). The mirror separation was approximately 20 μm, leading to Q-factors of ~$2\times10^6$ and mode volumes on the order of 80 $\mu m^3$. The cavity finesses ranged from 27,000-101,000, across multiple cavities, in ambient conditions, reducing to 17,000-37,450 in water (FIG. 6B). Continuous probing of a single resonant mode was achieved via phase-sensitive Pound-Drever-Hall (PDH) frequency locking, in which the cavity length was actively stabilized to a single frequency of the pump laser (FIG. 6A).

This Example demonstrates the ability to detect single label-free proteins and small peptides by introducing samples of varying mass and radius into the FFPC. These included tetrameric streptavidin (66 kDa, 2.80 nm), carbonic anhydrase (30 kDa, 2.10 nm), aprotinin (6.5 kDa, 1.45 nm) and c-Myc peptide, known more commonly as Myc-tag (1.2 kDa, 0.75 nm). Protein samples were prepared at pM concentrations such that the mean occupancy of the optical mode volume was much less than one molecule. The input power into the cavity was ~5 μW, resulting in a circulating power of 5.5 mW.

Intensity traces show high amplitude, correlated signals in both transmission and reflection detection channels from transient interactions between single diffusing protein molecules and the locked cavity mode (FIG. 7A), manifesting as a negative peak in transmission and a positive peak in reflection (mechanism discussed below). The sign of the events, positive in reflection and negative in transmission, result from biomolecule induced resonance shifts reducing the light transmitted out of the cavity and increasing the light reflected at the locked cavity wavelength.

Confirmation that perturbation of the locked cavity originated from biomolecule diffusion and not ambient noise was achieved with water background measurements taken before the introduction of the protein and after removal, during which no signal was observed (data obtained, but not shown) and showing that detected events increased linearly with protein concentration (data obtained but not shown). Time traces were recorded in 30-second intervals (full 30 s time traces not shown) with a temporal resolution of 20 μs, with the temporal scale of the single protein diffusion events on the order of 1-2 ms (FIG. 7B). The extraordinarily high SNRs of up to 123 for Myc-tag (FIG. 16) facilitated high temporal resolution with diffusion events able to be observed with at least 50 kHz sampling rate. Without relying on plasmonic enhancement mechanisms, surface proximity, or the consequent conformational or chemical change of a surface-supported docking molecule, SNRs of up to 42-fold higher than existing label-free biomolecule sensing techniques for molecules of comparable molecular weight were demonstrated. This approach also achieved a mass limit of detection ~25-fold smaller than that of direct mass photometry, and when compared to mass photometry with machine learning, achieved an ~8-fold smaller limit of detection while offering ~70× higher SNR.

Figure 18:
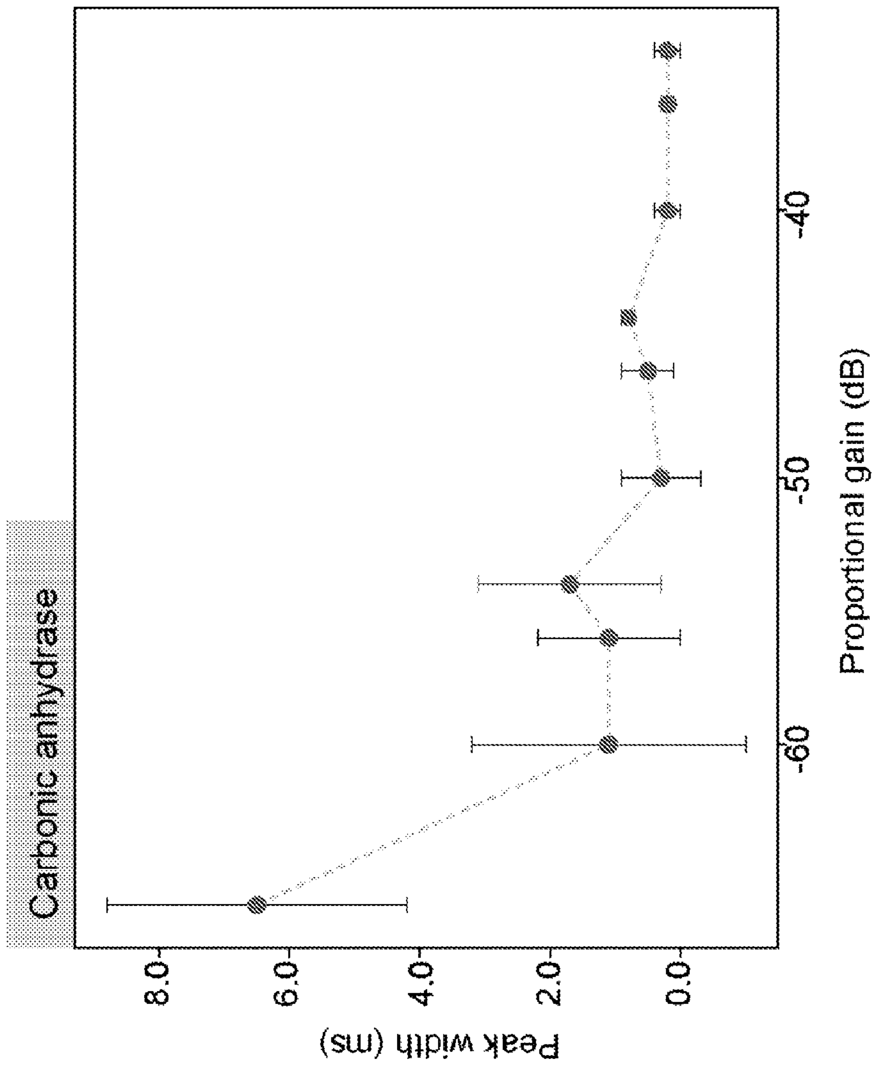
FIG. 18 plots temporal widths of carbonic anhydrase diffusion events as a function of the locking bandwidth of the PDH determined by the proportional gain of the PI control. This relationship can be explained by the inverse relationship between the molecular velocity filter bandwidth and the proportional gain values. As the gain is increased the velocity filter bandwidth narrows, resulting in detection of a distribution of faster moving molecules with narrower peak widths. Data was collected at proportional gain settings >−50 db where the mean temporal width was no longer influenced by the locking bandwidth. Error bars represent the standard deviation of temporal widths across all analyzed peaks. Data collected with cavity three.

Each transit event comprises both temporal and intensity data. Plotting the distribution of temporal and intensity parameters provides a 2D distribution signal profile containing unique information on the molecular mass and diffusion (FIG. 7B). Each protein molecule exhibited a distribution of temporal widths, identified from the full width at half maximum (FWHM) of events that rise significantly above the noise, and prominences, which increased with increasing protein molecular weight (FIG. 7B). A diversity of widths was expected due to the stochasticity of Brownian motion. The prominence of the peaks differed between transmission and reflection detection channels (FIG. 7B); this behavior arose from the dispersion that is unique to FFPC cavities (resonance in reflection and transmission under cavity length translation obtained but not shown). The mean temporal widths of the events were unchanged at proportional gain values >–50 dB in the proportional-integral (PI) control of the PDH system (see FIG. 18), where a higher proportional gain value constitutes a higher locking bandwidth (LBW). Consequently, experiments were conducted above this threshold at a LBW of ~5 kHz (see FIGS. 10A-10B). Taken together, these data confirm that these high amplitude signals originate from the perturbation of the cavity mode volume by single diffusing proteins.

To demonstrate the ability of this technique to move beyond simple detection, the potential for the technique to be used as a property assay was explored using correlation analysis to extract temporal information from the data. Correlation spectroscopy is a ubiquitous tool across temporally sensitive biophysical methods, such as fluorescence correlation spectroscopy (FCS) and dynamic light scattering, aiming to extract ensemble diffusional and, therefore, size and mass information of molecules. The autocorrelation analysis shows dynamics on longer timescales for proteins of increasing mass (FIG. 8A). Importantly, the autocorrelation times were consistently linear in proportion to the radius of the protein (data obtained but not shown). This result confirmed the versatility of this new single-molecule technique as a molecular property assay, demonstrating the ability to extract meaningful molecular information, including size and diffusional properties. Label-free methods of assessing molecular dynamics offer substantial impact in biophysical applications.

The extraordinarily high SNR of the single protein events, even down to the 10 amino-acid peptide Myc-tag, highlights the ability of the present technique to extend the dynamic range of applications to both smaller molecules and higher acquisition rates. To demonstrate this, transient events of Myc-tag diffusion with 2 μs time resolution (500 kHz acquisition rate, data obtained but not shown) were measured. This high collection frequency facilitated the measurement of events as narrow as 26 μs. With a 500 kHz collection frequency, even these high-speed events can be sampled far beyond the minimum Nyquist requirement, highlighting the ability to study kHz processes such as enzyme kinetics and conformational changes without sacrificing SNR. Only the photothermal bandwidth limits the temporal resolution (further discussed below).

Having demonstrated single-molecule measurements of solution-phase, label-free proteins, next is demonstrated the ability of the present system to resolve populations of simple bimolecular mixtures. Resolution of mixtures is vital for identifying diagnostic biomarkers, understanding disease pathogenesis, and for elucidating biomolecule-biomolecule and biomolecule-drug interactions. Techniques such as FCS, invaluable for inferring conformation, and fluorescence polarization anisotropy, invaluable for ascertaining drug binding, are limited by the requirement for fluorescent labels. Ensemble label-free techniques such as dynamic light-scattering can provide diffusive information of biomolecules, but analysis is restricted by the high dependence of scattering on the molecular radius ($r^6$), obscuring small particles among larger ones, necessitating monodisperse samples for quantitation. Mass photometry overcomes this obstacle via spatial discrimination but is constrained by limit of detection and use of surfaces. By contrast, the present technique results in 2D profiles that can act as molecular signatures (FIG. 7B) containing information about mass and diffusivity.

First, a mixture of aprotinin and Myc-tag, which have a 5.3 kDa mass and 0.7 nm radius difference, was investigated (FIG. 9A). The 2D profile of the mixture was qualitatively similar to the component distributions. Though these two populations would be difficult to resolve considering only peak prominence, two distinct populations, a fast-moving population with a mean event FWHM of 0.49±0.15 ms and a broader, slow-moving population with a mean event FWHM of 1.68±1.37 ms, are clearly evident.

Moving beyond protein samples, the resolution was explored for bimolecular mixtures of DNA isomers of identical mass (16.6 kDa) and composition, but differing sequence (FIG. 9B): a DNA duplex (9 nm) and a Y-junction structure (5 nm). Here, the two populations were clearly resolved in both dimensions of the 2D profile. The event prominence was distinctly separated into two populations, a low-intensity population with a mean prominence of 1.35±0.02 V and a lower abundance high-intensity population with a prominence of 1.46±0.03 V. Two partially resolvable populations of similar relative magnitudes to those observed in peak prominence were visible in the temporal domain. Interestingly, the more rapidly diffusing component of the mixture produced a larger magnitude perturbation to the cavity mode. As discussed below, the response of the FFPC to the molecular perturbation was influenced by molecular properties as well as multiple dynamic cavity properties. The ability to cleanly reveal the presence of two molecules of identical small mass but differing conformation and diffusion behavior shows that this approach provides complementary information not discernable from mass photometry.

Discussion

The detection of a single, freely moving, un-labeled small biomolecule with high SNR requires a plausible mechanism whereby the small perturbation to the optical system can be discerned. The proposed mechanism begins with a refractive index change as the biomolecule displaces water molecules of lower index in the microcavity (often referred to as the "reactive mechanism"). Resonance shifts of 1-49 kHz due to the altered optical path length were estimated from the protein molecular weights (data obtained but not shown). It was noted that these shifts are substantially greater (~20× greater) at equivalent weights than estimates in whispering gallery mode resonators due to smaller mode volume and better spatial overlap between molecule and optical mode in. The ability to resolve resonance shifts that are small compared to the cavity linewidth (~200 MHz) with such high SNR is based on a combination of high passive stability, active low-frequency stabilization, creation of a velocity discrimination window for molecular motion, and the use of dynamic photothermal distortion of the resonance line shape. In water, the photothermal effects occur due to absorption of some of the cavity circulating power which alters the refractive index of the medium via the thermo-optic coefficient.

The combination of mounting the FFPC in a glass ferrule and PDH locking provides remarkable stability to the optical system, suppressing mechanical and laser frequency noise to detector-limited levels (FIG. 10A). Furthermore, the mechanical stability of the cavity was extremely high, well-below the detector noise floor (see FIG. 12). Importantly, the PDH LBW only suppressed fluctuations (including molecular fluctuations) at temporal frequencies below 5 kHz (FIG. 10A). This is a critical function of the PDH loop, as low-frequency mechanical fluctuations can introduce substantial resonance frequency shifts. This loop would also suppress perturbations produced by larger, slow-moving molecules or particles, as the majority of their displacement would occur within the PDH LBW (FIG. 10A). Importantly, small molecules undergoing Brownian motion, albeit with smaller overall resonance shifts due to their reduced size, have a larger fraction of their mean squared displacement power spectral density (MSDPSD) outside the PDH suppression window (FIG. 10A, FIGS. 17A-17B). Integration of the MSDPSD for the smallest protein (Myc-tag, 0.75 run) between the end of the locking bandwidth and the photothermal bandwidth (discussed below) yielded a root-mean-squared (RMS) displacement of 93 nm. This displacement is comparable to the ~250 nm distance between the node and antinode of the cavity standing wave (simulated cavity standing wave obtained but not shown), suggesting that the near full resonance shift can be experienced by the microcavity outside the PDH LBW due to diffusing molecules. When the molecule diffused back into the node, the perturbation ceased, leading the system to exhibit a dependence on the molecular diffusion constant (FIGS. 8A-8B). Notably, detection by shifting from node to antinode is distinct from the operational mechanisms in evanescent detection modalities. Critically, a solution-phase label-free apparatus allowed this novel employment of PDH as a high-pass filter to reduce mechanical noise while passing signals from fast-moving molecules (FIG. 10B), a key difference compared to previous schemes.

The second element of the proposed mechanism relies on a photothermally induced distortion of the resonance line shape (FIG. 10C) and a dynamic photothermal priming mechanism, which amplifies small resonance shifts. FFPCs spatially confine relatively intense optical fields, inducing on resonance temperature changes inside the mode volume media and consequent thermo-optic resonance shifts. The presence of this thermal nonlinearity clearly manifested as a broadened asymmetric cavity line shape upon active scanning of the cavity length or wavelength (see FIG. 14). This photothermal nonlinearity arises from the mirror coatings and the aqueous medium and requires no light absorption by the molecule itself. The photothermal bandwidth was determined experimentally to be 21 kHz (see FIG. 15A), defining the upper limit of the molecular observation window (FIG. 10B). In a non-PDH stabilized cavity, these photothermal nonlinearities result in multiple distinct stable equilibria. However, with PDH stabilization, this nonlinearity can be used for additional signal amplification. Increasing the cavity transmission by introducing an offset from the original, arbitrary locked position (FIG. 10C, panel 1) resulted in the pump laser sitting at a frequency just lower than the cavity maximum (FIG. 10C, panel 2). In this primed state, even the resonance shift of a diffusing molecule can shift the cavity resonance to an unstable regime where the pump laser sits at a higher frequency than the microcavity resonance (FIG. 10C, panel 3). Here, the shift triggers a dynamic process by which the cavity cools faster than the LBW, resulting in further resonance shift and more cooling, ultimately causing a substantial transmission decrease (FIG. 10C, panel 4). Other molecule-induced mechanisms, such as scattering, may also contribute to cavity cooling. After the molecule has diffused out of the antinode, the cavity begins to warm, and eventually, the PDH recovers the initial locked position at a rate defined by the LBW (FIG. 10C, panel 2). In the case of smaller perturbations (as with Myc-tag), the cavity cools less, leading to the distribution of peak prominences. Evidence for this mechanism can be found in controlled voltage pulses added to the output servo of the PDH, providing internal perturbations (FIG. 13A) that qualitatively mimic molecular passages (FIG. 13B).

In summary, the proposed mechanism features molecules diffusing into the microcavity, where their fast motion exceeds the PDH locking bandwidth. A hypersensitive photothermally primed cavity, experiencing these fast molecular perturbations, rapidly cools, leading to enhanced shift and massive signal. Both peak prominence and temporal width are expected to be influenced by system parameters, including PDH LBW. However, while peak prominence is a complex function of biomolecule molecular weight (and thus refractive index) and diffusive parameters, the temporal width is expected to be dominated more purely by diffusive parameters, leading to clear linear dependence (FIGS. 8A-8B).

Conclusion

In the absence of surfaces, extrinsic labels, and plasmonic enhancers, this Example has demonstrated exceptional sensitivity in observing single, diffusing biomolecules, achieving SNRs of >100 for a sub 1 nm peptide. This approach leverages the open-access geometry of micro-scale FFPCs to facilitate unimpeded biomolecule diffusion as well as maximize the overlap between the biomolecules and the optical field. The enhanced sensitivity relative to other label-free techniques originates in molecular velocity filtering and photothermal priming, where two experimental challenges, fast molecular motion, and thermal non-linearity, are transformed into advantages. Much like the fingerprint region of an infrared spectrum, the resulting rich 2D intensity/temporal data can be used to distinguish unique, identifying molecular signatures and has the potential to provide quantitative mass and diffusional information without surface perturbation.

Mass photometry, a new method that can provide quantitative mass information of unlabeled biomolecules in a spatially resolved manner, has been commercialized and widely adopted, showcasing the tremendous possibilities of photonic single-molecule assays. Although the present solution-phase FFPC-based approach sacrifices the spatial resolution of mass photometry, it provides μs dynamics, a substantially higher sensitivity with ≤1 kDa detection limit, and 2D signal profiles that offer a path toward distinguishing molecules based on conformation, which influences diffusion properties, as well as just mass. In addition. FFPCs offer convenient fiber optic integration such that molecules, after passing through the FFPC, could be readily interrogated via mass photometry, making the approaches truly complementary.

Increased suppression of external noise sources will yield further significant improvements, including the capability to detect biomolecules smaller than 1 kDa. Optimization of measurement parameters using quantitative modelling will enable tuning of molecular profiles, for instance, a configuration of the bandwidth of the velocity filter to selectively collect information from different diffusional populations. As demonstrated with the experiments above, the present FFPC approach may be used to resolve rapid biomolecular conformation changes, elucidate self-assembly of small molecules in complex samples, and provide routes to rapid screening of protein-protein and protein-drug interactions. By being label-free and single-molecule, the present methods mitigate some of the key experimental difficulties in FCS and dynamic light scattering, two widely applied biophysical techniques. This straightforward and readily scalable apparatus will bring numerous benefits to the fields of life and chemical sciences, such as trace analysis, separation science, mechanistic insights, and clinical diagnostics.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. "Nearly" as in "nearly maximized" has an analogous meaning. These terms are used to encompass those variations inherent to the measurement/achievement of the relevant parameter as understood b) those of ordinary skill in the art. This encompasses being within ±15%, ±4%, ±3%, ±2%, and ±1% of a disclosed numeric value (or a maximum or a minimum). This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for detecting diffusing particles, the method comprising:

(a) introducing a sample comprising water and a diffusing particle to an optical microcavity, wherein the sample has a concentration of diffusing particles such that a probability of the diffusing particle occupying an optical mode volume is less than one;

(b) coupling probe light into the optical microcavity such that the probe light is in resonance with the optical microcavity and such that the optical microcavity experiences a photothermal nonlinearity, wherein the diffusing particle diffuses into the optical mode volume defined by the coupled probe light; and (c) detecting output light from the optical microcavity as a function of time while maintaining resonance under conditions such that the diffusing particle generates a change in the detected output light that is amplified due to the photothermal nonlinearity.

2. The method of claim 1, wherein the optical microcavity is an open-access optical microcavity configured such that a region of maximum intensity of the optical mode volume is accessible by the diffusing particle.

3. The method of claim 1, wherein the optical microcavity is a Fabry-Perot microcavity having a cavity, wherein the optical mode volume is defined within the cavity.

4. The method of claim 1, wherein resonance in step (b) is associated with maximum transmission of the probe light through the optical microcavity or minimum intensity of back-reflected probe light from the optical microcavity.

5. The method of claim 4, wherein maximum transmission of the probe light or minimum intensity of the back-reflected probe light, and the conditions in step (c) are obtained by coupling the probe light such that it undergoes constructive interference to form a standing wave within the optical microcavity and by adjusting one or more of: a power of the probe light, a gain of a Pound-Drever-Hall (PDH) servo loop coupled to a source of the probe light and the optical microcavity, and an offset of the PDH servo loop.

6. The method of claim 5, wherein the standing wave is achieved by satisfying $m\lambda=2\,nL$, wherein m is an integer, $\lambda$ is the probe light wavelength, n is the sample's refractive index, and L is the optical microcavity cavity length.

7. The method of claim 6, further comprising adjusting $\lambda$, adjusting L, adjusting the power of the probe light, adjusting the gain of the PDH servo loop, adjusting the offset of the PDH servo loop, or a combination thereof to maintain resonance and the conditions in step (c).

8. The method of claim 1, wherein the detected output light is transmitted probe light comprising dips or the detected output light is back-reflected probe light comprising spikes and the method further comprises measuring a temporal width of each of the dips or the spikes.

9. The method of claim 8, further comprising generating a plot of intensity versus temporal width of each of the dips or the spikes.

10. The method of claim 1, wherein the detected output light is transmitted probe light comprising dips or the detected output light is back-reflected probe light comprising spikes and the method further comprises measuring an autocorrelation function (ACF) from the dips or the spikes and calculating a hydrodynamic radius from the measured ACF.

11. The method of claim 1, wherein the change in the detected output light is detected with a signal-to-noise ratio of at least 75 for a diffusing particle having a molecular weight of no more than 100 kDa.

12. The method of claim 5, wherein the maximum transmission of the probe light or minimum intensity of the back-reflected probe light, and the conditions in step (c) are obtained by adjusting the offset of the PDH servo loop.

13. A system for detecting diffusing particles, the system comprising:

(a) optoelectrical components configured to couple probe light into an optical microcavity such that the probe light is in resonance with the optical microcavity and the optical microcavity experiences a photothermal nonlinearity;

(b) the optical microcavity to which a sample comprising water and a diffusing particle is introduced to diffuse into an optical mode volume defined by the coupled probe light, wherein the sample has a concentration of diffusing particles such that a probability of the diffusing particle occupying the optical mode volume is less than one;

(c) a detector configured to detect output light from the optical microcavity as a function of time; and (d) optoelectrical components configured to maintain resonance while using the detector to detect output light from the optical microcavity as a function of time under conditions such that changes in detected output light from the diffusing particle are amplified due to the photothermal nonlinearity, wherein the optoelectrical components (d) provide a Pound-Drever-Hall (PDH) servo loop coupled to a source of the probe light and the optical microcavity.

14. The system of claim 13, wherein the optical microcavity is an open-access optical microcavity configured such that a region of maximum intensity of the optical mode volume is accessible by the diffusing particle.

15. The system of claim 13, wherein the optical microcavity is a Fabry-Perot microcavity having a cavity, wherein the optical mode volume is defined within the cavity.

16. The system of claim 13, further comprising an actuator operably coupled to the optical microcavity and the PDH servo loop, the actuator configured to adjust a cavity length L of the optical microcavity.

17. The system of claim 13, further comprising a controller comprising a processor and a non-transitory computer-readable medium operably coupled to the processor, the non-transitory computer-readable medium comprising instructions, that, when executed by the processor, cause the controller to perform operations comprising:

receiving a signal from the detector;

based on the received signal, coupling the probe light into the optical microcavity such that it undergoes constructive interference to form a standing wave within the optical microcavity; and based on the received signal, adjusting one or more of a power of the probe light, a gain of the PDH servo loop, an offset of the PDH servo loop, or a combination thereof to maintain resonance and the conditions in (d).

18. The system of claim 13, further comprising a controller comprising a processor and a non-transitory computer-readable medium operably coupled to the processor, the non-transitory computer-readable medium comprising instructions, that, when executed by the processor, cause the controller to perform operations comprising:

receiving a signal from the detector;

processing the signal to determine a temporal width for the signal; and outputting the determined temporal width.

19. The system of claim 18, wherein the operations further comprise processing the signal to calculate a hydrodynamic radius of the diffusing particle and outputting the calculated hydrodynamic radius to the system.

20. The system of claim 17, wherein the standing wave is achieved by satisfying $m\lambda=2\,nL$, wherein m is an integer, $\lambda$ is the probe light wavelength, n is the sample's refractive index, and L is the optical microcavity cavity length.

21. The system of claim 17, wherein the operations comprise adjusting the offset of the PDH servo loop to maintain resonance and the conditions in (d).

* * * * *